US012547096B2

(12) United States Patent
Takabe et al.

(10) Patent No.: US 12,547,096 B2
(45) Date of Patent: Feb. 10, 2026

(54) DEVELOPING APPARATUS, PROCESS CARTRIDGE, AND IMAGE-FORMING APPARATUS

(71) Applicant: CANON KABUSHIKI KAISHA, Tokyo (JP)

(72) Inventors: Rieko Takabe, Tokyo (JP); Katsuichi Abe, Kanagawa (JP); Yuki Yamamoto, Chiba (JP); Akio Nishi, Tokyo (JP); Kazuhisa Shida, Kanagawa (JP); Akihisa Matsukawa, Tokyo (JP); Yasukazu Ikami, Tokyo (JP); Hiroki Tanaka, Kanagawa (JP); Kunihiko Sekido, Tokyo (JP); Takashi Kenmoku, Shizuoka (JP); Ryo Sugiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/626,054

(22) Filed: Apr. 3, 2024

(65) Prior Publication Data

US 2024/0288793 A1 Aug. 29, 2024

Related U.S. Application Data

(63) Continuation of application No. PCT/JP2022/036703, filed on Sep. 30, 2022.

(30) Foreign Application Priority Data

Oct. 7, 2021 (JP) ................................ 2021-165722
Oct. 7, 2021 (JP) ................................ 2021-165723
(Continued)

(51) Int. Cl.
*G03G 15/06* (2006.01)
*G03G 9/08* (2006.01)
(Continued)

(52) U.S. Cl.
CPC ....... *G03G 15/0812* (2013.01); *G03G 9/0819* (2013.01); *G03G 9/0823* (2013.01);
(Continued)

(58) Field of Classification Search
CPC ............... G03G 9/0819; G03G 9/0823; G03G 15/0808; G03G 15/0812; G03G 15/5004; G03G 21/1814
See application file for complete search history.

(56) References Cited

U.S. PATENT DOCUMENTS

| | | | | |
|---|---|---|---|---|
| 5,953,572 | A * | 9/1999 | Takeuchi | G03G 15/1605 399/302 |
| 2012/0219333 | A1* | 8/2012 | Namba | G03G 15/1685 399/313 |
| 2016/0246194 | A1* | 8/2016 | Tsurumi | G03G 9/0823 |

FOREIGN PATENT DOCUMENTS

| | | | |
|---|---|---|---|
| EP | 0967528 | A2 | 12/1999 |
| JP | H10115979 | A | 5/1998 |

(Continued)

*Primary Examiner* — Hoang X Ngo
(74) *Attorney, Agent, or Firm* — Canon U.S.A., Inc. IP Division

(57) ABSTRACT

A contact member that comes into contact with a surface of a developer carrier has a volume resistivity of $10^{14}$ ohm·cm or less, and a developer satisfies the following conditions: a rotating member and the contact member have a resistance value of $1.0\times10^4$ ohms or less, and a first resistance value ranges from $1.0\times10^5$ ohms to $1.0\times10^8$ ohms as measured in a state where the rotating member is stopped and the developer is located between the rotating member and the contact member, and a second resistance value is in the range of the first resistance value and is 40% or more with respect to the first resistance value, as measured in a state where the rotating member is rotated at 200 mm/s with respect to the contact member and the developer is located between the rotating member and the contact member.

36 Claims, 11 Drawing Sheets

(30) Foreign Application Priority Data

Aug. 4, 2022 (JP) ................................ 2022-124673
Aug. 5, 2022 (JP) ................................ 2022-125410

(51) Int. Cl.
*G03G 15/00* (2006.01)
*G03G 15/08* (2006.01)
*G03G 21/18* (2006.01)

(52) U.S. Cl.
CPC ..... *G03G 15/0808* (2013.01); *G03G 15/5004* (2013.01); *G03G 21/1814* (2013.01)

(56) References Cited

FOREIGN PATENT DOCUMENTS

| | | | |
|---|---|---|---|
| JP | H1165281 | A | 3/1999 |
| JP | 2000267391 | A | 9/2000 |
| JP | 2006058745 | A | 3/2006 |
| JP | 2006178161 | A | 7/2006 |
| JP | 2009169112 | A | 7/2009 |
| JP | 2019078881 | A | 5/2019 |
| JP | 2021021792 | A | 2/2021 |
| JP | 2021081688 | A | 5/2021 |

* cited by examiner

DEVELOPING APPARATUS, PROCESS CARTRIDGE, AND IMAGE-FORMING APPARATUS

CROSS-REFERENCE TO RELATED APPLICATIONS

This application is a Continuation of International Patent Application No. PCT/JP2022/036703, filed Sep. 30, 2022, which claims the benefit of Japanese Patent Application No. 2021-165723, filed Oct. 7, 2021, Japanese Patent Application No. 2021-165722, filed Oct. 7, 2021, Japanese Patent Application No. 2022-125410, filed Aug. 5, 2022, and Japanese Patent Application No. 2022-124673, filed Aug. 4, 2022, all of which are hereby incorporated by reference herein in their entirety.

TECHNICAL FIELD

The present invention relates to an electrophotographic image-forming apparatus, such as a laser printer, a copying machine, or a facsimile machine.

BACKGROUND ART

An apparatus for visualizing an electrostatic latent image using a developer (hereinafter referred to as a toner) has been known as an electrophotographic image-forming apparatus. More specifically, in a typical method, an insulating toner is carried on a developer carrier, and the toner is charged by triboelectric charging with a regulating blade for regulating the toner on the developer carrier before development.

However, the toner charged by triboelectric charging has a certain degree of charge distribution. In this case, on the developer carrier, there may be a low charge toner with a small charge amount or a toner polarized by friction between toner particles and charged to a polarity opposite to the normal charge polarity of the toner (hereinafter referred to as an opposite polarity toner).

An increase in the ratio of such a low-charged toner or opposite polarity toner (hereinafter referred to as an opposite polarity toner ratio) may cause an adverse effect in an image due to a decrease in developability.

Furthermore, charging a toner by triboelectric charging may be affected by an environmental change or a temporal change or by a change in the surface state of a member involved in triboelectric charging of the toner, a regulating blade, or the like.

To solve such a problem of triboelectric charging, an injection charging method is proposed in Patent Literature 1 in which an electric charge is injected into a toner using an electrically conductive toner and an injection member.

Furthermore, Patent Literature 2 discloses a technique of triboelectrically charging a toner in a developing nip using a photosensitive drum provided with an acrylic resin in a surficial layer. Furthermore, in the triboelectric charging in the developing nip, the amount of electric charge received by the toner increases with the difference in surface velocity between the photosensitive drum and a developing roller (hereinafter referred to as a developing peripheral speed difference).

However, Patent Literature 1 has the following problems. In the electrically conductive toner in Patent Literature 1, an electric charge is injected into the toner by covering a low-resistance electrically conductive toner surface with an insulating film to greatly reduce the resistance of the toner in the case of high electric field strength. Depending on the conditions, this may change the injection state of the toner and, in particular, may cause leakage of an electric charge injected into the toner due to the influence of the environment or the electric field.

In Patent Literature 2, when an image-forming apparatus is used, a developing nip is formed while a photosensitive drum and a developing roller are rotated at their predetermined speeds. To form a good image with high accuracy, a photosensitive drum and a developing roller are required to have high rotational accuracy, and even a slight variation in the surface velocity of the photosensitive drum and the developing roller causes a variation in developing peripheral speed difference. A change in the rolling state of toner in a developing nip due to the variation in the developing peripheral speed difference causes a variation in the toner charge amount in the developing nip. The variation in the toner charge amount periodically occurs in accordance with the variation in the developing peripheral speed difference and causes a periodic uneven density (banding) in an image. In particular, a photosensitive drum having a surficial layer with a low electrical resistance has a large amount of electric charge applied per rotation of toner in a developing nip, tends to have a large variation in the toner charge amount when the developing peripheral speed difference varies, and tends to frequently have the banding.

CITATION LIST

Patent Literature

PTL 1: Japanese Patent Laid-Open No. 2006-58745
PTL 2: Japanese Patent Laid-Open No. 2019-78881

SUMMARY OF INVENTION

The present invention has been made in view of these problems and provides a developing apparatus, a process cartridge, and an image-forming apparatus that can reduce the occurrence of an adverse effect in an image caused by leakage of an electric charge injected into toner.

The present invention to provide an image-forming apparatus that, even using a photosensitive drum having a surficial layer with a low electrical resistance, is less likely to cause a variation in the toner charge amount due to a variation in the developing peripheral speed difference and that can provide high image quality.

Accordingly, the present invention is a developing apparatus for use in an image-forming apparatus configured to form an image on a recording medium, the developing apparatus including: a developer; a developer carrier that can transport the developer; and a contact member configured to come into contact with a surface of the developer carrier, wherein the contact member has a volume resistivity of $10^{14}$ ohm·cm or less, and the developer satisfies the following conditions:

in a state where a potential difference is formed between a surface of a rotatable rotating member and a contact member in contact with the surface of the rotating member outside the image-forming apparatus, each of the rotating member and the contact member has a resistance value of $1.0\times10^4$ ohms or less, and i) a first resistance value ranges from $1.0\times10^5$ ohms to $1.0\times10^8$ ohms as measured in a state where the rotating member is stopped and in a state where the developer is located between the rotating member and the contact member, and ii) a second resistance value is in the range of the first resistance value and is 40% or more with respect to the first resistance value, as measured in a state where the rotating member is rotated at 200 mm/s with respect to the contact member and in a state where the developer is located between the rotating member and the contact member.

A process cartridge detachably mountable in an image-forming apparatus configured to form an image on a recording medium, the process cartridge includes: a rotatable image-bearing member; a developer; and a developer carrier configured to supply the developer to the image-bearing member, wherein the image-bearing member has a volume resistivity of $10^{14}$ ohm·cm or less, and the developer satisfies the following conditions:

in a state where a potential difference is formed between a surface of a rotatable rotating member and a contact member in contact with the surface of the rotating member outside the image-forming apparatus, each of the rotating member and the contact member has a resistance value of $1.0\times10^4$ ohms or less, and i) a first resistance value ranges from $1.0\times10^5$ ohms to $1.0\times10^8$ ohms as measured in a state where the rotating member is stopped and in a state where the developer is located between the rotating member and the contact member, and ii) a second resistance value is in the range of the first resistance value and is 40% or more with respect to the first resistance value, as measured in a state where the rotating member is rotated at 200 mm/s with respect to the contact member and in a state where the developer is located between the rotating member and the contact member.

An image-forming apparatus includes a rotatable image-bearing member; a developer; and a developer carrier configured to supply the developer to the image-bearing member, wherein the image-bearing member has a volume resistivity of $10^{14}$ ohm·cm or less, and the developer satisfies the following conditions:

in a state where a potential difference is formed between a surface of a rotatable rotating member and a contact member in contact with the surface of the rotating member outside the image-forming apparatus, each of the rotating member and the contact member has a resistance value of $1.0\times10^4$ ohms or less, and i) a first resistance value ranges from $1.0\times10^5$ ohms to $1.0\times10^8$ ohms as measured in a state where the rotating member is stopped and in a state where the developer is located between the rotating member and the contact member, and ii) a second resistance value is in the range of the first resistance value and is 40% or more with respect to the first resistance value, as measured in a state where the rotating member is rotated at 200 mm/s with respect to the contact member and in a state where the developer is located between the rotating member and the contact member.

An image-forming apparatus includes a rotatable image-bearing member including a base material and a surface layer on a surface thereof; a charging member configured to charge a surface of the image-bearing member; a developer carrier configured to supply the surface of the image-bearing member with the developer to be charged to a normal polarity; a charging voltage application portion configured to apply a charging voltage to the charging member; a development voltage application portion configured to apply a development voltage to the developer carrier; and a controller configured to control the charging voltage application portion and the development voltage application portion, wherein the controller is configured to form a potential difference between the image-bearing member and the developer carrier so as to generate an electrostatic force that moves the developer charged to the normal polarity from the image-bearing member to the developer carrier, and $$\rho p \le 1.0\times10^{14}\ \text{ohm}\cdot\text{cm and}$$

$$\log_{10}\rho d > 0.05\log_{10}\rho p + 6$$

are satisfied, wherein ρp denotes a volume resistivity of the surface layer of the image-bearing member, and ρd denotes a volume resistivity of the developer carrier.

Further features of the present invention will become apparent from the following description of exemplary embodiments with reference to the attached drawings.

DESCRIPTION OF EMBODIMENTS

Embodiments of the present invention are described in detail below on the basis of exemplary embodiments with reference to the accompanying drawings. However, the dimensions, materials, shapes, relative arrangements, and the like of components described in these embodiments should be appropriately changed depending on the structures and various conditions of apparatuses to which the present invention is applied. Thus, the scope of the present invention is not limited to the following embodiments.

Exemplary Embodiment 1

1. Image-Forming Apparatus

Figure 1A:
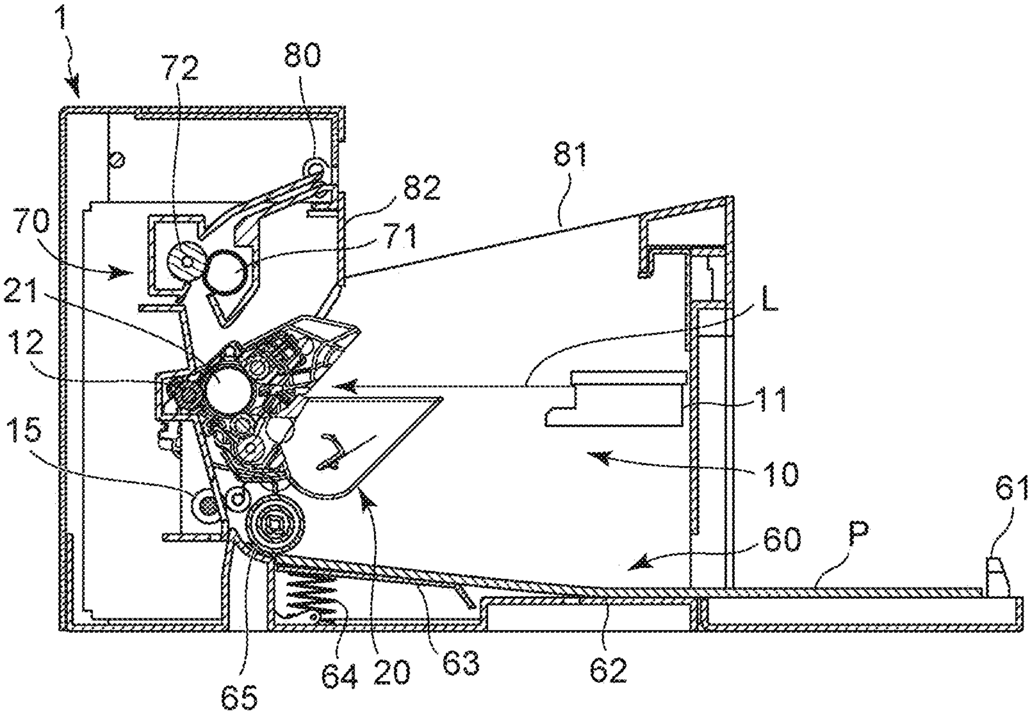
FIG. 1A is a schematic cross-sectional view of an image-forming apparatus and a process cartridge in Exemplary Embodiment 1.
Figure 1B:
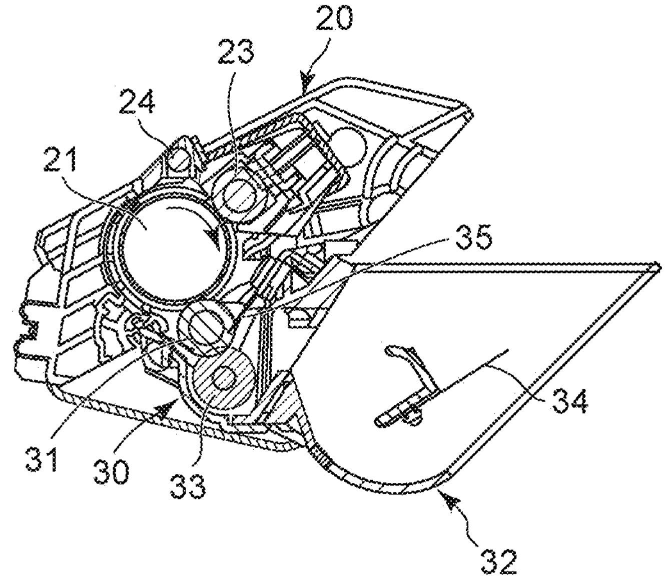
FIG. 1B is a schematic cross-sectional view of the image-forming apparatus and the process cartridge in Exemplary Embodiment 1.

FIGS. 1A and 1B are schematic views of the structure of an image-forming apparatus 1 according to Exemplary Embodiment 1. The image-forming apparatus 1 is a monochrome printer that forms an image on a recording medium based on image information input from an external device. The recording medium includes various sheet materials of different materials, including paper, such as plain paper or thick paper, a plastic film, such as a sheet for an overhead projector, a sheet of a special shape, such as an envelope or index paper, and cloth.

As illustrated in FIG. 1A, the image-forming apparatus 1 includes an image-forming portion 10 that forms a toner image on a recording medium, a feed portion 60 that feeds the recording medium to the image-forming portion 10, a fixing portion 70 that fixes the toner image formed by the image-forming portion 10 to the recording medium, and a discharge roller pair 80.

The image-forming portion 10 includes a scanner unit 11, an electrophotographic process cartridge 20, and a transfer roller 12 that transfers a toner image formed on a photosensitive drum 21 of the process cartridge 20 onto the recording medium. A detail view of the process cartridge 20 is illustrated in FIG. 1B. The process cartridge 20 includes the photosensitive drum 21, a drum unit including a charging brush 22 and a charging roller 23 around the photosensitive drum 21, and a developing apparatus 30 including a pre-exposure unit 24 and a developing roller 31.

When an image formation command is input to the image-forming apparatus 1, the image-forming portion 10 starts an image formation process on the basis of image information input from an external computer coupled to the image-forming apparatus 1.

The photosensitive drum 21 as an image-bearing member is rotationally driven by a motor 110 at a predetermined process speed in a predetermined direction (in a clockwise direction in FIG. 1B).

The charging brush 22 and the charging roller 23 come into contact with the photosensitive drum 21 at a predetermined pressure, and a charging high-voltage power supply E1 applies a desired charging voltage to uniformly charge the surface of the photosensitive drum 21 to a predetermined electric potential. In the present exemplary embodiment, the surface of the photosensitive drum 21 is charged to −600 V by applying a voltage of −500 V to the charging brush 22 and a voltage of −1150 V to the charging roller 23. The pre-exposure unit 24 eliminates the surface potential of the photosensitive drum 21 for stable charging by the charging brush 22 and the charging roller 23 before entering into a charging portion.

The scanner unit 11 serving as an exposure unit forms an electrostatic latent image on the photosensitive drum 21 by irradiating the photosensitive drum 21 with laser light using a polygon mirror on the basis of input image information and performing scanning exposure. The scanner unit 11 is not limited to a laser scanner and may be, for example, an LED exposure apparatus with an LED array including a plurality of LEDs arranged in the longitudinal direction of the photosensitive drum 21.

The electrostatic latent image formed on the photosensitive drum 21 is developed by the developing apparatus 30 and forms a toner image on the photosensitive drum 21.

Next, the process cartridge 20 is described. The process cartridge 20 illustrated in detail in FIG. 1B includes the developing apparatus 30. The developing apparatus 30 more specifically includes the developing roller 31 as a developer carrier for carrying a developer, a developing container 32 as a frame of the developing apparatus 30, and a supply roller 33 that can supply the developer to the developing roller 31. The developing roller 31 and the supply roller 33 are rotatably supported by the developing container 32. The developing roller 31 is disposed in an opening portion of the developing container 32 so as to face the photosensitive drum 21. The supply roller 33 rotatably comes into contact with the developing roller 31, and a toner as a developer contained in the developing container 32 is applied to the surface of the developing roller 31 by the supply roller 33.

A stirring member 34 as a stirring means is provided inside the developing container 32. The stirring member 34 is driven to rotate and stir the toner in the developing container 32 and feed the toner toward the developing roller 31 and the supply roller 33. The stirring member 34 has a function of circulating toner not used for the development and removed from the developing roller 31 in the developing container to uniformize the toner in the developing container.

Furthermore, a developing blade 35 made of a stainless steel plate for regulating the amount of toner to be carried on the developing roller 31 is disposed in the opening portion of the developing container 32 in which the developing roller 31 is disposed. A voltage different from the voltage applied to the developing roller 31 may be applied to the developing blade 35.

The toner supplied to the surface of the developing roller 31 passes through a portion facing the developing blade 35 with the rotation of the developing roller 31 and is uniformly formed into a thin layer.

The developing apparatus 30 according to the present exemplary embodiment uses a contact developing method as a developing method. More specifically, the toner layer on the developing roller 31 comes into contact with the photosensitive drum 21 at a development portion (development region) at which the photosensitive drum 21 faces the developing roller 31. In the present exemplary embodiment, the photosensitive drum 21 is rotated at a surface velocity of 150 mm/s, and the difference between the surface velocity of the photosensitive drum 21 and the surface velocity of the developing roller 31 (hereinafter referred to as a developing peripheral speed difference) is 40%. More specifically, the developing roller 31 is rotated at 150×1.4=210 mm/s. Thus, the photosensitive drum and the developing roller come into contact with each other at a velocity difference of 60 mm/s. A development voltage is applied to the developing roller 31 serving as a development voltage application portion by a developing high-voltage power supply E2. Under the application of the development voltage, the toner on the developing roller 31 is transferred from the developing roller 31 to the surface of the photosensitive drum 21 in accordance with the electric potential distribution on the surface of the photosensitive drum 21, thereby developing an electrostatic latent image into a toner image. In the present exemplary embodiment, a development voltage of −400 V is applied to the developing roller 31. The back contrast Vback is 200 V, which is the absolute potential difference between the surface of the photosensitive drum 21 in an unexposed portion Vd and the developing roller 31 before passage through the development region. In the present embodiment, a reversal development method is employed. More specifically, the toner adheres to a surface region of the photosensitive drum 21 that has been charged in a charging step and then exposed to light in an exposure step to reduce the charge amount, thereby forming a toner image.

In parallel with the image formation process, the recording medium P in the feed portion 60 is fed in synchronization with the transfer timing of the toner image. The feed portion 60 includes a front door 61 openably and closably supported by the image-forming apparatus 1, a stack tray 62, an intermediate plate 63, a tray spring 64, and a pickup roller 65. The stack tray 62 constitutes a bottom surface of a storage space for the recording medium P, which appears when the front door 61 is opened, and the intermediate plate 63 is supported by the stack tray 62 so as to be movable up and down. The tray spring 64 pushes the intermediate plate 63 upward and presses the recording medium P stacked on the intermediate plate 63 against the pickup roller 65. The front door 61 closes the storage space for the recording medium P when closed with respect to the image-forming apparatus 1, and together with the stack tray 62 and the intermediate plate 63 supports the recording medium P when opened with respect to the image-forming apparatus 1. In a transport step of the recording medium P, first, the pickup roller 65 of the feed portion 60 feeds the recording medium P supported by the front door 61, the stack tray 62, and the intermediate plate 63. Next, the recording medium P is fed to a registration roller pair 15 by the pickup roller 65 and comes into contact with the nip of the registration roller pair 15, so that skew feeding is corrected. The registration roller pair 15 is driven in synchronization with the transfer timing of a toner image and transports the recording medium P toward a transfer nip formed by the transfer roller 12 and the photosensitive drum 21.

A transfer voltage is applied from a transfer high-voltage power supply E3 to the transfer roller 12 serving as a transfer means, and a toner image on the photosensitive drum 21 is transferred onto the recording medium P transported by the registration roller pair 15.

The recording medium P onto which the toner image has been transferred is transported to the fixing portion 70, and the toner image is heated and pressed when the recording medium P passes through a nip portion between a fixing film 71 and a pressure roller 72 in the fixing portion 70. As a result, toner particles are melted and then solidified, so that the toner image is fix on the recording medium P.

The fixing portion 70 is of a heat fixing type, which heats and melts the toner on the recording medium to fix an image. The fixing portion 70 includes the fixing film 71, a fixing heater, such as a ceramic heater for heating the fixing film 71, a thermistor for measuring the temperature of the fixing heater, and the pressure roller 72 that is pressed against the fixing film 71.

The recording medium P passed through the fixing portion 70 is discharged to the outside of the image-forming apparatus 1 by the discharge roller pair 80 and is stacked on a discharge tray 81. The discharge tray 81 is inclined upward toward the downstream side in the discharge direction of the recording medium, and the recording medium discharged onto the discharge tray 81 slides down on the discharge tray 81 so that the rear end thereof is aligned by a regulation surface 82.

Although the process cartridge 20 detachably mounted in the image-forming apparatus main body is used in the present exemplary embodiment, the present invention is not limited thereto, and it is sufficient if a predetermined image formation process can be performed. For example, a development cartridge with the developing apparatus 30 detachably mounted, a drum cartridge with a detachable drum unit, or a toner cartridge for supplying toner to the developing apparatus 30 from the outside may be used, or a detachable cartridge may be omitted.

Although the surface of the photosensitive drum 21 is charged by the charging brush 22 and the charging roller 23 in the present exemplary embodiment, the present invention is not limited thereto. Any charging member that can charge the surface of the photosensitive drum may be used and, for example, the surface of the photosensitive drum may be charged only using a charging roller.

Although the present exemplary embodiment includes no cleaning member for collecting toner on the photosensitive drum that has not been transferred onto a recording medium in a transfer process, the present invention is not limited thereto, and a cleaning member may be used.

2. Control Mode

Figure 2:
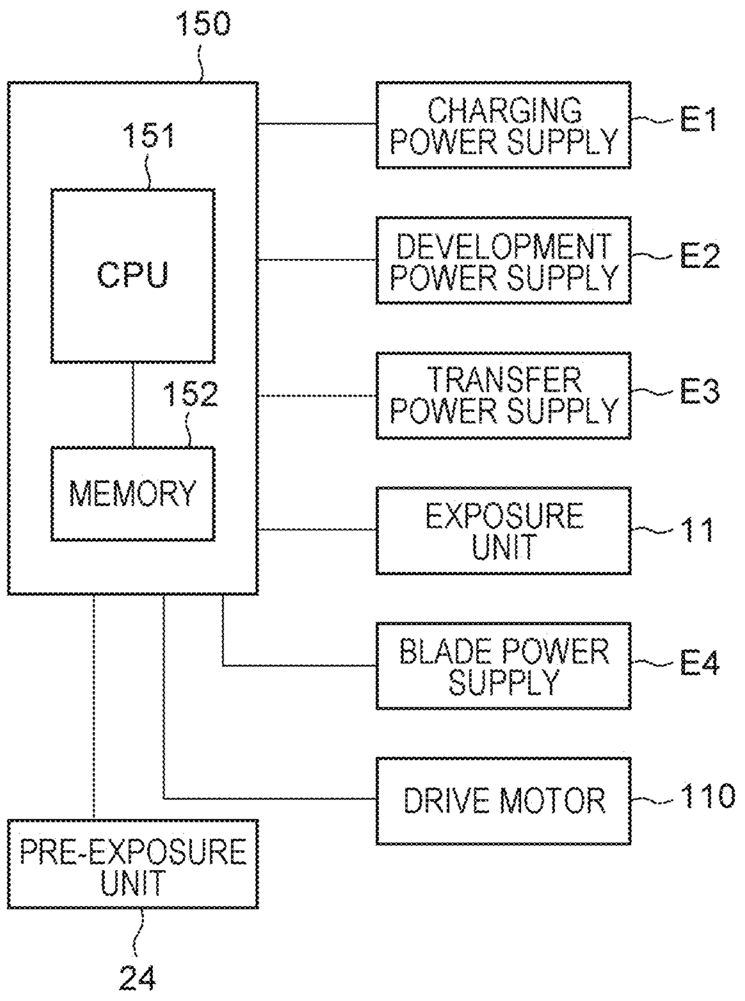
FIG. 2 is a control block diagram in Exemplary Embodiment 1.

FIG. 2 is a schematic block diagram illustrating a control mode of a principal part of the image-forming apparatus 1 according to the present exemplary embodiment. The image-forming apparatus 1 includes a controller 150. The controller 150 includes a CPU 151 as an arithmetic and control means that is a central element for performing arithmetic processing, a memory (memory element) 152 as a storage means, such as a ROM or RAM, an input/output unit (not shown) for controlling transmission and reception of signals to and from various elements coupled to the controller 150, and the like. RAM stores a detection result of a sensor, a calculation result, or the like. ROM stores a control program, a data table obtained in advance, or the like.

The controller 150 is a control means that integrally controls the operation of the image-forming apparatus 1. The controller 150 controls transmission and reception of various electrical information signals, drive timing, or the like to execute a predetermined image-forming sequence. The controller 150 is coupled to each portion of the image-forming apparatus 100. For example, in relation to the present exemplary embodiment, the controller 150 is coupled to a charging power supply E1, a development power supply E2, a transfer power supply E3, a blade power supply E4, an exposure unit 11, a drive motor 110, the pre-exposure unit 24, and the like.

3. Photosensitive Drum

The photosensitive drum 21 used in the present exemplary embodiment is described in detail below.

A photosensitive member according to the present invention includes an electrically conductive supporting member, a photosensitive layer, and a protective layer. The protective layer contains electrically conductive particles and has an electrically conductive particle content of 5.0% by volume or more and 70.0% by volume or less of the total volume of the protective layer. The protective layer characteristically has a volume resistivity of $1.0\times10^{9}$ ohm·cm or more and $1.0\times10^{14}$ ohm·cm or less. The protective layer contains a large number of electrically conductive particles but maintains relatively high volume resistivity. Thus, it is possible to inject an electric charge into a toner according to the present invention through the electrically conductive particles while ensuring charge retention capability.

An electrically conductive particle content of less than 5.0% by volume results in poorer charge injection to a toner according to the present invention. This tends to have an adverse effect in an image (roughness in a halftone image) due to toner scattering caused by charging failure at the time of development at a higher speed. On the other hand, more than 70.0% by volume results in a brittle protective layer, and the surface of the photosensitive member is therefore easily abraded through long-term use. This lowers the charging uniformity of the photosensitive member and tends to have an adverse effect in an image due to toner scattering caused by charging failure at the time of development at a higher speed. The electrically conductive particle content is more preferably 5.0% by volume or more and 40.0% by volume or less. In this preferred range, fogging in a high-temperature and high-humidity environment is also improved.

The protective layer characteristically has a volume resistivity of $1.0\times10^{9}$ ohm·cm or more and $1.0\times10^{14}$ ohm·cm or less. Less than $1.0\times10^{9}$ ohm·cm results in the protective layer with too low resistance to maintain the electric potential. More than $1.0\times10^{14}$ ohm·cm results in the protective layer with too high resistance and significantly lowered injection chargeability to toner.

The protective layer preferably has a volume resistivity of $1.0\times10^{11}$ ohm·cm or more and $1.0\times10^{14}$ ohm·cm or less. The volume resistivity of the protective layer can be controlled, for example, by the particle size of electrically conductive particles. The electrically conductive particles preferably have a volume-average particle diameter of 5 nm or more and 300 nm or less, more preferably 40 nm or more and 250 nm or less. The electrically conductive particles with a volume-average particle diameter of less than 5 nm have a large specific surface area, and moisture adsorption to the vicinity of the electrically conductive particles on the surface of the protective layer increases. Thus, the protective layer tends to have lower volume resistivity. The electrically conductive particles with a volume-average particle diameter of more than 300 nm are poorly dispersed in the protective layer, decrease the interfacial area with a binder resin, increase interfacial resistance, and tend to worsen charge injection properties.

Figure 14:
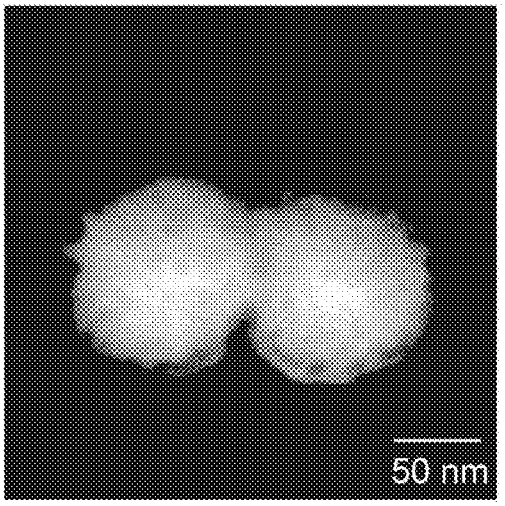
FIG. 14 is a STEM image of an example of niobium-containing titanium oxide used in Exemplary Embodiments.

The electrically conductive particles in the protective layer may be particles of a metal oxide, such as titanium oxide, zinc oxide, tin oxide, or indium oxide, preferably titanium oxide. In particular, anatase titanium oxide facilitates charge transfer in the protective layer and charge injection. The anatase titanium oxide preferably has a degree of anatase of 90% or more. The metal oxide particles may be doped with niobium, phosphorus, aluminum, or another atom, or an oxide thereof, and are particularly preferably titanium oxide particles containing niobium localized near the particle surface. Niobium localized near the surface allows an electric charge to be efficiently transferred. More specifically, in the titanium oxide particles, the concentration ratio calculated by "niobium atomic concentration/titanium atomic concentration" in the inside of 5% of the maximum diameter of the particle from the surface of each particle is 2.0 times or more the concentration ratio calculated by "niobium atomic concentration/titanium atomic concentration" in the center of each particle. The niobium atomic concentration and the titanium atomic concentration are determined with a scanning transmission electron microscope (STEM) coupled to an energy dispersive X-ray analyzer (EDS analyzer). FIG. 14 shows a STEM image of an example of niobium-containing titanium oxide particles used in Exemplary Embodiments of the present invention. Although details are described later, the niobium-containing titanium oxide particles used in Exemplary Embodiments of the present invention are produced by coating titanium oxide particles as particles before coating with niobium-containing titanium oxide and then baking the coated particles. Thus, it is thought that the coated niobium-containing titanium oxide is crystal-grown as niobium-doped titanium oxide by so-called epitaxial growth along titanium oxide crystals of the particles before coating. As shown in FIG. 14, the niobium-containing titanium oxide thus produced has a lower density near the surface than at the center of the particle and is controlled to have a core-shell morphology.

Figure 15:
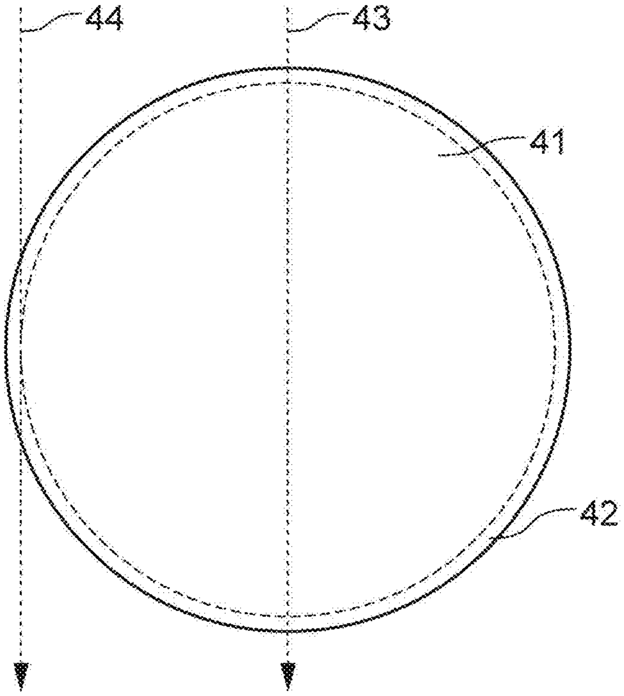
FIG. 15 is a schematic view of an example of niobium-containing titanium oxide used in Exemplary Embodiments.

The STEM image of FIG. 14 is schematically illustrated in FIG. 15. In FIG. 15, 41 denotes the central portion of an electrically conductive particle, 42 denotes the vicinity of the surface of the electrically conductive particle, 43 denotes X-rays for analyzing the central portion of the electrically conductive particle, and 44 denotes X-rays for analyzing the inside of 5% of the primary particle size from the surface of the electrically conductive particle.

In such a niobium-containing titanium oxide particle, the niobium/titanium atomic concentration ratio in the vicinity of the surface of the particle is higher than the niobium/titanium atomic concentration ratio in the central portion of the particle, and niobium atoms are localized near the particle surface. More specifically, the niobium/titanium atomic concentration ratio in the inside of 5% of the maximum diameter of the particle from the surface of the particle is 2.0 times or more the niobium/titanium atomic concentration ratio in the central portion of the particle. At a ratio of 2.0 times or more, an electric charge can move easily in the protective layer, and the charge injection properties can be enhanced. At a ratio of less than 2.0 times, it becomes difficult to transfer an electric charge.

The niobium content is preferably 0.5% by mass or more and 15.0% by mass or less, more preferably 2.6% by mass or more and 10.0% by mass or less, of the total mass of a niobium-containing titanium oxide particle.

The niobium-containing titanium oxide particle is preferably an anatase or rutile titanium oxide particle, more preferably an anatase titanium oxide particle. An anatase titanium oxide can be used to facilitate charge transfer in the protective layer and charge injection. An anatase titanium oxide particle as a particle before coating and a particle with a coating material of titanium oxide containing niobium on the surface of the particle before coating are more preferred. Using an anatase titanium oxide particle as a particle before coating and coating the surface thereof with titanium oxide containing niobium can facilitate the movement of an electric charge in the protective layer and at the same time enhance charge injection into toner. This can also reduce the decrease in the volume resistivity of the protective layer. In addition to the advantages of the present invention, this improves fogging in a high-temperature and high-humidity environment or in a low-temperature and low-humidity environment.

A detailed method for producing the protective layer is described later.

The photosensitive drum 21 is a photosensitive member formed in a cylindrical shape and has a charge injection layer 21*f* with a low electrical resistance on the outermost surface thereof.

Figure 3:
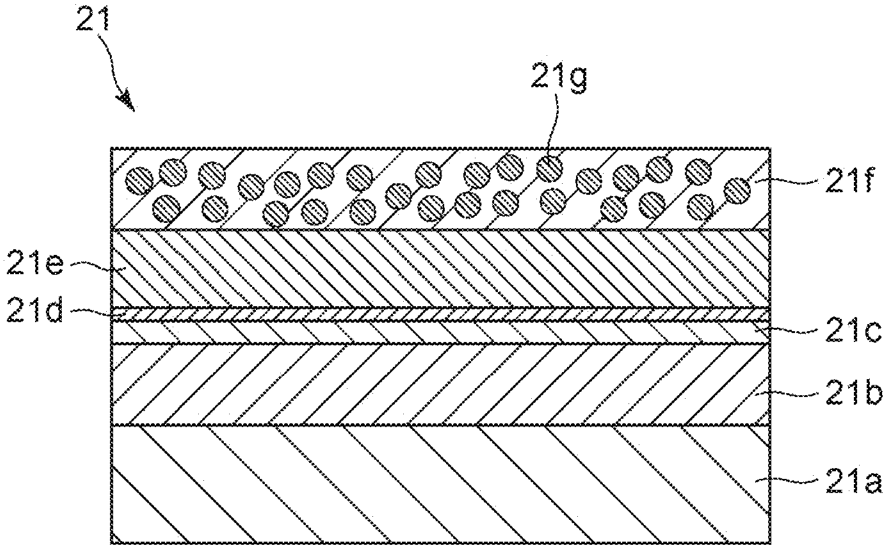
FIG. 3 is a schematic view of a layer structure of a photosensitive drum in Exemplary Embodiment 1.

FIG. 3 is a schematic cross-sectional view of the photosensitive drum 21 according to the present exemplary embodiment. The photosensitive drum 21 includes the following five functional layers, that is, first to fifth functional layers in order from the bottom on a drum-shaped base body 21*a* with a diameter of 24 mm formed of aluminum.

The first layer is an undercoat layer 21*b*, which is an electrically conductive layer with a thickness of approximately 20 μm provided for reducing a defect or the like on the aluminum drum base body 21*a* and for preventing the occurrence of moire due to reflection of laser exposure.

The second layer is a positive charge injection preventing layer 21*c*, which serves to prevent a positive charge injected from the aluminum base body 21*a* from canceling a negative charge on the photosensitive member surface. It is a layer with a thickness of approximately 1 μm whose resistance is adjusted to approximately $1\times10^6$ ohm·cm by Alamine resin and methoxymethylated nylon.

The third layer is a charge generation layer 21*d* with a thickness of approximately 0.3 μm containing a phthalocyanine pigment dispersed in a resin and generates a positive and negative charge pair when exposed to laser light.

The fourth layer is a charge transport layer 21*e* containing hydrazone dispersed in a polycarbonate resin and is a p-type semiconductor. Thus, a negative charge on the photosensitive member surface cannot move through this layer, and only a positive charge generated in the charge generation layer can be transported to the photosensitive member surface.

The fifth layer is the charge injection layer 21*f* and is a layer with a thickness of approximately 3 μm formed by dispersing electrically conductive particles 21*g* in a binder followed by curing. The binder was a photocurable acrylic resin, and the electrically conductive particles 21*g* were niobium-containing titanium oxide particles. The niobium-containing titanium oxide particle content of the charge injection layer according to the present exemplary embodiment is 35% by mass. At this time, the charge injection layer had a volume resistivity of $1.0\times10^{12}$ ohm·cm as measured by a method described later.

The purpose of providing the charge injection layer 21*f* is, for example, to construct a system for charging the photosensitive drum 21 by direct charge injection from an electrically conductive brush or a charging member containing magnetic fine particles. In such an injection charging system, the charge injection layer preferably has a volume resistivity of $1.0\times10^{14}$ ohm·cm or less to obtain sufficient direct injection chargeability. Furthermore, to appropriately form an electrostatic latent image, the charge injection layer preferably has a volume resistivity of $1.0\times10^9$ ohm·cm or more, more preferably $1.0\times10^{10}$ ohm·cm or more. To achieve both the direct injection chargeability and the formation of an electrostatic latent image, the electrically conductive particle content of the charge injection layer 21*f* preferably ranges from 5% to 70% by volume, more preferably 10% to 70% by volume, still more preferably 20% to 70% by volume. The electrically conductive particles are preferably titanium oxide particles, more preferably niobium-containing titanium oxide particles.

A method for measuring the volume resistivity of the charge injection layer 21*f* is described below.

The volume resistivity was measured in an environment of a temperature of 23.5° C. and a relative humidity of 50%. First, an interdigitated electrode with an effective electrode length of 2 cm and an interelectrode distance of 120 μm was formed by gold evaporation on an insulating supporting member, such as a glass plate. A coating liquid for the charge injection layer 21*f* was applied to the interdigitated electrode to a thickness of approximately 3 μm. A direct-current voltage of 100 V was applied to the interdigitated electrode using a resistance measuring apparatus, and the direct current flowing at that time was measured to calculate volume resistivity pp. In this measurement, the resistance measuring apparatus is preferably an apparatus for measuring a small electric current to measure a minute amount of electric current. For example, a picoammeter 4140B manufactured by Hewlett-Packard Co. or the like may be used. It is desirable to select the interdigitated electrode to be used and the voltage to be applied so that an appropriate SN ratio can be obtained depending on the material or the resistance value of the charge injection layer 21*f*.

To measure the volume resistivity of the charge injection layer 21*f* on the surface of the photosensitive drum 21 instead of the charge injection layer 21*f* alone, it is desirable to measure the surface resistivity of the charge injection layer 21*f* and convert the surface resistivity into the volume resistivity.

An interdigitated electrode with an effective electrode length of 2 cm and an interelectrode distance of 120 μm is formed by gold evaporation on the charge injection layer 21*f* formed on the surface of the photosensitive drum 21, and the direct current can be measured at a direct-current voltage of 100 V to calculate the surface resistivity $\rho_s$.

The surface resistivity $\rho_s$ can be converted using the following formula (1) to calculate the volume resistivity $\rho_p$ of the charge injection layer 21*f*.

$$\rho_p = \rho_s \times t \quad \text{formula (1)}$$

t denotes the thickness of the charge injection layer 21*f*.

In this measurement, although the charge injection layer 21*f* is formed on the charge transport layer 21*e*, the charge transport layer 21*e* has a volume resistivity of $1\times10^{15}$ ohm·cm, which is sufficiently higher than that of the charge injection layer 21*f*, and there is almost no influence on the measurement of the resistivity of the charge injection layer.

In the present exemplary embodiment, the volume resistivity $\rho_p$ measured for the charge injection layer 21*f* alone is almost the same as the volume resistivity pp converted from the surface resistivity $\rho_s$ of the charge injection layer 21*f* formed on the surface of the photosensitive drum 21.

The structure of an electrophotographic photosensitive member according to the present invention is described in detail below.

<Supporting Member>

In an electrophotographic photosensitive member according to the present invention, the supporting member is preferably an electrically conductive supporting member with electrical conductivity. The supporting member may have a cylindrical shape, a belt-like shape, a sheet-like shape, or the like. Among these, a cylindrical supporting member is preferred. A surface of the supporting member may be subjected to electrochemical treatment, such as anodic oxidation, abrasive blasting, cutting, or the like. A material of the supporting member is preferably a metal, a resin, glass, or the like. The metal may be aluminum, iron, nickel, copper, gold, stainless steel, an alloy thereof, or the like. Among these, an aluminum supporting member containing aluminum is preferred. Furthermore, it is preferable to impart electrical conductivity to the resin or glass by mixing or coating with an electrically conductive material or by another treatment.

<Electrically Conductive Layer>

In an electrophotographic photosensitive member according to the present invention, an electrically conductive layer may be provided on the supporting member. The electrically conductive layer can conceal a scratch or unevenness on the supporting member surface and control the reflection of light on the supporting member surface. The electrically conductive layer preferably contains electrically conductive particles and a resin. A material of the electrically conductive particles may be a metal oxide, a metal, carbon black, or the like.

The metal oxide may be zinc oxide, aluminum oxide, indium oxide, silicon oxide, zirconium oxide, tin oxide, titanium oxide, magnesium oxide, antimony oxide, bismuth oxide, or the like. The metal may be aluminum, nickel, iron, nichrome, copper, zinc, silver, or the like.

Among these, the electrically conductive particles are preferably made of a metal oxide, more preferably titanium oxide, tin oxide, or zinc oxide.

When a metal oxide is used as the electrically conductive particles, the surface of the metal oxide may be treated with a silane coupling agent or the like, or the metal oxide may be doped with phosphorus, aluminum, or another element, or an oxide thereof.

Furthermore, the electrically conductive particles may have a layered structure including a particle before coating and a coating material for coating the particle. The particle before coating may be titanium oxide, barium sulfate, zinc oxide, or the like. The coating material may be a metal oxide, such as tin oxide.

Furthermore, when a metal oxide is used as the electrically conductive particles, the metal oxide preferably has a volume-average particle diameter of 1 nm or more and 500 nm or less, more preferably 3 nm or more and 400 nm or less.

The resin may be a polyester resin, a polycarbonate resin, a poly(vinyl acetal) resin, an acrylic resin, a silicone resin, an epoxy resin, a melamine resin, a polyurethane resin, a phenolic resin, an alkyd resin, or the like. The electrically conductive layer may further contain a masking agent, such as silicone oil, resin particles, or titanium oxide.

The electrically conductive layer can be formed by preparing an electrically conductive layer coating liquid containing the materials described above and a solvent, forming a coating film of the coating liquid on the supporting member, and drying the coating film. The solvent in the coating liquid may be an alcohol solvent, a sulfoxide solvent, a ketone solvent, an ether solvent, an ester solvent, an aromatic hydrocarbon solvent, or the like. A dispersion method for dispersing electrically conductive particles in the electrically conductive layer coating liquid may be a method using a paint shaker, a sand mill, a ball mill, or a liquid-collision-type high-speed dispersing apparatus.

The electrically conductive layer preferably has an average thickness of 1 μm or more and 40 μm or less, particularly preferably 3 μm or more and 30 μm or less.

<Undercoat Layer>

In an electrophotographic photosensitive member according to the present invention, an undercoat layer may be provided on the supporting member or the electrically conductive layer. The undercoat layer can enhance an interlayer adhesion function and impart a charge injection blocking function.

The undercoat layer preferably contains a resin. Furthermore, a composition containing a monomer with a polymerizable functional group may be polymerized to form the undercoat layer as a cured film.

The resin may be a polyester resin, a polycarbonate resin, a poly(vinyl acetal) resin, an acrylic resin, an epoxy resin, a melamine resin, a polyurethane resin, a phenolic resin, a polyvinylphenol resin, an alkyd resin, a poly(vinyl alcohol) resin, a poly(ethylene oxide) resin, a poly(propylene oxide) resin, a polyamide resin, a poly(amic acid) resin, a polyimide resin, a polyamideimide resin, a cellulose resin, or the like.

The polymerizable functional group in the monomer with the polymerizable functional group may be an isocyanate group, a blocked isocyanate group, a methylol group, an alkylated methylol group, an epoxy group, a metal alkoxide group, a hydroxy group, an amino group, a carboxy group, a thiol group, a carboxylic anhydride group, a carbon-carbon double bond group, or the like.

Furthermore, the undercoat layer may further contain an electron transport material, a metal oxide, a metal, an electrically conductive polymer, or the like to enhance electrical characteristics. Among these, an electron transport material and a metal oxide are preferably used.

The electron transport material may be a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, a boron-containing compound, or the like. The undercoat layer may be formed as a cured film by using an electron transport material with a polymerizable functional group as the electron transport material and copolymerizing the electron transport material and the monomer with a polymerizable functional group.

The metal oxide may be indium tin oxide, tin oxide, indium oxide, titanium oxide, zinc oxide, aluminum oxide, silicon dioxide, or the like. The metal may be gold, silver, aluminum, or the like.

Metal oxide particles contained in the undercoat layer may be surface-treated with a surface treatment agent, such as a silane coupling agent.

The metal oxide particles may be surface-treated by a general method. For example, a dry method or a wet method may be mentioned.

In the dry method, while the metal oxide particles are stirred in a mixer capable of high-speed stirring, such as a Henschel mixer, an aqueous alcohol, an organic solvent solution, or an aqueous solution containing a surface treatment agent is added, uniformly dispersed, and then dried.

In the wet method, the metal oxide particles and a surface treatment agent in a solvent are stirred or dispersed with glass beads or the like in a sand mill or the like. The dispersion is followed by filtration or vacuum distillation to remove the solvent. After removal of the solvent, baking is preferably further performed at 100° C. or more.

The undercoat layer may further contain an additive agent, for example, a known material, such as a metal powder of aluminum or the like, an electrically conductive material, such as carbon black, a charge transport material, a metal chelate compound, or an organometallic compound.

The charge transport material may be a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, a boron-containing compound, or the like. The undercoat layer may be formed as a cured film by using a charge transport material with a polymerizable functional group as the charge transport material and copolymerizing the charge transport material and the monomer with a polymerizable functional group.

The undercoat layer can be formed by preparing an undercoat layer coating liquid containing the materials described above and a solvent, forming a coating film of the coating liquid on the supporting member or the electrically conductive layer, and drying and/or curing the coating film.

The solvent for use in the undercoat layer coating liquid may be an organic solvent, such as an alcohol, a sulfoxide, a ketone, an ether, an ester, an aliphatic halogenated hydrocarbon, or an aromatic compound. In the present invention, an alcohol or ketone solvent is preferably used.

The undercoat layer coating liquid may be prepared by a dispersion method using a homogenizer, an ultrasonic homogenizer, a ball mill, a sand mill, a rolling mill, a vibrating mill, an attritor, or a liquid-collision-type high-speed dispersing apparatus.

<Photosensitive Layer>

The photosensitive layer of the electrophotographic photosensitive member is mainly classified into (1) a multilayer photosensitive layer and (2) a monolayer photosensitive layer. (1) The multilayer photosensitive layer is a photosensitive layer including a charge generation layer containing a charge generation material and a charge transport layer containing a charge transport material. (2) The monolayer photosensitive layer is a photosensitive layer containing both a charge generation material and a charge transport material.

(1) Multilayer Photosensitive Layer

The multilayer photosensitive layer includes the charge generation layer and the charge transport layer.

(1-1) Charge Generation Layer

The charge generation layer preferably contains the charge generation material and a resin.

The charge generation material may be an azo pigment, a perylene pigment, a polycyclic quinone pigment, an indigo pigment, a phthalocyanine pigment, or the like. Among these, an azo pigment and a phthalocyanine pigment are preferred. The phthalocyanine pigment is preferably an oxytitanium phthalocyanine pigment, a chlorogallium phthalocyanine pigment, or a hydroxygallium phthalocyanine pigment.

The charge generation material content of the charge generation layer is preferably 40% by mass or more and 85% by mass or less, more preferably 60% by mass or more and 80% by mass or less, of the total mass of the charge generation layer.

The resin may be a polyester resin, a polycarbonate resin, a poly(vinyl acetal) resin, a poly(vinyl butyral) resin, an acrylic resin, a silicone resin, an epoxy resin, a melamine resin, a polyurethane resin, a phenolic resin, a poly(vinyl alcohol) resin, a cellulose resin, a polystyrene resin, a poly(vinyl acetate) resin, a poly(vinyl chloride) resin, or the like. Among these, a poly(vinyl butyral) resin is more preferred.

The charge generation layer may further contain an additive agent, such as an antioxidant or an ultraviolet absorber. Specific examples thereof include a hindered phenol compound, a hindered amine compound, a sulfur compound, a phosphorus compound, and a benzophenone compound.

The charge generation layer can be formed by preparing a charge generation layer coating liquid containing the materials described above and a solvent, forming a coating film of the coating liquid on the undercoat layer, and drying the coating film. The solvent in the coating liquid may be an alcohol solvent, a sulfoxide solvent, a ketone solvent, an ether solvent, an ester solvent, an aromatic hydrocarbon solvent, or the like.

The charge generation layer has an average thickness of 0.1 μm or more and 1 μm or less, more preferably 0.15 μm or more and 0.4 μm or less.

(1-2) Charge Transport Layer

The charge transport layer preferably contains the charge transport material and a resin.

The charge transport material may be, for example, a polycyclic aromatic compound, a heterocyclic compound, a hydrazone compound, a styryl compound, an enamine compound, a benzidine compound, a triarylamine compound, a resin with a group derived from these materials, or the like. Among these, a triarylamine compound and a benzidine compound are preferred.

The charge transport material content of the charge transport layer is preferably 25% by mass or more and 70% by mass or less, more preferably 30% by mass or more and 55% by mass or less, of the total mass of the charge transport layer.

The resin may be a polyester resin, a polycarbonate resin, an acrylic resin, a polystyrene resin, or the like. Among these, a polycarbonate resin and a polyester resin are preferred. The polyester resin is particularly preferably a polyarylate resin.

The ratio (mass ratio) of the charge transport material content to the resin content preferably ranges from 4:10 to 20:10, more preferably 5:10 to 12:10.

The charge transport layer may contain an additive agent, such as an antioxidant, an ultraviolet absorber, a plasticizer, a leveling agent, a lubricant, or an abrasion resistance improver. Specific examples thereof include a hindered phenol compound, a hindered amine compound, a sulfur compound, a phosphorus compound, a benzophenone compound, a siloxane-modified resin, a silicone oil, fluoropolymer particles, polystyrene resin particles, polyethylene resin particles, silica particles, alumina particles, and boron nitride particles.

The charge transport layer can be formed by preparing a charge transport layer coating liquid containing the materials described above and a solvent, forming a coating film of the coating liquid on the charge generation layer, and drying the coating film. The solvent in the coating liquid may be an alcohol solvent, a ketone solvent, an ether solvent, an ester solvent, or an aromatic hydrocarbon solvent. Among these solvents, an ether solvent or an aromatic hydrocarbon solvent is preferred.

The charge transport layer preferably has an average thickness of 3 μm or more and 50 μm or less, more preferably 5 μm or more and 40 μm or less, particularly preferably 10 μm or more and 30 μm or less.

(2) Monolayer Photosensitive Layer

The monolayer photosensitive layer can be formed by preparing a photosensitive layer coating liquid containing a charge generation material, a charge transport material, a resin, and a solvent, forming a coating film of the coating liquid on the undercoat layer, and drying the coating film. The charge generation material, the charge transport material, and the resin are the same as the examples of the materials in "(1) Multilayer Photosensitive Layer" described above.

<Protective Layer>

The protective layer may contain a polymer of a compound with a polymerizable functional group and a resin.

The polymerizable functional group may be an isocyanate group, a blocked isocyanate group, a methylol group, an alkylated methylol group, an epoxy group, a metal alkoxide group, a hydroxy group, an amino group, a carboxy group, a thiol group, a carboxylic anhydride group, a carbon-carbon double bond group, an alkoxysilyl group, a silanol group, or the like. The compound with a polymerizable functional group may be a monomer with charge transport ability.

The resin may be a polyester resin, an acrylic resin, a phenoxy resin, a polycarbonate resin, a polystyrene resin, a phenolic resin, a melamine resin, an epoxy resin, or the like. Among these, an acrylic resin is preferred.

The material and the particle size of the electrically conductive particles contained in the protective layer are as described above. From the perspective of dispersibility and liquid stability, the surface of the metal oxide is preferably treated with a silane coupling agent or the like.

The protective layer may contain an additive agent, such as an antioxidant, an ultraviolet absorber, a plasticizer, a leveling agent, a lubricant, or an abrasion resistance improver. Specific examples thereof include a hindered phenol compound, a hindered amine compound, a sulfur compound, a phosphorus compound, a benzophenone compound, a siloxane-modified resin, a silicone oil, fluoropolymer particles, polystyrene resin particles, polyethylene resin particles, silica particles, alumina particles, and boron nitride particles.

The protective layer can be formed by preparing a protective layer coating liquid containing the materials described above and a solvent, forming a coating film of the coating liquid on the photosensitive layer, and drying and/or curing the coating film. The solvent in the coating liquid may be an alcohol solvent, a ketone solvent, an ether solvent, a sulfoxide solvent, an ester solvent, or an aromatic hydrocarbon solvent.

The protective layer preferably has an average thickness of 0.2 μm or more and 5 μm or less, more preferably 0.5 μm or more and 3 μm or less.

Although the organic photosensitive drum with the organic photosensitive layer is described as an example in the present exemplary embodiment, it is also possible to use, for example, an inorganic photosensitive drum containing amorphous silicon as a photosensitive member or a monolayer drum as described above coated with a mixed material of a charge generation material and a charge transport material.

A method for measuring a protective layer and electrically conductive particles of a photosensitive drum according to the present invention is described below.

<Calculation of Primary Particle Size of Electrically Conductive Particles>

First, the entire photosensitive drum was immersed in methyl ethyl ketone (MEK) in a graduated cylinder and was irradiated with ultrasonic waves to remove a resin layer, and then the base body of the photosensitive drum was taken out. Next, insoluble matter not dissolved in MEK (the photosensitive layer and the protective layer containing the electrically conductive particles) was filtered and dried in a vacuum dryer. Furthermore, the resulting solid was suspended in a mixed solvent of tetrahydrofuran (THF)/methylal at a volume ratio of 1:1, insoluble matter was filtered off, and the filter residue was collected and dried in a vacuum dryer. The electrically conductive particles and a resin of the protective layer were obtained by this operation. Furthermore, the filter residue was heated to 500° C. in an electric furnace so that the solid was only the electrically conductive particles, and the electrically conductive particles were collected. A plurality of photosensitive drums were treated in the same manner to obtain an amount of electrically conductive particles required for measurement.

The collected electrically conductive particles were partially dispersed in isopropanol (IPA), the dispersion liquid was dropped on a grid mesh with a support member (Cu150J manufactured by JEOL Ltd.), and the electrically conductive particles were observed with a scanning transmission electron microscope (JEM 2800 manufactured by JEOL Ltd.) in a STEM mode. To easily calculate the particle size of the electrically conductive particles, the observation was performed at a magnification in the range of 500,000 to 1,200,000, and STEM images of 100 electrically conductive particles were taken. At this time, the accelerating voltage was 200 kV, the probe size was 1 nm, and the image size was 1024×1024 pixels. The STEM images were used to measure the primary particle size using image-processing software "Image-Pro Plus (available from Media Cybernetics, Inc.)". First, a scale bar displayed in a lower portion of each STEM image is selected using a straight line tool (Straight Line) of a toolbar. In this state, "Set Scale" of the "Analyze" menu is selected to open a new window and input the pixel distance of the selected straight line in the "Distance in Pixels" column. The value (for example, 100) of the scale bar is input to the "Known Distance" column of the window, the unit (for example, nm) of the scale bar is input to the "Unit of Measurement" column, and OK is clicked to complete the scale setting. Next, a straight line was drawn with the straight line tool so as to be the maximum diameter of the electrically conductive particles, and the particle size was calculated. The same operation was performed on 100 electrically conductive particles, and the number-average value of the obtained values (maximum diameters) was defined as the primary particle size of the electrically conductive particles.

<Calculation of Niobium/Titanium Atomic Concentration Ratio>

A 5-mm square sample was cut out from the photosensitive member and was cut with an ultrasonic ultramicrotome (UC7 manufactured by Leica) to a thickness of 200 nm at a cutting speed of 0.6 mm/s to prepare a thin sample. The thin sample was observed with the scanning transmission electron microscope (JEM 2800 manufactured by JEOL Ltd.) coupled to an energy dispersive X-ray analyzer (EDS analyzer) in the STEM mode at a magnification in the range of 500,000 to 1,200,000.

Among the cross sections of the electrically conductive particles observed, cross sections of electrically conductive particles with a maximum diameter of approximately 0.9 times or more and 1.1 times or less the primary particle size calculated above were visually selected. Subsequently, spectra of constituent elements in the cross sections of the selected electrically conductive particles were collected with the EDS analyzer to prepare an EDS mapping image.

Spectra were collected and analyzed using NSS (Thermo Fischer Scientific). The collection conditions were an accelerating voltage of 200 kV, a probe size of 1.0 nm or 1.5 nm appropriately selected so that the dead time was 15 or more and 30 or less, a mapping resolution of 256×256, and a number of frames of 300. The EDS mapping image was obtained for 100 cross sections of the electrically conductive particles.

The EDS mapping image thus obtained is analyzed to calculate the ratio of the niobium atomic concentration (atomic percent) to the titanium atomic concentration (atomic percent) at the central portion of the particle and in the inside of 5% of the maximum diameter of the measured particle from the particle surface. More specifically, first, the "Line Extraction" button of NSS is pressed, and a straight line is drawn so as to be the maximum diameter of the particle to obtain information of the atomic concentration (atomic percent) on the straight line from one surface to the other surface through the inside of the particle. When the maximum diameter of the particle obtained at this time was in the range of less than 0.9 times or more than 1.1 times the primary particle size calculated above, the particle was not subjected to the subsequent analysis. (Only particles with a maximum diameter in the range of 0.9 times or more and less than 1.1 times the primary particle size were subjected to the following analysis.) Next, the niobium atomic concentration (atomic percent) in the inside of 5% of the maximum diameter of the measured particle from the particle surface is read on the particle surfaces on both sides. In the same manner, "the titanium atomic concentration (atomic percent) in the inside of 5% of the maximum diameter of the measured particle from the particle surface" is determined. These values were then used to obtain "the concentration ratio of the niobium atom to the titanium atom in the inside of 5% of the maximum diameter of the measured particle from the particle surface" on the particle surfaces on both sides using the following formula:

Concentration ratio of niobium atom to titanium atom in inside of 5% of maximum diameter of measured particle from particle surface=(niobium atomic concentration (atomic percent) in inside of 5% of maximum diameter of measured particle from particle surface)/(titanium atomic concentration (atomic percent) in inside of 5% of maximum diameter of measured particle from particle surface)

Of the two concentration ratios thus determined, the smaller concentration ratio is adopted as "the concentration ratio of the niobium atom to the titanium atom in the inside of 5% of the maximum diameter of the measured particle from the particle surface" in the present invention.

Furthermore, the niobium atomic concentration (atomic percent) and the titanium atomic concentration (atomic percent) are read at the midpoint of the maximum diameter on the straight line. These values are used to determine "the concentration ratio of the niobium atom to the titanium atom in the central portion of the particle" using the following formula:

Concentration ratio of niobium atom to titanium atom in central portion of particle=(niobium atomic concentration (atomic percent) in central portion of particle)/(titanium atomic concentration (atomic percent) in central portion of particle)

"The concentration ratio calculated by niobium atomic concentration/titanium atomic concentration in the inside of 5% of the maximum diameter of the measured particle from the particle surface with respect to the concentration ratio calculated by niobium atomic concentration/titanium atomic concentration in the central portion of the particle" is calculated using the following formula:

(Concentration ratio of niobium atom to titanium atom in inside of 5% of maximum diameter of measured particle from particle surface)/(concentration ratio of niobium atom to titanium atom in central portion of particle)

(2) <Calculation of Electrically Conductive Particle Content>

Next, four 5-mm square samples were cut out from the photosensitive member, and the protective layer was three dimensionally shown in the size of 2 μm×2 μm×2 μm using Slice & View of FIB-SEM. The electrically conductive particle content in the total volume of the protective layer was calculated from the difference in contrast of Slice & View of FIB-SEM. The conditions of Slice & View were as follows:

Processing of specimen for analysis: FIB method
Processing and observation apparatus: NVision 40 manufactured by SII/Zeiss
Slice interval: 10 nm
Observation conditions:
Accelerating voltage: 1.0 kV
Specimen inclination: 54 degrees
WD: 5 mm
Detector: BSE detector
Aperture: 60 μm, high current
ABC: ON
Image resolution: 1.25 nm/pixel The analysis region is 2 μm in length×2 μm in width, and the information for each cross section is integrated to determine the volume V per 2 μm in length×2 μm in width×2 μm in thickness (8 $\mu m^3$). The measurement environment includes a temperature of 23° C. and a pressure of 1×10-4 Pa. The processing and observation apparatus may also be Strata 400S (specimen inclination: 52 degrees) manufactured by FEI. Furthermore, the information for each cross section was obtained by image analysis of the specified area of an electrically conductive particle according to the present invention. The image analysis was performed using image-processing software Image-Pro Plus available from Media Cybernetics, Inc.

On the basis of the obtained information, the volume V of an electrically conductive particle according to the present invention in the volume of 2 μm×2 μm×2 μm (unit volume: 8 $\mu m^3$) was determined for each of the four samples to calculate the electrically conductive particle content [% by volume](=V μm³/8 μm3×100). The average value of the electrically conductive particle contents of the four samples was defined as the electrically conductive particle content [% by volume] of the present invention in the protective layer based on the total volume of the protective layer.

At this time, all the four samples were processed up to the boundary between the protective layer and the lower layer to measure the thickness t (cm) of the protective layer, and the thickness of the protective layer was used to calculate the volume resistivity $\rho_s$ in the following <Method for Measuring Volume Resistivity of Protective Layer>.

<Method for Measuring Volume Resistivity of Protective Layer>

Figure 4:
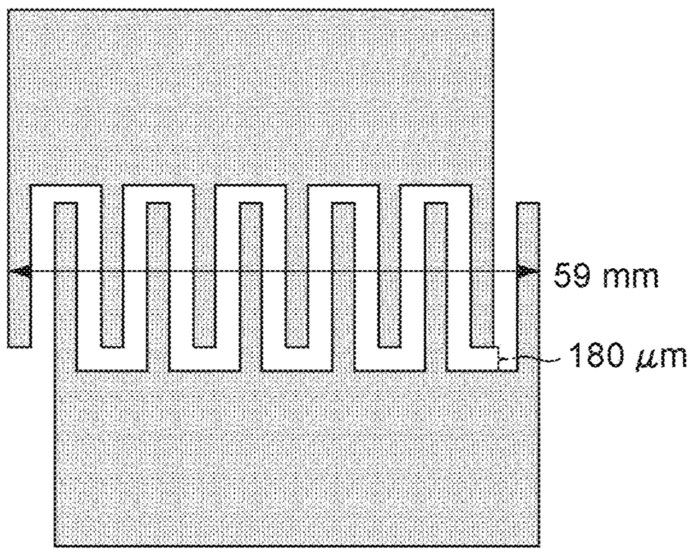
FIG. 4 is a measurement sample of the volume resistivity of a protective layer in Exemplary Embodiment 1.

For the measurement of the volume resistivity in the present invention, a picoampere meter (pA) was used. First, as illustrated in FIG. 4, interdigitated gold electrodes with an interelectrode distance (D) of 180 μm and a length (L) of 5.9 cm are formed on a PET film by vapor deposition, and a protective layer with a thickness (T1) of 2 μm is formed on the interdigitated gold electrodes. Next, a direct-current (I) was measured when a direct-current voltage (V) of 100 V was applied between the interdigitated electrodes in an environment of a temperature of 23° C. and a humidity of 50% RH, and the volume resistivity (temperature: 23° C./humidity: 50% RH) was calculated using the following formula (2):

$$\text{Volume resistivity } \rho_p \text{ (ohm·cm)} = V(V) \times T1(\text{cm}) \times L(\text{cm})/\{I(A) \times D(\text{cm})\} \quad \text{formula (2)}$$

When it is difficult to identify the composition of the electrically conductive particles, the binder resin, or the like in the protective layer, the surface resistivity of the surface of the electrophotographic photosensitive member is measured and converted into the volume resistivity. To measure the volume resistivity of the protective layer formed on the photosensitive member surface rather than the protective layer alone, it is desirable to measure the surface resistivity of the protective layer and convert it into volume resistivity. Interdigitated electrodes are formed by gold evaporation on the protective layer formed on the photosensitive member, and a constant direct-current voltage can be applied to measure the direct current and calculate the surface resistivity $\rho_s$ using the following formula (1):

$$\rho_p = \rho_s \times t \quad \text{formula (1)}$$

(t denotes the thickness of the charge injection layer)

In this measurement, the resistance measuring apparatus is preferably an apparatus for measuring a small electric current to measure a minute amount of electric current. For example, the picoammeter 4140B manufactured by Hewlett-Packard Co. or the like may be used. It is desirable to select the interdigitated electrodes to be used and the voltage to be applied so that an appropriate SN ratio can be obtained depending on the material or the resistance value of the charge injection layer.

The volume resistivity of the monolayer drum may be measured with a resistance measuring apparatus by attaching a copper tape with a certain area (for example, model No. 1181 manufactured by Sumitomo 3M Ltd.) as an upper electrode to the surface of the photosensitive drum and using a metal supporting member of the photosensitive drum as a lower electrode.

Although the photosensitive drum 21 is charged with an electric charge with a negative polarity as an example in the present exemplary embodiment, the photosensitive drum 21 may also be charged with an electric charge with a positive polarity, and the positively charged toner may also be used. In other words, the normal polarity of the toner may be a positive polarity. The polarity of the toner is described later.

The relationship between the volume resistivities of the photosensitive drum 21 and the developing roller 31 is described later.

Production Example of Electrophotographic Photosensitive Member

Production Example of Titanium Oxide

Anatase titanium oxide particles as electrically conductive particles according to the present invention can be produced by a known sulfuric acid method. More specifically, they can be produced by heating and hydrolyzing a solution containing titanium sulfate and titanyl sulfate to prepare a hydrous titanium dioxide slurry and dehydrating and baking the titanium dioxide slurry.

Production Example of Anatase Titanium Oxide Particles 1

Titanium oxide particles according to the present invention preferably have a degree of anatase in the range of 90% to 100%, and titanium oxide particles with a degree of anatase of approximately 100% can be produced by the following method.

The degree of anatase is a value obtained by measuring the intensity IA of the strongest interference line of anatase (Miller indices: 101) and the intensity IR of the strongest interference line of rutile (Miller indices: 110) in powder X-ray diffraction of titanium oxide particles and calculating the value by the following formula:

$$\text{Degree of anatase (\%)} = 100/(1 + 1.265 \times IR/IA)$$

In the present invention, anatase titanium oxide particles were produced by heating and hydrolyzing a solution containing titanyl sulfate to prepare a hydrous titanium dioxide slurry and dehydrating and baking the hydrous titanium dioxide slurry. The concentration of the titanyl sulfate solution was controlled to control the number-average particle diameter and thereby produce anatase titanium oxide particles 1 with a number-average particle diameter of 150 nm.

<Production of Electrically Conductive Particles>

(Production of Electrically Conductive Particles 1)

Production Example of Niobium-Atom-Containing Titanium Oxide Particles 1

100 g of titanium oxide particles 1 were dispersed in water to prepare 1 L of an aqueous suspension, which was then heated to 60° C. A titanium niobic acid liquid (the mass ratio of niobium to titanium in the liquid was 1.0/33.7) prepared by mixing a niobium solution containing 3 g of niobium pentachloride (NbCl5) dissolved in 100 mL of 11.4 mol/L hydrochloric acid and 600 mL of a titanium sulfate solution containing 33.7 g of titanium, and 10.7 mol/L aqueous sodium hydroxide were simultaneously added dropwise (added in parallel) to the aqueous suspension over 3 hours such that the suspension had a pH in the range of 2 to 3. After completion of the dropwise addition, the suspension was filtered, washed, and dried at 110° C. for 8 hours. The dried product was subjected to heat treatment (baking treatment) in an air atmosphere at 800° C. for 1 hour to produce niobium-atom-containing titanium oxide particles 1 in which niobium atoms were localized near the surface. Table 1 shows the physical properties of the niobium-atom-containing titanium oxide particles 1.

Next,

| | |
|---|---|
| Niobium-containing titanium oxide particles 1 | 100.0 parts |
| Surface treatment agent 1 (the following formula (S-1)) (trade name: KBM-3033, manufactured by Shin-Etsu Chemical Co., Ltd.) | 3.0 parts |
| [Chem. 1] 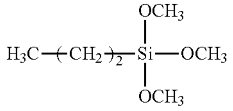 (S-1) | |
| Toluene | 200.0 parts |

These were mixed, stirred for 4 hours with a mixer, filtered, washed, and further subjected to heat treatment at 130° C. for 3 hours to produce electrically conductive particles 1. Table 1 shows physical properties of the electrically conductive particles 1. The niobium atom content in Table 1 is the niobium atom content of the electrically conductive particles and is a value measured by X-ray fluorescence elemental analysis (XRF).

TABLE 1

| | Particles | Surface treatment agent | A/B | Niobium atom content (mass %) |
|---|---|---|---|---|
| Electrically conductive particles 1 | Niobium-atom-containing titanium oxide particles 1 | Formula (S-1) | 7.9 | 5.0 |

In the table, A denotes "the concentration ratio of the niobium atom to the titanium atom in the inside of 5% of the maximum diameter of the measured particle from the particle surface", and B denotes "the concentration ratio of the niobium atom to the titanium atom in the central portion of the particle".

Production Example 1 of Electrophotographic Photosensitive Member

An aluminum cylinder (JIS A 3003, aluminum alloy) with a diameter of 24 mm and a length of 257.5 mm was used as a supporting member (electrically conductive supporting member).

Production Example 1 of Electrically Conductive Layer

Next, the following materials were prepared.

| | |
|---|---|
| Titanium oxide ($TiO_2$) particles coated with oxygen-deficient tin oxide ($SnO_2$) as metal oxide particles (volume-average particle diameter: 230 nm) | 214 parts |
| Phenolic resin as binding material (phenolic resin monomer/oligomer) (trade name: Plyophen J-325, manufactured by DIC Corporation, resin solid content: 60% by mass) | 132 parts |
| 1-methoxy-2-propanol as solvent | 98 parts |

These were dispersed with 450 parts of glass beads with a diameter of 0.8 mm in a sand mill under the conditions of a rotational speed of 2000 rpm, a dispersion processing time of 4.5 hours, and a set temperature of cooling water of 18° C. to prepare a dispersion liquid. The glass beads were removed from the dispersion liquid using a mesh (opening: 150 μm).

Silicone resin particles (trade name: Tospearl 120, manufactured by Momentive Performance Materials Inc., average particle size: 2 μm) were added as a surface roughening material to the dispersion liquid. The amount of silicone resin particles added was 10% by mass of the total mass of the metal oxide particles and the binding material in the dispersion liquid from which the glass beads had been removed. Furthermore, a silicone oil (trade name: SH28PA, manufactured by Dow Corning Toray Co., Ltd.) was added as a leveling agent to the dispersion liquid so as to be 0.01% by mass of the total mass of the metal oxide particles and the binding material in the dispersion liquid.

Next, a mixed solvent of methanol and 1-methoxy-2-propanol (mass ratio: 1:1) was added to the dispersion liquid such that the total mass of the metal oxide particles, the binding material, and the surface roughening material in the dispersion liquid (that is, the mass of the solid components) was 67% by mass of the mass of the dispersion liquid. The mixture was then stirred to prepare an electrically conductive layer coating liquid.

The electrically conductive layer coating liquid was applied by dip coating to the supporting member and was heated at 140° C. for 1 hour to form an electrically conductive layer with a thickness of 30 μm.

Production Example 1 of Undercoat Layer

Next, the following materials were prepared.

| | |
|---|---|
| Electron transport material represented by the following formula (E-1) | 3.11 parts |
| Blocked isocyanate (trade name: Duranate SBB-70P, manufactured by Asahi Kasei Chemicals Corporation) | 6.49 parts |
| Styrene-acrylic resin (trade name: UC-3920, manufactured by Toagosei Co., Ltd.) | 0.4 parts |
| Silica slurry (product name: IPA-ST-UP, manufactured by Nissan Chemical Industries, Ltd., solid concentration: 15% by mass, viscosity: 9 mPa · s) | 1.8 parts |

These were dissolved in a mixed solvent of 48 parts of 1-butanol and 24 parts of acetone to prepare an undercoat layer coating liquid. The undercoat layer coating liquid was applied by dip coating to the electrically conductive layer and was heated at 170° C. for 30 minutes to form an undercoat layer with a thickness of 0.7 μm.

[Chem. 2]

(E-1)

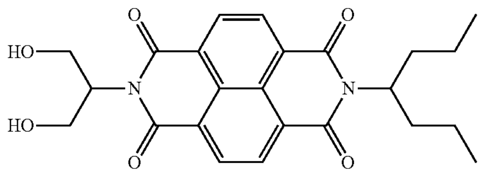

Next, 10 parts of hydroxygallium phthalocyanine with a crystal form having peaks at positions of 7.5 degrees and 28.4 degrees in a chart obtained by CuKα characteristic X-ray diffraction and 5 parts of a poly(vinyl butyral) resin (trade name: S-Lec BX-1, manufactured by Sekisui Chemical Co., Ltd.) were prepared.

These were added to 200 parts of cyclohexanone and were dispersed for 6 hours in a sand mill apparatus using glass beads with a diameter of 0.9 mm. 150 parts of cyclohexanone and 350 parts of ethyl acetate were further added to this for dilution to prepare a charge generation layer coating liquid.

The coating liquid was applied by dip coating to the undercoat layer and was dried at 95° C. for 10 minutes to form a charge generation layer with a thickness of 0.20 μm.

The X-ray diffraction measurement was performed under the following conditions.

[Powder X-Ray Diffractometry]

Measuring instrument: X-ray diffractometer RINT-TTR II manufactured by Rigaku Corp.

X-ray tube: Cu

Tube voltage: 50 kV

Tube current: 300 mA

Scanning method: 2θ/θ scan

Scanning speed: 4.0 degrees/minute

Sampling intervals: 0.02 degrees

Start angle (2θ): 5.0 degrees

Stop angle (2θ): 40.0 degrees

Attachment: standard sample holder

Filter: not used

Incident monochromator: used

Counter monochromator: not used

Divergence slit: open

Divergence height-limiting slit: 10.00 mm

Scattering slit: open

Light-receiving slit: open

Flat monochromator: used

Counter: scintillation counter

Production Example 1 of Photosensitive Layer

Next, the following materials were prepared.

| | |
|---|---|
| Charge transport material (hole transport material) represented by the following formula (C-1) | 6 parts |
| Charge transport material (hole transport material) represented by the following formula (C-2) | 3 parts |
| Charge transport material (hole transport material) represented by the following formula (C-3) | 1 part |
| Polycarbonate (trade name: Iupilon Z400, manufactured by Mitsubishi Engineering-Plastics Corporation) | 10 parts |
| Polycarbonate resin with copolymerization units of the following formula (C-4) and the following formula (C-5) (x/y = 0.95/0.05: viscosity-average molecular weight = 20000) | 0.02 parts |

These were dissolved in a mixed solvent of 25 parts of ortho-xylene/25 parts of methyl benzoate/25 parts of dimethoxymethane to prepare a charge transport layer coating liquid. The charge transport layer coating liquid was applied by dip coating to the charge generation layer to form a coating film, which was dried at 120° C. for 30 minutes to form a charge transport layer with a thickness of 12 μm.

[Chem. 3]

(C-1)

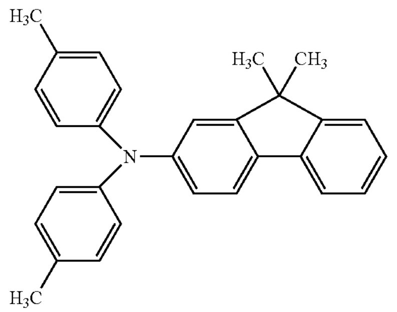

[Chem. 4]

(C-2)

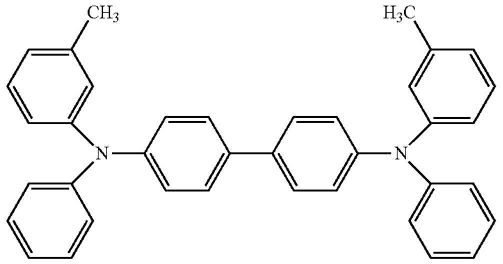

[Chem. 5]

(C-3)

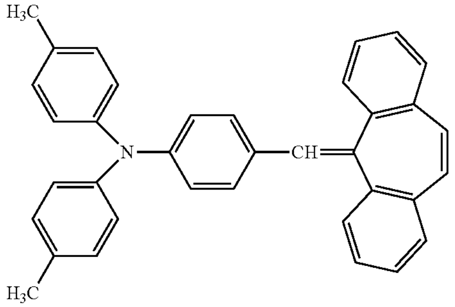

[Chem. 6]

(C-4)

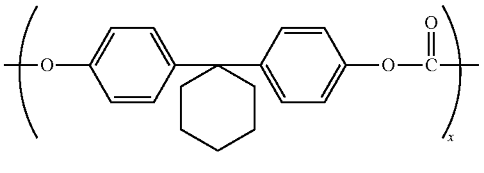

[Chem. 7]

(C-5)

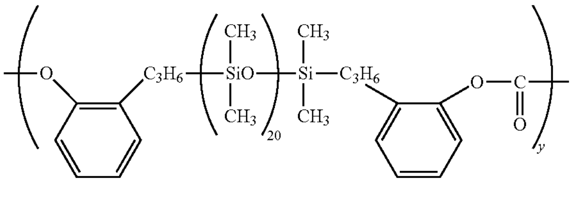

Production Example 1 of Protective Layer

Next, the following materials were prepared.

| | |
|---|---|
| Compound represented by the following structural formula (O-1) as binder resin | 100.0 parts |
| Niobium-containing titanium oxide particles subjected to the surface treatment as electrically conductive particles 1 | 66.7 parts |

These were mixed in a mixed solvent of 100 parts of 1-propanol/100 parts of cyclohexane and were stirred with a mixer for 6 hours. Thus, a protective layer coating liquid was prepared.

The protective layer coating liquid was applied by dip coating to the charge transport layer to form a coating film, which was dried at 50° C. for 6 minutes. The coating film was then irradiated with an electron beam for 1.6 seconds in a nitrogen atmosphere under the conditions of an accelerating voltage of 70 kV and a beam current of 5.0 mA while rotating the supporting member (an object to be irradiated) at a speed of 300 rpm. The dose at the protective layer position was 15 kGy.

The temperature of the coating film was then increased to 117° C. in a nitrogen atmosphere. The oxygen concentration from the electron-beam irradiation to the subsequent heat treatment was 10 ppm.

Next, the coating film was naturally cooled to 25° C. in the atmosphere and was then heat-treated at 120° C. for 1 hour to form a protective layer with a thickness of 2 μm. Thus, an electrophotographic photosensitive member 1 was produced.

[Chem. 8]

(O-1)

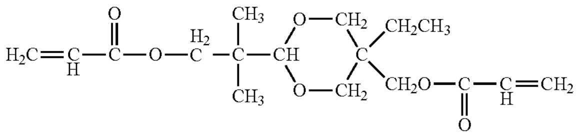

4. Toner

<Electrically Conductive Material>

A toner according to the present exemplary embodiment contains an electrically conductive material with a volume resistance of $1\times10^{11}$ ohm·cm or less on the outermost surface thereof.

A specific electrically conductive material may be a known metal, metal oxide, metal salt, or electrically conductive polymer. For example, the metal oxide may be titanium oxide, aluminum oxide, iron oxide, tin oxide, strontium titanate, or the like, and the metal salt may be a metal phosphate, a metal sulfate, a metal carbonate, or the like, but the present invention is not limited thereto.

The toner according to the present exemplary embodiment is described below.

<Surface State of Toner Particles>

A toner according to the present invention contains polyvalent acid metal salt particles on the surface of toner particles, and the polyvalent acid metal salt particles are particles of a salt of a polyvalent acid and a metal of a group 4 element.

The presence of the polyvalent acid metal salt particles allows the formation of an electrically conductive path from a toner regulating member and a photosensitive member to the toner and allows injection charging from the two portions.

In particular, when the polyvalent acid metal salt particles are particles of a salt of a polyvalent acid and a metal of a group 4 element, the group 4 metal element and the polyvalent acid form a cross-linked structure, which promotes charge transfer. As a result, an electric charge transferred from the toner regulating member and the photosensitive member to the toner can be rapidly transferred to the inside of the toner, and charge injection can be efficiently performed.

Furthermore, the polyvalent acid metal salt present in the form of particles allows electrically conductive domains to be discretely present as compared with the polyvalent acid metal salt present in a bulk form, such as a film form or an aggregate form. This prevents electrically conductive paths from being excessively formed, can maintain the charge retention capability, and improves transferability as seen in transfer efficiency improvement.

Furthermore, a salt containing a group 4 metal element has lower water absorbency than a salt containing only a group 1 or 2 metal element and therefore has particularly high charge retention capability.

Specific examples of a metal element used in the present invention include titanium (group 4, electronegativity: 1.54), zirconium (group 4, electronegativity: 1.33), and hafnium (group 4, electronegativity: 1.30).

A polyvalent acid used in the present invention may be any divalent or higher-valent acid.

A salt composed of a divalent or higher-valent acid and the metal element described above forms a cross-linked structure between a compound containing the metal element and the polyvalent acid, and the cross-linked structure can promote electron transfer and allows injection charging from the two portions.

Specific examples of a polyvalent acid used in the present invention include inorganic acids, such as phosphoric acid (trivalent), carbonic acid (divalent), and sulfuric acid (divalent); and organic acids, such as dicarboxylic acid (divalent) and tricarboxylic acid (trivalent). Specific examples of the organic acids include dicarboxylic acids, such as oxalic acid, malonic acid, succinic acid, glutaric acid, adipic acid, fumaric acid, maleic acid, pimelic acid, suberic acid, azelaic acid, sebacic acid, phthalic acid, isophthalic acid, and terephthalic acid; and tricarboxylic acids, such as citric acid, aconitic acid, and trimellitic anhydride. Among these, phosphoric acid, carbonic acid, and sulfuric acid are preferred, and phosphoric acid is more preferred.

Specific examples of the polyvalent acid metal salt as a combination of the metal and the polyvalent acid include metal phosphates, such as titanium phosphate compounds, zirconium phosphate compounds, aluminum phosphate compounds, and copper phosphate compounds; metal sulfates, such as titanium sulfate compounds, zirconium sulfate compounds, and aluminum sulfate compounds; metal carbonates, such as titanium carbonate compounds, zirconium carbonate compounds, and aluminum carbonate compounds; and metal oxalates, such as titanium oxalate compounds. Among these, because of their high strength due to the phosphate ion cross-linking between metals, metal phosphate salts are preferred, and titanium phosphate compounds are more preferred.

The polyvalent acid metal salt can be produced by any method, including a known method. In particular, a method for producing a polyvalent acid metal salt by reacting a metal compound serving as a metal source with a polyvalent acid ion in an aqueous medium is preferred.

A metal source for producing a polyvalent acid metal salt by the method described above can be any known metal compound that produces a polyvalent acid metal salt by a reaction with a polyvalent acid ion.

In particular, a metal chelate is preferred because the reaction is easily controlled and the metal chelate reacts quantitatively with a polyvalent acid ion. From the perspective of solubility in an aqueous medium, a lactic acid chelate, such as titanium lactate or zirconium lactate, is more preferred.

Specific examples of a metal source used in the present invention include metal chelates, such as titanium lactate, titanium tetraacetylacetonate, a titanium lactate ammonium salt, titanium triethanolaminate, zirconium lactate, a zirconium lactate ammonium salt, aluminum lactate, aluminum trisacetylacetonate, and copper lactate; and metal alkoxides, such as titanium tetraisopropoxide, titanium ethoxide, zirconium tetraisopropoxide, and aluminum triisopropoxide.

A polyvalent acid ion for producing the polyvalent acid metal salt by the above method may be the polyvalent acid ion described above. For the addition to the aqueous medium, the polyvalent acid itself may be added, or a water-soluble polyvalent acid metal salt may be added to the aqueous medium and dissociated in the aqueous medium.

In particular, when the polyvalent acid metal salt particles contain a group 4 metal element as in the present invention, the metal element and the polyvalent acid are likely to have a polarity difference, and polarization in the polyvalent acid metal salt particles is increased, so that a good electrically conductive path is likely to be formed. To easily generate a polarity difference from the polyvalent acid and reduce moisture absorption, the Pauling electronegativity is preferably 1.30 or more and 1.60 or less. The Pauling electronegativity of a group 4 metal is within this range: titanium (group 4, electronegativity: 1.54), zirconium (group 4, electronegativity: 1.33), or hafnium (group 4, electronegativity: 1.30), so that moisture absorption can be reduced, and high charge retention capability can be maintained.

The Pauling electronegativity is a value described in "Kagaku Binran Kisohen (Chemical Handbook, Basic Edition), revised 5th edition, edited by The Chemical Society of Japan (2004), published by Maruzen Co., Ltd."

In the present invention, an electric charge is injected into toner at different angles from two portions of the toner regulating member and the photosensitive member to enhance charging uniformity in the toner. In the presence of a protrusion, injected electric charges are easily spread to the entire toner via the protrusion, and the charging uniformity is further improved. This reduces polarization in the toner and reduces electrostatic aggregation of the toner. This improves the flowability of the toner, toner supply capacity, and solid followability. The solid followability refers to the density stability of second and subsequent sheets in continuous printing of an image with a very high printing ratio (hereinafter referred to as a solid image). This effect is remarkably exhibited when the protrusion is formed of an organosilicon polymer and has optimum volume resistivity, as described later.

In toner particles according to the present invention, the protrusion on the surface of the toner particles is preferably formed of an organosilicon polymer. The protrusion formed of the organosilicon polymer can have improved adhesivity to the polyvalent acid metal salt particles and can prevent the polyvalent acid metal salt particles from moving from the surface of the toner particles to the toner regulating member and changing the charging characteristics through long-term durability.

The organosilicon polymer used in the present invention may be, but is not limited to, a known organic polymer. In particular, an organosilicon polymer with a partial structure represented by the following formula is preferably used.

$$R—SiO_{3/2}$$

(wherein R denotes an alkyl group, an alkenyl group, an acyl group, an aryl group, or a methacryloxyalkyl group.)

This formula indicates that the organosilicon polymer has an organic group and a silicon polymer moiety. Thus, the organosilicon polymer containing the partial structure represented by the formula adheres strongly to toner base particles because the organic group has an affinity for the toner base particles, and adheres strongly to a polyvalent acid metal salt because the silicon polymer moiety has an affinity for the polyvalent acid metal salt. Thus, the polyvalent acid metal salt can adhere more strongly to the toner base particles through the organosilicon polymer.

Furthermore, when the metal element of the polyvalent acid metal salt particles is a group 4 metal element, the metal element has a valence of 2 or more, can form a cross-linked structure with an organosilicon compound, and can therefore form a cross-linked structure with a polymer of the organosilicon compound on the surface of the toner particles. This cross-linked structure suppresses the movement of the polyvalent acid metal salt particles to the toner regulating member, promotes charge transfer on the toner surface, and improves injection chargeability. This improves fogging.

From the perspective of achieving both the occurrence of the above effects and the suppression of a decrease in electrical conductivity due to high coverage with the organosilicon compound, the organosilicon compound content is preferably 0.3 parts by mass or more and 20.0 parts by mass or less per 100.0 parts by mass of a binder resin or a polymerizable monomer.

The organosilicon compound for producing the organosilicon polymer may be, but is not limited to, a known organosilicon compound. In particular, at least one organosilicon compound selected from the group consisting of organosilicon compounds represented by the following formula is preferred.

$$R—Si—(Ra)_3$$

(wherein Ra each independently denotes a halogen atom or an alkoxy group, and R each independently denotes an alkyl group, an alkenyl group, an aryl group, an acyl group, or a methacryloxy alkyl group.)

More specifically, the silane compound represented by this formula may be a trifunctional silane compound, including a trifunctional methylsilane compound, such as methyltrimethoxysilane, methyltriethoxysilane, methyldiethoxymethoxysilane, or methylethoxydimethoxysilane; a trifunctional silane compound, such as ethyltrimethoxysilane, ethyltriethoxysilane, propyltrimethoxysilane, propyltriethoxysilane, butyltrimethoxysilane, butyltriethoxysilane, hexyltrimethoxysilane, or hexyltriethoxysilane; a trifunctional phenylsilane compound, such as phenyltrimethoxysilane, or phenyltriethoxysilane; a trifunctional vinylsilane compound, such as vinyltrimethoxysilane or vinyltriethoxysilane; a trifunctional allylsilane compound, such as allyltrimethoxysilane, allyltriethoxysilane, allyldiethoxymethoxysilane, or allylethoxydimethoxysilane; or a trifunctional γ-methacryloxypropylsilane compound, such as γ-methacryloxypropyltrimethoxysilane, γ-methacryloxy-propyltriethoxysilane, γ-methacryloxypropyldiethoxymethoxysilane, or γ-methacryloxypropylethoxydimethoxysilane.

Polyvalent acid metal salt particles according to the present invention are preferably polyvalent acid titanium salt particles. When the metal element is titanium, titanium has a high Pauling electronegativity and is more likely to have a polarity difference from a polyvalent acid than another group 4 metal element, such as zirconium or hafnium. This increases polarization in the polyvalent acid metal salt particles and easily forms a good electrically conductive path. This improves the injection chargeability and fogging.

Materials contained in a toner according to the present invention other than the above materials are described in detail below.

<Binder Resin>

A toner according to the present invention contains a binder resin.

The binder resin may be, but is not limited to, a known resin. More specifically, a vinyl resin, a polyester resin, a polyurethane resin, a polyamide resin, or the like may be mentioned. A polymerizable monomer that can be used to produce a vinyl resin may be a styrene monomer, such as styrene or α-methylstyrene; an acrylate, such as methyl acrylate or butyl acrylate; a methacrylate, such as methyl methacrylate, 2-hydroxyethyl methacrylate, t-butyl methacrylate, or 2-ethylhexyl methacrylate; an unsaturated carboxylic acid, such as acrylic acid or methacrylic acid; an unsaturated dicarboxylic acid, such as maleic acid; an unsaturated dicarboxylic anhydride, such as maleic anhydride; a nitrile vinyl monomer, such as acrylonitrile; a halogen-containing vinyl monomer, such as vinyl chloride; a nitro vinyl monomer, such as nitrostyrene; or the like.

Among these, a vinyl resin or a polyester resin is preferably contained as the binder resin.

<Colorant>

A toner according to the present invention may contain a colorant. The colorant may be, but is not limited to, a known black, yellow, magenta, cyan, or another color pigment or dye, or a magnetic material, or the like.

The black colorant may be a black pigment, such as carbon black.

The yellow colorant may be a yellow pigment or a yellow dye, such as a monoazo compound; a disazo compound; a condensed azo compound; an isoindolinone compound; a benzimidazolone compound; an anthraquinone compound; an azo metal complex; a methine compound; or an allylamide compound.

More specifically, C. I. Pigment Yellow 74, 93, 95, 109, 111, 128, 155, 174, 180, or 185, C.I. Solvent Yellow 162, or the like may be mentioned.

The magenta colorant may be a magenta pigment or a magenta dye, such as a monoazo compound; a condensed azo compound; a diketopyrrolopyrrole compound; an anthraquinone compound; a quinacridone compound; a basic dye lake compound; a naphthol compound: a benzimidazolone compound; a thioindigo compound; or a perylene compound.

More specifically, C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, or 269, C.I. Pigment Violet 19, or the like may be mentioned.

The cyan colorant may be a cyan pigment or a cyan dye, such as a copper phthalocyanine compound or a derivative thereof, an anthraquinone compound; or a basic dye lake compound.

More specifically, C.I. Pigment Blue 1, 7, 15, 15:1, 15:2, 15:3, 15:4, 60, 62, or 66, or the like may be mentioned.

The colorant content is preferably 1.0 part by mass or more and 20.0 parts by mass or less per 100.0 parts by mass of a binder resin or a polymerizable monomer.

The toner may be a magnetic toner containing a magnetic material.

In this case, the magnetic material can also function as a colorant.

The magnetic material may be an iron oxide exemplified by magnetite, hematite, or ferrite; a metal exemplified by iron, cobalt, or nickel, an alloy of this metal and a metal, such as aluminum, cobalt, copper, lead, magnesium, tin, zinc, antimony, beryllium, bismuth, cadmium, calcium, manganese, selenium, titanium, tungsten, or vanadium, a mixture thereof, or the like.

<Wax>

A toner according to the present invention may contain a wax. The wax may be, but is not limited to, a known wax. Specific examples thereof include an ester of a monohydric alcohol and a monocarboxylic acid, such as behenyl behenate, stearyl stearate, or palmityl palmitate; an ester of a divalent carboxylic acid and a monoalcohol, such as dibehenyl sebacate; an ester of a dihydric alcohol and a monocarboxylic acid, such as ethylene glycol distearate or hexanediol dibehenate; an ester of a trihydric alcohol and a monocarboxylic acid, such as glycerin tribehenate; an ester of a tetrahydric alcohol and a monocarboxylic acid, such as pentaerythritol tetrastearate or pentaerythritol tetrapalmitate; an ester of a hexahydric alcohol and a monocarboxylic acid, such as dipentaerythritol hexastearate or dipentaerythritol hexapalmitate; an ester of a polyfunctional alcohol and a monocarboxylic acid, such as polyglycerin behenate; a natural ester wax, such as carnauba wax or rice wax; a petroleum hydrocarbon wax or a derivative thereof, such as a paraffin wax, a microcrystalline wax, or petrolatum; a Fischer-Tropsch hydrocarbon wax or a derivative thereof; a polyolefin hydrocarbon wax or a derivative thereof, such as a polyethylene wax or a polypropylene wax; a higher aliphatic alcohol; a fatty acid, such as stearic acid or palmitic acid; an acid amide wax; or the like.

From the perspective of releasability, the wax content is preferably 1.0 part by mass or more and 30.0 parts by mass or less, more preferably 5.0 parts by mass or more and 20.0 parts by mass or less, per 100.0 parts by mass of a binder resin or a polymerizable monomer.

<Charge Control Agent>

A toner according to the present invention may contain a charge control agent, provided that the development of a gradient force and charge control by the polyvalent acid metal salt particles are not inhibited. The charge control agent may be, but is not limited to, a known charge control agent.

More specifically, as a negative charge control agent, the following may be mentioned: a metal compound of an aromatic carboxylic acid, such as salicylic acid, an alkyl salicylic acid, a dialkyl salicylic acid, naphthoic acid, or a dicarboxylic acid, or a polymer or copolymer with a metal compound of the aromatic carboxylic acid; a polymer or copolymer with a sulfonic acid group, a sulfonic acid salt group, or a sulfonic ester group; a metal salt or a metal complex of an azo dye or an azo pigment; a boron compound, a silicon compound, calixarene, or the like.

On the other hand, as a positive charge control agent, the following may be mentioned: a quaternary ammonium salt, a polymer compound with a quaternary ammonium salt in a side chain; a guanidine compound; a nigrosine compound;

an imidazole compound; or the like. A polymer or copolymer with a sulfonic acid salt group or a sulfonic ester group may be a homopolymer of a vinyl monomer with a sulfonic acid group, such as styrenesulfonic acid, 2-acrylamido-2-methylpropanesulfonic acid, 2-methacrylamido-2-methylpropanesulfonic acid, vinylsulfonic acid, or methacryl sulfonic acid, a copolymer of the vinyl monomer described in the section of the binder resin and the vinyl monomer with a sulfonic acid group, or the like.

The charge control agent content is preferably 0.01 parts by mass or more and 5.0 parts by mass or less per 100.0 parts by mass of a binder resin or a polymerizable monomer.

<External Additive Agent>

Toner particles with an organosilicon polymer on the surface thereof have good flowability even without an external additive agent. For the purpose of further improvement, however, an external additive agent may be contained.

The external additive agent may be, but is not limited to, a known external additive agent.

More specifically, the following may be mentioned: raw fine silica particles, such as wet process silica or dry process silica, or fine silica particles produced by subjecting the raw fine silica particles to surface treatment with a treatment agent, such as a silane coupling agent, a titanate coupling agent, or silicone oil; fine resin particles, such as fine vinylidene fluoride particles or fine polytetrafluoroethylene particles; or the like.

The external additive agent content is 0.1 parts by mass or more and 5.0 parts by mass or less per 100.0 parts by mass of the toner particles.

Subsequently, a method for producing a toner according to the present invention is described in detail below.

<Method for Producing Toner Base Particles>

Toner base particles (toner particles before adhesion of polyvalent acid metal salt particles are also referred to as "toner base particles") may be produced by any method, such as a suspension polymerization method, a dissolution suspension method, an emulsion aggregation method, or a pulverization method.

For example, a method for producing toner base particles by a suspension polymerization method is described below.

First, a polymerizable monomer capable of forming a binder resin and, if necessary, various additive agents are mixed, and a dispersing apparatus is used to prepare a polymerizable monomer composition in which the materials are dissolved or dispersed.

The various additive agents may be a colorant, a wax, a charge control agent, a polymerization initiator, a chain transfer agent, and/or the like.

The dispersing apparatus may be a homogenizer, a ball mill, a colloid mill, an ultrasonic homogenizer, or the like.

Next, the polymerizable monomer composition is put into an aqueous medium containing poorly water-soluble inorganic fine particles, and droplets of the polymerizable monomer composition are prepared using a high-speed dispersing apparatus, such as a high-speed stirrer or an ultrasonic homogenizer (granulation step).

Subsequently, the polymerizable monomer in the droplets is polymerized to produce toner base particles (polymerization step).

The polymerization initiator may be mixed when the polymerizable monomer composition is prepared, or may be mixed in the polymerizable monomer composition immediately before the droplets are formed in the aqueous medium.

Furthermore, during the granulation of the droplets or after completion of the granulation, that is, immediately before the start of the polymerization reaction, the polymerization initiator may be added in a state of being dissolved in the polymerizable monomer or another solvent, if necessary.

After the polymerizable monomer is polymerized to produce a binder resin, if necessary, solvent removal treatment may be performed to produce a dispersion liquid of the toner base particles.

When the binder resin is produced by an emulsion aggregation method, a suspension polymerization method, or the like, the polymerizable monomer may be, but is not limited to, a known monomer. More specifically, the vinyl monomer described in the section of the binder resin may be mentioned.

The polymerization initiator may be, but is not limited to, a known polymerization initiator. Specific examples thereof include the following.

A peroxide polymerization initiator exemplified by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethyl benzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, performic acid-tert-butyl, peracetic acid-tert-butyl, perbenzoic acid-tert-butyl, perphenylacetic acid-tert-butyl, permethoxyacetic acid-tert-butyl, per-N-(3-toluyl) palmitic acid-tert-butylbenzoyl peroxide, t-butylperoxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, lauroyl peroxide, or the like; or an azo or diazo polymerization initiator exemplified by 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, or the like.

<Method for Attaching Polyvalent Acid Metal Salt Particles>

A method for attaching polyvalent acid metal salt particles to toner base particles is exemplified below. Examples thereof include a method for producing polyvalent acid metal salt particles by reacting a metal compound serving as a metal source with a polyvalent acid ion in an aqueous medium containing dispersed toner particles, or a method for attaching polyvalent acid metal salt particles to toner particles by a mechanical external force in a dry or wet process.

(1) A method for producing polyvalent acid metal salt particles by reacting a metal compound serving as a metal source with a polyvalent acid ion in an aqueous medium containing dispersed toner base particles.

For example, a compound containing a metal element and a polyvalent acid are added to and mixed with a toner base particle dispersion liquid to react the compound containing the metal element with the polyvalent acid, precipitate the reaction product, and simultaneously attach the reaction product to the toner base particles while stirring the dispersion liquid.

(2) A method for attaching polyvalent acid metal salt particles to the surface of toner base particles by a mechanical external force in a dry or wet process.

For example, a high-speed stirrer for applying a shear force to a powder or an aqueous medium, such as an FM mixer, Mechano Hybrid (manufactured by Nippon Coke & Engineering Co., Ltd.), a super mixer, Nobilta (manufactured by Hosokawa Micron Corporation), or T.K. Homomixer (manufactured by Tokushu Kika Kogyo Co., Ltd.), is used. While a force to crush polyvalent acid metal salt particles is applied, the polyvalent acid metal salt particles are attached to toner base particles.

In particular, a method for producing polyvalent acid metal salt particles by reacting a metal compound serving as a metal source with a polyvalent acid ion in an aqueous medium containing dispersed toner base particles is preferred. This method can be used to uniformly disperse the polyvalent acid metal salt particles on the surface of the toner particles. An electrically conductive path uniformly formed on the surface of the toner particles allows an electric charge to be uniformly and efficiently injected into the toner from a toner regulating member or a photosensitive member and improves fogging.

Furthermore, according to the method, the polyvalent acid metal salt particles adhere to the toner base particles before completion of the growth of the polyvalent acid metal salt particles formed in the aqueous medium, and the polyvalent acid metal salt particles therefore adhere more strongly to the toner base particles than the case where the polyvalent acid metal salt particles formed in advance are attached by a mechanical external force. Consequently, the polyvalent acid metal salt particles are not separated from the base even during long-term use, and the resulting toner can have the advantages of the present invention, that is, improvement in fogging during start-up and improvement in transferability, over long-term use and can have high durability.

Furthermore, it is more preferable to introduce an organosilicon compound into the aqueous medium simultaneously with the reaction between the metal compound and the polyvalent acid ion and react the organosilicon compound in the aqueous medium to produce an organosilicon polymer. The method can be used to more strongly fix the polyvalent acid metal salt particles to the surface of the toner particles by the organosilicon polymer before the growth of the polyvalent acid metal salt particles formed in the aqueous medium, and can therefore further enhance the dispersibility of the polyvalent acid metal salt particles. Furthermore, the polyvalent acid metal salt particles strongly adhered to the toner particles by the organosilicon polymer can more remarkably exhibit the effects of improving durability.

The metal compound, the polyvalent acid, and the organosilicon compound used in the method may be the metal compound, the polyvalent acid, and the organosilicon compound described above, respectively.

Preferably, toner particles according to the present invention have toner base particles and a protrusion formed on the surface of the toner base particles, and the polyvalent acid metal salt particles are present on the surface of the protrusion. Furthermore, the protrusion is preferably formed of an organosilicon polymer. When the polyvalent acid metal salt particles are attached to the protrusion formed of the organosilicon compound, the protrusion formed of the organosilicon compound is formed on the toner base particles by a method such as a <Method for Attaching Organosilicon Compound> described later. The polyvalent acid metal salt particles can then be formed in water to attach the polyvalent acid metal salt particles to the surface of the protrusion. A structure in which the polyvalent acid metal salt particles are present on the surface of the protrusion can also be formed by a method of externally adding silica or other particles to the toner base particles in a wet or dry process to form the protrusion on the surface of the toner base particles and then attaching the polyvalent acid metal salt particles to the surface in water. When the dry external addition is performed, the toner after the external addition may be redispersed in water, if necessary, using a surfactant or an inorganic dispersant, and the polyvalent acid metal salt particles may then be formed.

<Method for Attaching Organosilicon Compound>

A method for attaching an organosilicon compound to toner base particles is exemplified below.

A method for attaching an organosilicon compound according to the present invention may be, but is not limited to, a known method. Examples thereof include a method of condensing the organosilicon compound in an aqueous medium containing dispersed toner base particles to attach the organosilicon compound to the toner base particles and a method of attaching the organosilicon compound to toner base particles by a mechanical external force in a dry or wet process.

Among these, the method of condensing the organosilicon compound in an aqueous medium containing dispersed toner base particles to attach the organosilicon compound to the toner base particles is preferred because the method can strongly attach the organosilicon compound to the toner base particles and uniformly attach the organosilicon compound to the toner base particles.

The method is described below.

When an organosilicon compound is attached to toner base particles by the method, the method preferably includes a step (step 1) of dispersing the toner base particles in an aqueous medium to prepare a toner base particle dispersion liquid. The method also preferably includes a step (step 2) of mixing an organosilicon compound (or a hydrolysate thereof) with the toner base particle dispersion liquid and causing a condensation reaction of the organosilicon compound in the toner base particle dispersion liquid to attach the organosilicon compound to the toner base particles.

In the step 1, a method for preparing the toner base particle dispersion liquid may be a method of directly using a dispersion liquid of toner base particles produced in an aqueous medium, a method of putting dried toner base particles into an aqueous medium and mechanically dispersing the toner base particles, or the like. When the dried toner base particles are dispersed in the aqueous medium, a dispersing aid may be used.

The dispersing aid may be a known dispersion stabilizer, a surfactant, or the like. More specifically, the dispersion stabilizer may be an inorganic dispersion stabilizer, such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, or alumina, or an organic dispersion stabilizer, such as poly(vinyl alcohol), gelatin, methylcellulose, methylhydroxypropylcellulose, ethylcellulose, a sodium salt of carboxymethylcellulose, or starch. The surfactant may be an anionic surfactant, such as an alkyl sulfate ester salt, an alkylbenzene sulfonate salt, or a fatty acid salt; a nonionic surfactant, such as a polyoxyethylene alkyl ether or a polyoxypropylene alkyl ether; or a cationic surfactant, such as an alkylamine salt or a quaternary ammonium salt. Among these, it is preferable to contain an inorganic dispersion stabilizer, and it is more preferable to contain a dispersion stabilizer containing a phosphate, such as tricalcium phosphate, hydroxyapatite, magnesium phosphate, zinc phosphate, or aluminum phosphate.

In the step 2, the organosilicon compound may be directly added to the toner base particle dispersion liquid or may be added to the toner base particle dispersion liquid after hydrolysis. In particular, the organosilicon compound is preferably added after hydrolysis because the condensation reaction can be easily controlled and the amount of the organosilicon compound remaining in the toner base particle dispersion liquid can be reduced. The hydrolysis is preferably performed in an aqueous medium with a pH adjusted using a known acid or base. The hydrolysis of an organosilicon compound is known to be pH-dependent, and the pH at which the hydrolysis is performed is preferably changed as appropriate depending on the type of organosilicon compound. For example, when methyltriethoxysilane is used as the organosilicon compound, the aqueous medium preferably has a pH of 2.0 or more and 6.0 or less.

More specifically, the acid for adjusting the pH may be an inorganic acid, such as hydrochloric acid, hydrobromic acid, hydroiodic acid, hypochlorous acid, chlorous acid, chloric acid, perchloric acid, hypobromous acid, bromous acid, bromic acid, perbromic acid, hypoiodous acid, iodous acid, iodic acid, periodic acid, sulfuric acid, nitric acid, phosphoric acid, or boric acid, or an organic acid, such as acetic acid, citric acid, formic acid, gluconic acid, lactic acid, oxalic acid, or tartaric acid.

More specifically, the base for adjusting the pH may be an alkali metal hydroxide, such as potassium hydroxide, sodium hydroxide, lithium hydroxide, or an aqueous solution thereof, an alkali metal carbonate, such as potassium carbonate, sodium carbonate, lithium carbonate, or an aqueous solution thereof, an alkali metal sulfate, such as potassium sulfate, sodium sulfate, lithium sulfate, or an aqueous solution thereof, an alkali metal phosphate, such as potassium phosphate, sodium phosphate, lithium phosphate, or an aqueous solution thereof, an alkaline-earth metal hydroxide, such as calcium hydroxide, magnesium hydroxide, or an aqueous solution thereof, an amine, such as ammonia or triethylamine, or the like.

The condensation reaction in the step 2 is preferably controlled by adjusting the pH of the toner base particle dispersion liquid. The condensation reaction of an organosilicon compound is known to be pH-dependent, and the pH at which the condensation reaction is performed is preferably changed as appropriate depending on the type of organosilicon compound. For example, when methyltriethoxysilane is used as the organosilicon compound, the aqueous medium preferably has a pH of 6.0 or more and 12.0 or less. The acids and bases for adjusting the pH may be the acids and bases exemplified in the above hydrolysis section.

The condensation reaction in the step 2 is preferably performed at approximately 10° C. or more and 100° C. or less.

<Area and Coefficient of Variation of Electrically Conductive Material>

An evaluation method for an electrically conductive material on the toner surface is an evaluation method using a scanning electron microscope described later, and the electrically conductive material has an average value of areas of 10,000 $nm^2$ or less, preferably 5000 $nm^2$ or less, more preferably 2000 $nm^2$ or less. The area of the electrically conductive material is a projected area of a block of the electrically conductive material present on the toner surface in the direction perpendicular to the toner surface.

When the electrically conductive material has an average value of areas of 10,000 $nm^2$ or less, the electrically conductive material of the toner becomes discrete, and the electric charge of the toner is easily maintained. This is because the chance of contact between the electrically conductive material on the toner surface and a surrounding material is reduced, and the electric charge of the toner is less likely to be released.

The coefficient of variation indicating variations in the area of the electrically conductive material is 10.0 or less, preferably 7.0 or less, more preferably 5.0 or less.

When the coefficient of variation of the areas of the electrically conductive material is 10.0 or less, variations in the size of the electrically conductive material are reduced, variations in the charge amount of the electrically conductive material that is easily charged are reduced, and the toner particles are uniformly charged.

In such a toner, the resistance of the toner does not change so much with the electric field strength, and restrictions on the development field and the transfer electric field are small. Furthermore, even when the toner surface is contaminated with paper dust or the like, the resistance of the toner surface does not change so much, and the toner charge amount to be injected therefore does not change so much.

<Method for Observing Surface of Toner or the Like>

The surface of toner or the like is observed as described below.

The surface of toner or the like is observed with a scanning electron microscope (SEM, apparatus name: JSM-7800F manufactured by JEOL Ltd.) at a magnification of 50,000 times. Elemental mapping on the surface of the toner or the like is then performed by energy dispersive X-ray spectroscopy (EDX). From an elemental mapping image of SEM thus obtained, the presence of an organosilicon compound and particles of a salt of a polyvalent acid and a metal of a group 4 element on the surface of the toner or the like is examined.

More specifically, the mapping image of the metal element is compared with the mapping image of an element contained in the polyvalent acid, for example, phosphorus when phosphoric acid is used as the polyvalent acid, and coincidence of the two images can indicate that the particles of the salt of the polyvalent acid and the metal of the group 4 element are contained.

<Method for Measuring Weight-Average Particle Diameter (D4) and Number-Average Particle Diameter (D1)>

The weight-average particle diameter (D4) and the number-average particle diameter (D1) of toner or the like are calculated as described below.

The measuring apparatus is a precision particle size distribution analyzer "Coulter Counter Multisizer 3" (registered trademark, manufactured by Beckman Coulter, Inc.) equipped with a 100-μm aperture tube utilizing an aperture impedance method.

Accessory dedicated software "Beckman Coulter, Multisizer 3 Version 3.51" (manufactured by Beckman Coulter, Inc.) is used to set the measurement conditions and analyze measured data. The effective measuring channel number is 25,000.

An aqueous electrolyte used in the measurement may be 1.0% special grade sodium chloride dissolved in deionized water, for example, "ISOTON II" (manufactured by Beckman Coulter, Inc.).

Before the measurement and analysis, the dedicated software is set up as described below.

On the "Standard operation mode (SOMME) setting" screen of the dedicated software, the total count number in control mode is set at 50,000 particles, the number of measurements is set at 1, and the Kd value is set at a value obtained with "standard particles 10.0 μm" (manufactured by Beckman Coulter, Inc.). A "Threshold/noise level measurement button" is pushed to automatically set the threshold and noise level. The current is set at 1, 600 μA. The gain is set at 2. ISOTON II is chosen as an electrolyte solution. "Flushing of aperture tube after measurement" is checked.

On the "Conversion of pulse into particle diameter" setting screen of the dedicated software, the bin interval is set to the logarithmic particle diameter, the particle diameter bin is set to a 256 particle diameter bin, and the particle diameter range is set at 2 to 60 μm.

The specific measurement method is described below.

(1) A 250-ml round-bottom glass beaker specifically for Multisizer 3 is charged with approximately 200.0 mL of the aqueous electrolyte and is placed on a sample stand. A stirrer rod is rotated counterclockwise at 24 revolutions per second. Soiling and air bubbles in the aperture tube are removed using the "Aperture tube flushing" function of the dedicated software.

(2) A 100-mL flat-bottom glass beaker is charged with 30.0 mL of the aqueous electrolyte. To the aqueous electrolyte is added 0.3 mL of a dispersant "Contaminon N" (a 10% aqueous neutral detergent for cleaning precision measuring instruments composed of a nonionic surfactant, an anionic surfactant, and an organic builder, pH 7, manufactured by Wako Pure Chemical Industries, Ltd.) diluted 3-fold by mass with deionized water.

(3) An ultrasonic disperser "Ultrasonic Dispersion System Tetra 150" (manufactured by Nikkaki-Bios Co., Ltd.) is prepared. The ultrasonic disperser includes two oscillators with an oscillation frequency of 50 kHz and has an electrical output of 120 W. The two oscillators have a phase difference of 180 degrees. A water tank of the ultrasonic disperser is charged with 3.3 L of deionized water, and 2.0 mL of Contaminon N is added to the water tank.

(4) The beaker in (2) is placed in a beaker-holding hole in the ultrasonic disperser, and the ultrasonic disperser is actuated. The vertical position of the beaker is adjusted such that the surface resonance of the aqueous electrolyte in the beaker is highest.

(5) While the aqueous electrolyte in the beaker in (4) is exposed to ultrasonic waves, 10 mg of toner or the like are added little by little to the aqueous electrolyte and is dispersed. The ultrasonic dispersion treatment is continued for another 60 seconds. During the ultrasonic dispersion, the water temperature of the water tank is controlled at 10° C. or more and 40° C. or less.

(6) The aqueous electrolyte containing dispersed toner or the like prepared in (5) is added dropwise with a pipette into the round-bottom beaker prepared in (1) placed on the sample stand such that the measurement concentration is 5%. Measurement is continued until the number of measured particles reaches 50,000.

(7) The measured data are analyzed using the associated dedicated software to determine the weight-average particle diameter (D4) and the number-average particle diameter (D1). The "Average diameter" on the "Analysis/volume statistics (arithmetic mean)" screen in the setting of graph/volume percent in the dedicated software is the weight-average particle diameter (D4). The number-average particle diameter (D1) is the "Average diameter" on the "Analysis/number statistics (arithmetic mean)" screen in the setting of graph/% by number in the dedicated software.

<Method for Calculating Average Value of Areas of Electrically Conductive Material and Coefficient of Variation of Areas of Electrically Conductive Material>

Next, methods for calculating the average value of areas and the coefficient of variation of an electrically conductive material are described.

(A) The Average Value of Areas of an Electrically Conductive Material is Calculated as Described Below.

(1) Observation with JSM-7800F

To calculate the average value of areas of an electrically conductive material, JSM-7800F is used for a SEM image (backscattered electron image). The observation conditions are described below.

"PC-SEM" of JSM-7800F is activated, a sample holder is inserted into a sample chamber of a JSM-7800F housing, and the sample holder is moved to the observation position.

On the screen of PC-SEM, the accelerating voltage is set to (1.0 kV), and the observation magnification is set to (50000 times). The (ON) button of an observation icon is pressed, and an accelerating voltage is applied to observe a backscattered electron image.

(2) Calculation of Average Value of Areas of Electrically Conductive Material

The obtained backscattered electron image is read into an image processing analyzer LUZEX AP (manufactured by Nireco Corporation) and is displayed in monochrome.

An averaging process is followed by a binarization process to obtain a binarized image in which the electrically conductive material is displayed in white. The average value of areas of the white portion is then determined using a built-in function and is defined as the average value of areas of the electrically conductive material.

(B) Calculation of Coefficient of Variation of Areas of Electrically Conductive Material The backscattered electron image is read into an image processing analyzer LUZEX AP (manufactured by Nireco Corporation) and is displayed in monochrome.

After the averaging process, the binarization process is performed to obtain a binarized image in which the electrically conductive material is displayed in white. The standard deviation of the area of the white portion is then determined using a built-in function and is divided by the average value of areas of the electrically conductive material. The resulting value is defined as the coefficient of variation of the areas of the electrically conductive material.

Production Example of Toner

A production example of a toner used in the present exemplary embodiment is described below. In the present exemplary embodiment, the toner has a negative polarity as a normal charge polarity. In one example, the toner is a polymerized toner produced by a polymerization method.

A method for producing a toner is described below. A method for producing the toner according to the present exemplary embodiment is outlined below. Each step is described in detail later. The toner according to the present exemplary embodiment is produced mainly from a step of producing a toner base particle dispersion liquid containing dispersed toner base particles as cores of the toner through preparation of an aqueous medium, preparation of a polymerizable monomer composition, granulation of combining them, and a polymerization step. The toner is produced by a step of adjusting a material for mainly forming a surface layer of the toner and a step of combining the base particles and a surface layer material to form toner particles. In a production example of a toner in another exemplary embodiment, unless otherwise specified, numerical values in each step are the production conditions of toner A used in the present exemplary embodiment. Unless otherwise specified, "part (s)" and "%" in exemplary embodiments and comparative examples are all based on mass.

Production Example of Toner Base Particle Dispersion Liquid

Preparation of Aqueous Medium

A reaction vessel containing 390.0 parts of deionized water was charged with 11.2 parts of sodium phosphate (dodecahydrate) to prepare an aqueous sodium phosphate, and was kept at 65° C. for 1.0 hour while purging with nitrogen. The aqueous sodium phosphate was stirred at 12,000 rpm using a mixer (trade name: T.K. Homomixer, manufactured by Tokushu Kika Kogyo Co., Ltd.). While stirring, an aqueous calcium chloride prepared by dissolving 7.4 parts of calcium chloride (dihydrate) in 10.0 parts of deionized water was collectively charged into the reaction vessel to prepare an aqueous medium containing a dispersion stabilizer. Furthermore, 1.0 mol/L hydrochloric acid was added to the aqueous medium in the reaction vessel to adjust the pH to 6.0 and prepare an aqueous medium.

Preparation of Polymerizable Monomer Composition

| | |
|---|---|
| Styrene | 60.0 parts |
| C.I. Pigment Blue 15:3 | 6.3 parts |

These materials were charged into an attritor (manufactured by Nippon Coke & Engineering Co., Ltd.) and were dispersed at 220 rpm for 5.0 hours using zirconia particles with a diameter of 1.7 mm to prepare a colorant dispersion liquid containing the dispersed pigment.

The following materials were then added to the colorant dispersion liquid.

| | |
|---|---|
| Styrene | 10.0 parts |
| n-Butyl acrylate | 30.0 parts |
| Polyester resin | 5.0 parts (a polycondensate of terephthalic acid and a propylene oxide 2 mol adduct of bisphenol A, weight-average molecular weight Mw = 10,000, acid value: 8.2 mgKOH/g) |
| Paraffin wax (trade name: HNP9, manufactured by Nippon Seiro Co., Ltd., melting point: 76° C.) | 6.0 parts |

These materials were kept at 65° C. and were uniformly dissolved and dispersed with a mixer at 500 rpm to prepare a polymerizable monomer composition.

"Granulation Step"

While maintaining the temperature of the aqueous medium at 70° C. and the rotational speed of the mixer at 12,000 rpm, the polymerizable monomer composition and 8.0 parts of t-butyl peroxypivalate as a polymerization initiator were added to the aqueous medium. The mixture was granulated with the mixer for 10 minutes while maintaining 12,000 rpm.

"Polymerization Step"

The mixer was changed to a stirrer with a propeller blade, polymerization was performed for 5.0 hours while stirring at 200 rpm and maintaining 70° C., and the product was further heated at 85° C. for 2.0 hours to perform a polymerization reaction. The product was further heated at 98° C. for 3.0 hours to remove residual monomer, and deionized water was added to adjust the concentration of toner base particles in the dispersion liquid to 30.0% and prepare a toner base particle dispersion liquid containing the dispersed toner base particles.

The toner base particles had a number-average particle diameter (D1) of 6.2 μm and a weight-average particle diameter (D4) of 6.9 μm.

Production Example of Organosilicon Compound Liquid

| | |
|---|---|
| Deionized water | 70.0 parts |
| Methyltriethoxysilane | 30.0 parts |

These materials were weighed in a 200-mL beaker and were adjusted to pH 3.5 with 10% hydrochloric acid. The mixture was stirred for 1.0 hour while being heated to 60° C. in a water bath to prepare an organosilicon compound liquid.

Production Example of Toner A

The following samples were weighed in a reaction vessel and were mixed using a propeller blade to prepare a liquid mixture.

| | |
|---|---|
| Toner base particle dispersion liquid | 500.0 parts |
| Organosilicon compound liquid | 35.0 parts |

The liquid mixture was then adjusted to pH 9.5 with 1.0 mol/L aqueous NaOH, the temperature of the liquid mixture was adjusted to 50° C., and the liquid mixture was held for 1.0 hour while being mixed using a propeller blade.

| "Polyvalent Acid Metal Salt Adhering Step" | |
|---|---|
| 44% aqueous titanium lactate (trade name: TC-310, manufactured by Matsumoto Fine Chemical Co., Ltd.) | 3.2 parts (corresponding to 1.4 parts as titanium lactate) |
| Organosilicon compound liquid | 10.0 parts |

Subsequently, after the materials were mixed in the reaction vessel, the resulting liquid mixture was adjusted to pH 9.5 with 1.0 mol/L aqueous NaOH and was held for 4.0 hours. The temperature was decreased to 25° C., the pH was adjusted to 1.5 with 1.0 mol/L hydrochloric acid, and after stirring for 1.0 hour the product was filtered while being washed with deionized water. The resulting powder was dried in a constant temperature bath and was then classified with a wind classifier to prepare toner A. The toner A had a number-average particle diameter (D1) of 6.2 μm, a weight-average particle diameter (D4) of 6.9 μm, and a specific gravity of 1.0 g/cm$^3$. Analysis and observation of the toner A with a transmission electron microscope and by energy dispersive X-ray spectroscopy (TEM-EDX) showed that a protrusion containing an organosilicon polymer was observed on the surface of the toner particles, and titanium was present on the surface of the protrusion. The protrusion height H was 60 nm. Furthermore, when the toner A was analyzed by time-of-flight secondary ion mass spectrometry (TOF-SIMS analysis), an ion derived from titanium phosphate was detected.

The titanium phosphate compound is an electrically conductive material and is a reaction product of titanium lactate and a phosphate ion derived from sodium phosphate or calcium phosphate derived from the aqueous medium.

Observation of the toner A by the method described above showed that the existence region of titanium on the protrusion containing the organosilicon polymer had an average value of areas of 104 $nm^2$ and a coefficient of variation of 2.1.

Although toner with an electrically conductive material on the surface of a base is used in the present exemplary embodiment, the present invention is not limited thereto. Provided that a discrete electrically conductive material is present on the surface, for example, a magnetic toner containing a magnetic material and with the magnetic material exposed on the surface, a toner produced by externally adding an electrically conductive external additive agent to an insulating toner base, or the like may be used.

5. Developing Roller

Next, the developing roller 31 used in the present exemplary embodiment is described in detail.

Production Example of Developing Roller

Figure 5:
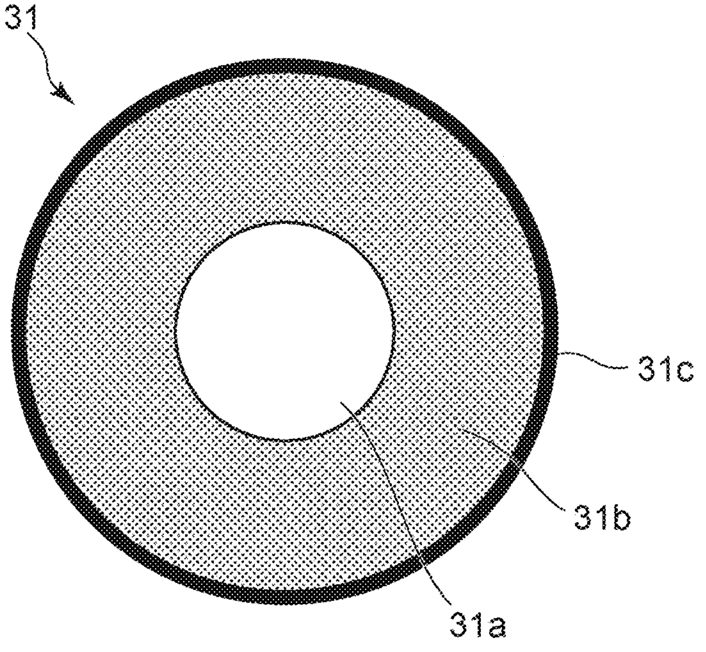
FIG. 5 is a conceptual diagram of the structure of a developing roller in Exemplary Embodiment 1.

FIG. 5 is a schematic view of a developing roller used in the present exemplary embodiment. The developing roller 31 includes an elastic layer 31*b* (hereinafter referred to as a base layer) formed on an outer peripheral surface of a cylindrical or hollow cylindrical electrically conductive base body 31*a*. Furthermore, as the outermost surface layer, a surficial layer 31*c* (hereinafter referred to as a surface layer) covers the outer peripheral surface of the elastic layer 31*b*.

The base body 31*a* was a stainless steel core with a diameter of 6 mm.

The base layer 31*b* is formed of a silicone rubber composition. A liquid silicone rubber material mixed with carbon black was cured by vulcanization to form a silicone rubber elastic layer with a diameter of 10 mm on the outer periphery of the base body.

The surface layer 31*c* is formed of a polyurethane resin composition. The polyurethane resin composition is a mixture of an isocyanate-terminated polyol (Mn: 3500), an amino compound (prepared using diethylenetriamine as a raw material), carbon black (15% by mass based on the polyurethane resin), and fine urethane resin particles for adjusting surface roughness. The surface layer with a thickness of approximately 10 μm is formed on the outer periphery of the base layer.

Next, methods of measuring the volume resistivity, the electrostatic capacitance, and the surface resistivity of the developing roller 31, which are features of the present invention, are described.

Method for Measuring Volume Resistivity of Developing Roller 31

Figure 6:
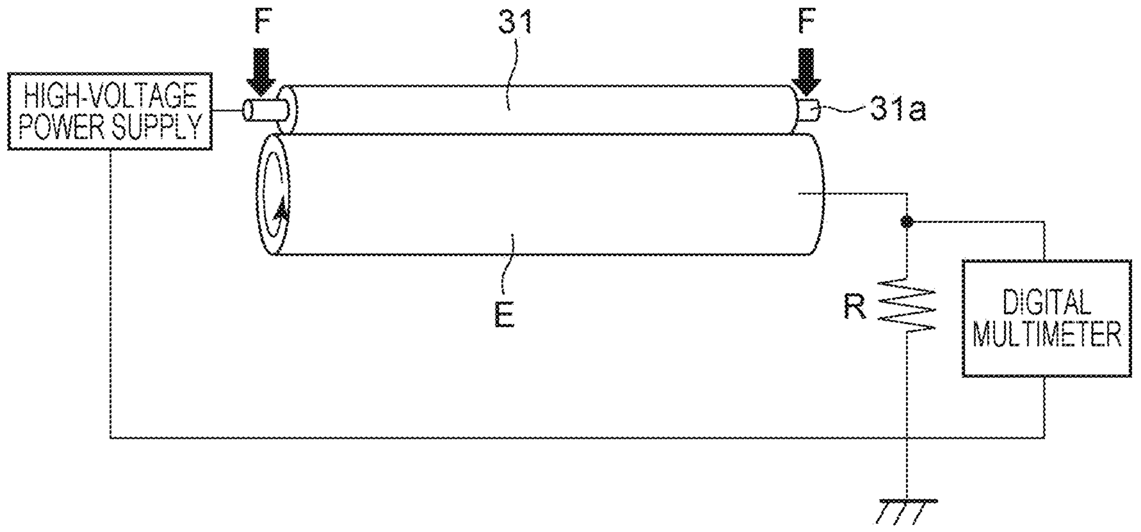
FIG. 6 is an explanatory view of a method for measuring the volume resistivity of the developing roller in Exemplary Embodiment 1.

A method for measuring the volume resistivity of the developing roller 31 is described with reference to FIG. 6. FIG. 6 is a conceptual diagram of a volume resistivity measuring apparatus of the developing roller 31. As a preparation for measurement, the developing roller 31 to be measured is disposed in contact with a metal cylinder E (made of stainless steel) with a diameter of 30 mm such that the axial direction thereof is parallel to the metal cylinder E. A load F of 4.9 N is then applied to each end portion of the base body 31*a* of the developing roller 31 in the longitudinal direction to bring the developing roller 31 and the metal cylinder E into close contact with each other.

The base body 31*a* of the developing roller 31 is coupled to a high-voltage power supply (MODEL 615-3 manufactured by Trek), and the metal cylinder E is grounded via a resistor R with a resistance value $R_1$(=10 kilohms). A digital multimeter (80 series manufactured by FLUKE) is coupled to both ends of the resistor R, so that a voltage value at each end of the resistor R can be measured.

In the measurement, first, the metal cylinder E is rotated at 30 rpm in an arbitrary direction (counterclockwise in the present exemplary embodiment) to rotate the developing roller 31 by the rotation of the metal cylinder E. Next, the high-voltage power supply applies a direct-current voltage $V_1$(=−100 V) to the base body 31*a* for 10 seconds, and the electric current $I_1$ flowing through the resistor R is calculated using Ohm's law from the average value $V_1$ of the voltage detected by the digital multimeter ($I_1=V_1/R_1$). The electric current $I_1$ thus calculated is equal to the electric current flowing through the developing roller 31, and the volume resistance value $R_d$ of the developing roller 31 can be calculated from the electric current $I_1$ using Ohm's law ($R_d=V_1/I_1$). The volume resistivity ρa of the developing roller 31 can be calculated from the volume resistance value $R_d$ using the following formula (3). In the formula (3), S denotes the area (contact nip width×longitudinal width) of the developing roller 31 in contact with the metal cylinder E, and t denotes the thickness from the base body to the outermost surface (base layer+surface layer).

$$\rho_d\ (\text{ohm}\cdot\text{cm}) = R_d(\text{ohms}) \times S\ (\text{cm}^2)/t\ (\text{cm}) \qquad \text{formula (3)}$$

(Method for Measuring Electrostatic Capacitance Per Unit Area of Developing Roller 31)

Figure 7:
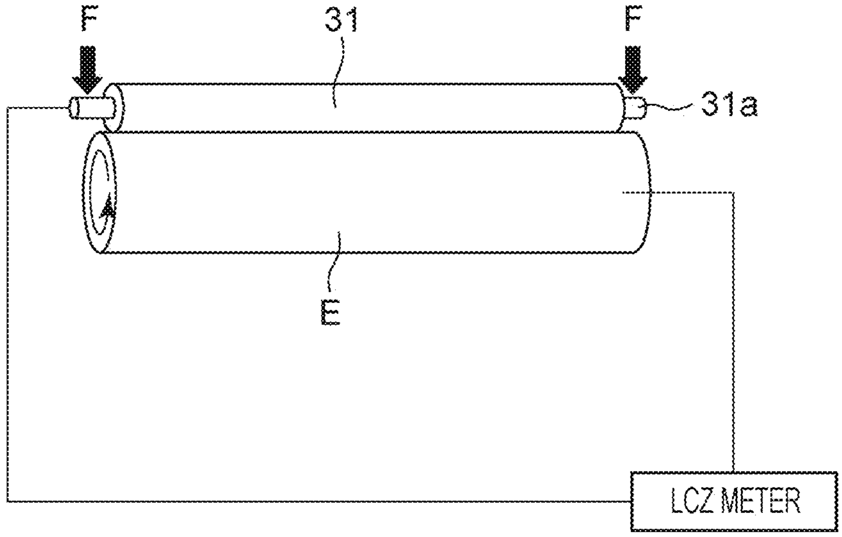
FIG. 7 is an explanatory view of a method for measuring the electrostatic capacitance of the developing roller in Exemplary Embodiment 1.

A method for measuring the electrostatic capacitance per unit area of the developing roller 31 is described with reference to FIG. 7. FIG. 7 is a conceptual diagram of an electrostatic capacitance measuring apparatus of the developing roller 31. As a preparation for measurement, the developing roller 31 to be measured is disposed in contact with the metal cylinder E (made of stainless steel) with a diameter of 30 mm such that the axial direction thereof is parallel to the metal cylinder E. A load F of 4.9 N is then applied to each end portion of the base body 31*a* of the developing roller 31 in the longitudinal direction to bring the developing roller 31 and the metal cylinder E into close contact with each other.

The base body 31*a* of the developing roller 31 and the metal cylinder E are coupled to an LCZ meter (NF2345, manufactured by NF Corporation), and the measured electrostatic capacitance is defined as the electrostatic capacitance of the developing roller 31.

In the measurement, first, the metal cylinder E is rotated at 30 rpm in an arbitrary direction (counterclockwise in the present exemplary embodiment) to rotate the developing roller 31 by the rotation of the metal cylinder E. In this state, the LCZ meter is set to a parallel equivalent circuit mode, the frequency is set to 10 kHz, and the electrostatic capacitance C of the developing roller 31 is measured.

The electrostatic capacitance $C_s$ per unit area can be calculated from the electrostatic capacitance C of the developing roller 31 using the following formula (4). In the formula (4), S denotes the area (contact width×longitudinal width) of the developing roller 31 in contact with the metal cylinder E.

$$C_s\ (\mathrm{pF/cm^2}) = C\ (\mathrm{pF})/S\ (\mathrm{cm^2}) \qquad \text{formula (4)}$$

(Measurement Example of Surface Resistivity of Surface Layer of Developing Roller 31)

The surface resistivity of the surface layer of the developing roller 31 can be measured as described below. First, 1 to 2 ml of a surface layer coating solution is dropped on a polyester sheet (Lumirror, manufactured by Toray Industries, Inc.). The solution is quickly spread with a film applicator (clearance: 125 μm, width: 100 mm). The sheet is then air-dried for 30 minutes and is then cured by heating. The heat-cured sheet is allowed to stand for 1 hour or more in an environment of a temperature of 23.5° C. and a relative humidity of 50%. Measurement was then performed in the environment using a resistance measuring instrument (Hiresta UP MCP-HT450 manufactured by Mitsubishi Chemical Analytech Co., Ltd.) under the following conditions: measurement mode: surface resistivity, probe type: URS, applied voltage: 250 V, and measurement time: 30 seconds.

6. Charge Injection into Toner

Next, requirements related to charge injection into toner, which is a feature of the present invention, are described.

The developing roller is in contact with an electrically conductive member (hereinafter referred to as an injection member or a contact member), and a voltage with a high absolute value on the normal charge polarity side with respect to the development voltage is applied to the injection member. This can cause an electric field (hereinafter referred to as an injection electric field) in a region (hereinafter referred to as an injection region) where the injection member and the developing roller are close to each other, and an electric charge can be injected into toner on the developing roller. The injection electric field increases with a voltage difference (hereinafter referred to as an injection voltage difference) applied to the injection member and the developing roller.

It is known that toner on the developing roller is triboelectrically charged by coming into contact with a member with a work function different from that of the toner. For example, a change in the work function of toner caused by a change in durability, a change in the work function of a member due to surface contamination of the developing roller caused by contamination with a foreign material, or the like may change the toner charge amount and greatly change image quality.

On the other hand, when an electric charge is injected into toner, a desired electric charge can be directly injected into the toner in addition to triboelectric charging. This characteristically results in a small influence of the change in the work function and stabilizes the toner charge amount.

(Toner Physical Properties Necessary for Charge Injection)

Figure 8:
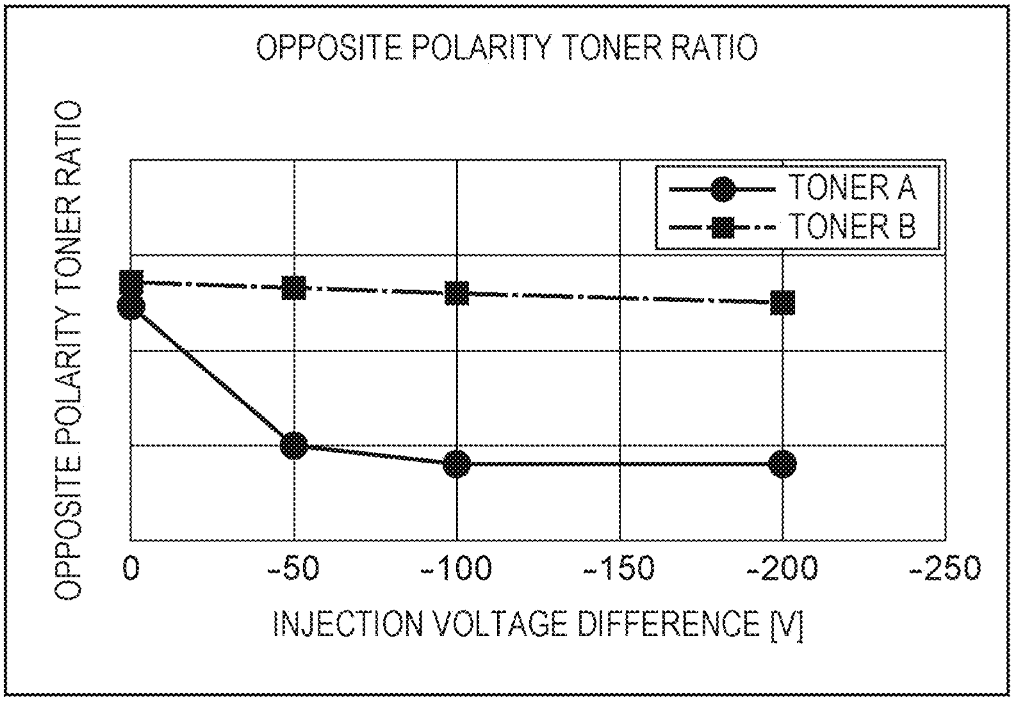
FIG. 8 is a graph showing the relationship between the injection voltage difference and the opposite polarity toner ratio in Exemplary Embodiment 1.

The charge injection properties are not exhibited only by generating an injection electric field using an injection member. FIG. 8 shows the relationship between the injection voltage difference and the opposite polarity toner ratio on the developing roller when a developing blade is used as an injection member. In the toner A, as the injection voltage difference is increased, the opposite polarity toner ratio on the developing roller is decreased. This indicates that an injection member with an injection electric field injects an electric charge into toner on the developing roller. On the other hand, in toner B in Comparative Example 1 described later, the opposite polarity toner ratio on the developing roller does not change so much even with an increase in the injection voltage difference. Thus, toner charge injection is related to the characteristics of the toner, and it can be said that the toner A is a toner with charge injection properties. It can also be said that the toner B is a toner without charge injection properties.

Figure 9:
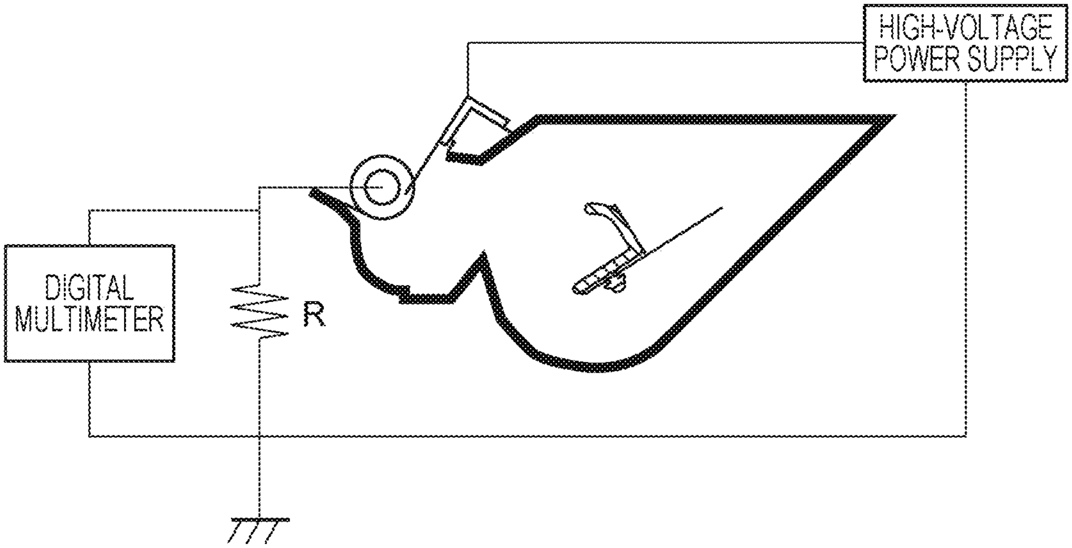
FIG. 9 is an explanatory view of a method for measuring the volume resistivity of toner in Exemplary Embodiment 1.

In an experimental system of FIG. 9, the volume resistivity of the toner can be measured to determine whether or not the toner has the charge injection properties.

The experimental system of FIG. 9 indicates a method for measuring the volume resistivity of toner in which a stainless steel developing blade of a developing apparatus is coupled to an external high-voltage power supply (MODEL 615-3 manufactured by Trek), and a developing roller is grounded via a resistor R with a resistance value $R_2$(=10 kilohms). The digital multimeter (80 series manufactured by FLUKE) is coupled to both ends of the resistor R, so that a voltage value at each end of the resistor R can be measured. The developing roller used in this measurement system has a volume resistivity of $9\times10^5$ ohm·cm and is driven at a surface velocity of 200 mm/s. The measurement is performed at a temperature of 23° C. and at a humidity of 50%. The toner on the developing roller is regulated at 0.3 mg/cm. In the experimental system of FIG. 9, outside the image-forming apparatus 1, a potential difference is formed between the surface of the developing roller, which is a rotatable rotating member, and a contact member, which is a developing blade in contact with the surface of the rotating member. In this case, each of the rotating member and the contact member preferably has a resistance value of $1.0\times10^4$ ohms or less.

In the measurement, when the external high-voltage power supply is set to a direct-current voltage of $V_2$(=−200 V), an electric current (hereinafter referred to as a development current) flows from the developing blade to the developing roller through a toner layer formed on the developing roller. At this time, the electric current $I_2$ ($I_2=V_2/R_2$) flowing through the resistor R is calculated using Ohm's law from the average voltage $V_2$ of the digital multimeter detected approximately 30 seconds after the electric current is stabilized from the voltage application while changing the drive and stop of the developing roller. The calculated current value $I_2$ is equal to the development current, and the resistance values of the developing roller and the developing blade are sufficiently smaller than that of the toner and can be almost ignored. Thus, the resistance value $R_T$ of the toner between the developing roller and the developing blade can be calculated using Ohm's law ($R_T=V_2/I_2$).

Although the toner resistance value is calculated in the experimental system using the developing apparatus in the present exemplary embodiment, the present invention is not limited thereto. For example, a thin layer of toner may be disposed on the developing roller and may be in contact with the developing blade.

Figure 10:
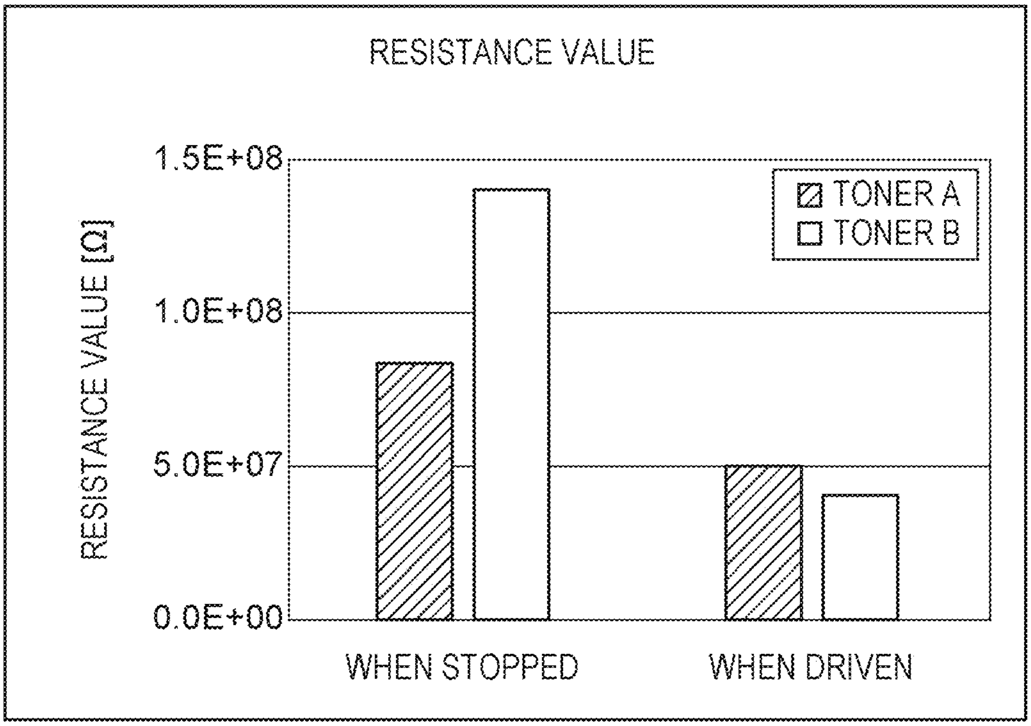
FIG. 10 is a graph showing the difference in toner volume resistivity at the time of stopping and at the time of driving in Exemplary Embodiment 1.

FIG. 10 shows the results of the toner resistance value calculated from the development current measured in the experimental system of FIG. 9.

The toner A used in Exemplary Embodiment 1 had charge injection properties and had a resistance value of $8.3\times10^7$ ohms at the time of stopping and $5.0\times10^7$ ohms at the time of driving. On the other hand, the toner B without charge injection properties had a resistance value of $1.4\times10^8$ ohms at the time of stopping and $4.0\times10^7$ ohms at the time of driving.

When the toner on the developing roller has an electric charge, the electric charge of the toner flows toward the developing roller due to the influence of the electric field in a regulation region, increases the development current, and decreases the toner resistance value. The toner B without charge injection properties does not have friction with another member at the time of stopping and therefore has no electric charge. On the other hand, at the time of driving, due to friction with another member, the toner B has an electric charge. Thus, the calculated toner resistance value is lower at the time of driving than at the time of stopping. In the toner A with charge injection properties, an electric charge is injected into the toner due to the electric field of the regulation region even at the time of stopping, and the toner A has a lower toner resistance value than the toner B at the time of stopping. Thus, the difference in the toner resistance value between the time of stopping and the time of driving is smaller in a toner with charge injection properties than in a toner without the charge injection properties.

Intensive studies by the present inventors showed that a toner with charge injection properties should have the following combination of the resistance value and the amount of change in resistance value.

The resistance value at the time of stopping ranges from $10^5$ to $10^8$ ohms.

The resistance value at the time of driving (200 mm/s) is 40% or more of that at the time of stopping.

A charge injection toner needs to have a resistance value of $1.0\times10^5$ ohms or more. This is for the purpose of reducing charge decay and establishing a process, such as transfer.

More specifically, a toner has a first resistance value in the range of $1.0\times10^5$ ohms to $1.0\times10^8$ ohms as measured in a state where the rotating member is stopped and in a state where the developer is located between the rotating member and the contact member. A toner to be used has a measured second resistance value in the range of the first resistance value and 40% or more with respect to the first resistance value in a state where the rotating member is rotated at 200 mm/s with respect to the contact member and in a state where the toner is located between the rotating member and the contact member.

(Relationship Between Outermost Surface Layer of Photosensitive Drum 21 and Volume Resistivity of Developing Roller 31)

As a result of extensive studies, the present inventors have found that the charge leakage to the developing roller 31 can be significantly reduced when the volume resistivity of the outermost surface layer of the photosensitive drum 21 and the volume resistivity of the developing roller 31 satisfy the relationship of the following formula (5):

$$\log_{10}\rho_d > 0.05\log_{10}\rho_p + 6 \qquad \text{formula (5)}$$

$\rho_p$ denotes the volume resistivity of the outermost surface of the photosensitive drum 21, and $\rho_d$ denotes the volume resistivity of the developing roller 31.

To increase the toner charge amount to be saturated in the development region, there are an approach of increasing the amount of electric charge applied from the photosensitive drum 21 to toner and an approach of reducing the amount of charge leakage from toner to the developing roller 31. The former approach has a correlation with $\rho_p$, and the amount of electric charge applied from the photosensitive drum 21 to toner increases as $\rho_p$ decreases. The latter approach is correlated with $\rho_d$, and the amount of charge leakage from the toner to the developing roller 31 decreases as $\rho_d$ increases. The amount of change in the toner charge amount in the development region depends on the balance between the amount of applied electric charge and the amount of charge leakage. Thus, an appropriate relationship between the value of $\rho_p$ and the value of $\rho_a$ can increase the toner charge amount to the saturated charge amount and reduce the charge leakage to the developing roller 31. The formula (5) indicates an appropriate relationship between the value of $\rho_p$ and the value of $\rho_d$.

(Influence of Electrostatic Capacitance of Developing Roller)

To reduce the amount of charge leakage from the toner to the developing roller 31 in the development region, it is also necessary to control the electrostatic capacitance in addition to the volume resistivity of the developing roller 31.

Figure 11:
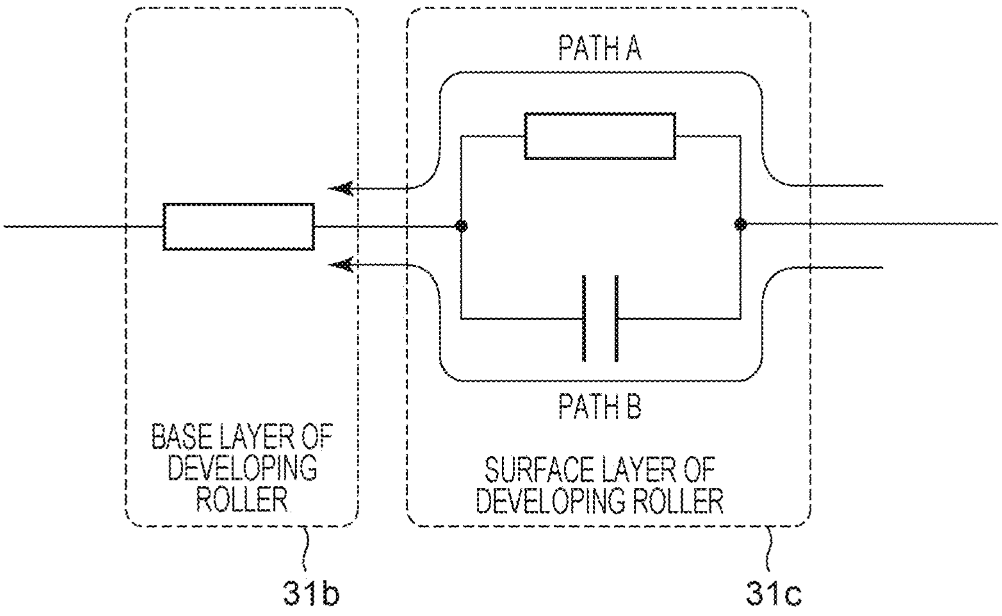
FIG. 11 is a schematic view of an equivalent circuit of the developing roller in Exemplary Embodiment 1.

FIG. 11 is a schematic view of an equivalent circuit of a portion composed of the base layer and the surface layer in the developing roller 31. Each of the base layer 31*b* and the surface layer 31*c* of the developing roller 31 can be represented by a parallel circuit of a resistor and a capacitor. The base layer 31*b* and the surface layer 31*c* of the developing roller 31 are stacked, and the equivalent circuit of the developing roller 31 can therefore be represented by connecting the parallel circuits in series. The base layer 31*b* of the developing roller 31 has high electrical conductivity, and the capacitor portion of the base layer can therefore be almost ignored and can be replaced by a simple resistor without problems. Thus, the capacitor portion of the base layer 31*b* is omitted in FIG. 11.

Next, with reference to FIG. 11, the charge leakage from the toner to the developing roller 31 is considered focusing on the path of the electric charge. The amount of charge leakage from the toner to the developing roller 31 in the development region depends on the charge inflow to the developing roller 31 through the equivalent circuit of FIG. 11. The charge inflow path in the developing roller 31 involves a path A through which an electric charge leaks via a resistor and a path B through which an electric charge flows to charge the capacitor. Thus, to reduce the amount of charge leakage to the developing roller 31, it is necessary not only to increase the resistance of the path A to reduce the charge inflow but also to reduce the electrostatic capacitance of the path B to reduce the charge amount filling the capacitance of the capacitor. Thus, the volume resistivity of the surface layer 31*c* of the developing roller 31 is increased to reduce the amount of electric charge flowing through the path A, and the electrostatic capacitance of the surface layer 31*c* of the developing roller 31 is reduced to reduce the amount of electric charge flowing through the path B. This can effectively reduce the charge leakage to the developing roller 31.

On the basis of the above, embodiments of the volume resistivity, the electrostatic capacitance, the surface resistivity, and the like of the developing roller 31 according to the present exemplary embodiment are described below.

Investigation by the present inventors showed that the developing roller 31 preferably has a volume resistivity of $1.0\times10^6$ ohm·cm or more as measured by the method described above, and the developing roller 31 used in the present exemplary embodiment had a volume resistivity of $6.0\times10^6$ ohm·cm.

Investigation by the present inventors also showed that the developing roller 31 preferably has an electrostatic capacitance of $4.0\times10^{-2}$ pF/cm$^2$ or less as measured by the method described above, and the developing roller 31 used in the present exemplary embodiment had an electrostatic capacitance of $3.8\times10^{-2}$ pF/cm$^2$.

Investigation by the present inventors also showed that the surface resistivity of the surface layer 31*c* of the developing roller 31 is preferably $1\times10^6$ ohms per square or more and $1\times10^{13}$ ohms per square or less as measured by the method described above and was $5.0\times10^9$ ohms per square in the present exemplary embodiment.

Furthermore, the development of an electrostatic latent image on the photosensitive drum 21 requires a potential difference between the surface potential of the photosensitive drum 21 and the surface potential of the developing roller 31, and the surface potential of the developing roller 31 is obtained by the development voltage applied to the base body 31*a*. More specifically, no surface potential can be obtained when the base layer 31*b* of the developing roller 31 is insulative and, therefore, the base layer 31*b* of the developing roller 31 preferably has a volume resistivity of $1\times10^5$ ohm·cm or less. The volume resistivity of the base layer 31*b* of the developing roller 31 is measured by a method similar to the method for measuring the volume resistivity of the developing roller 31 described with reference to FIG. 6. More specifically, the volume resistivity of the base layer is determined by the measurement method described with reference to FIG. 6 using a roller in which the elastic layer 31*b* is formed on the outer peripheral surface of the base body 31*a* not covered with the surface layer 31*c*. In the present exemplary embodiment, the base layer 31*b* of the developing roller 31 had a volume resistivity of $5\times10^4$ ohm·cm.

(Opposite Polarity Toner Ratio on Developing Roller and Adverse Effect in Image)

As described above, in the electrophotographic image-forming apparatus 1, a toner charged to the normal charge polarity is controlled by the electric field in each image formation process to form an image on the recording medium P.

Thus, a low charge toner with a small charge amount or an opposite polarity toner on the developing roller 31 may prevent desired control and cause unexpected detrimental effects. For example, an opposite polarity toner on the developing roller 31 is developed in an unexposed portion Vd on the photosensitive drum 21 and therefore causes so-called image fogging. Furthermore, an opposite polarity toner on the photosensitive drum 21 is not transferred onto the recording medium P in the transfer process and causes poor transfer. An increased amount of poorly transferred toner may cause an adverse effect in an image due to contamination of the charging roller 23 in a structure without a cleaning member as in the present exemplary embodiment or may cause toner puncture due to excessive waste toner even in a structure with a cleaning member.

As described above, in the electrophotographic image-forming apparatus 1, it is important to reduce the opposite polarity toner ratio on the developing roller 31.

(Charge Injection in Development Region)

In Exemplary Embodiment 1, the photosensitive drum 21 is used as an injection member to inject an electric charge in the development region and reduce the occurrence of an adverse effect in an image, such as image fogging.

(Change in Toner Charge Amount in Development Region)

With the rotation of the developing roller 31, a toner uniformly formed into a thin layer on the developing roller 31 enters the development region, which is a contact portion between the photosensitive drum 21 and the developing roller 31. The toner rolls in the development region, rubs against the photosensitive drum 21 and the developing roller 31, and is triboelectrically charged. Furthermore, the toner is attracted to the developing roller 31 side by the force of the electric field in an electric potential relationship in which the surface potential of the photosensitive drum 21 in the development region is higher in absolute value on the normal charge polarity side of the toner than the surface potential (development voltage) of the developing roller 31. This makes it easy for the toner to follow the movement of the developing roller 31 and increases the amount of toner rubbed against the photosensitive drum 21 as compared with the amount of toner rubbed against the developing roller 31. Thus, the amount of electric charge received by the toner in the development region due to triboelectric charging is dominantly due to triboelectric charging between the toner and the photosensitive drum 21. In the present exemplary embodiment, the triboelectric series of the toner is on the negative charge side with respect to the photosensitive drum 21, and the toner therefore receives an electron from the photosensitive drum 21 due to triboelectric charging in the development region.

Furthermore, when the toner surface has an electrically conductive portion and there is such an electric potential relationship that the surface potential of the photosensitive drum 21 in the development region is higher on the normal charge polarity side of the toner than the surface potential of the developing roller 31, injection charging also occurs from the photosensitive drum 21 to the toner in the development region. The injection charging occurs at the contact portion between the photosensitive drum 21 and the toner when an electric charge on the surface of the photosensitive drum 21 moves to the toner surface by the force of the electric field. Since the toner used in the present exemplary embodiment is negatively chargeable, in an electric potential relationship in which the surface potential of the photosensitive drum 21 is higher on the negative charge polarity side than the surface potential of the developing roller 31, an electron on the surface of the photosensitive drum 21 is injected into the electrically conductive portion of the toner surface and increases the toner charge amount. It is known that charge application to toner by injection charging tends to depend on the surface layer resistance of the photosensitive drum 21 and the electric field strength of the development region and is less likely to be affected by the friction amount of the toner in the development region.

(Change in Surface Potential of Image-Bearing Member Due to Passage Through Development Region)

In the photosensitive drum 21 according to the present invention, an electric charge is applied from the photosensitive drum 21 to toner in the development region. For example, when a negatively chargeable toner is used, an electron on the surface of the photosensitive drum 21 moves to the toner and increases the toner charge amount. Electron transfer from the photosensitive drum 21 to the toner decreases the surface potential of the photosensitive drum 21 charged to a negative polarity during passage through the development region. This indicates that the amount of electric charge applied from the photosensitive drum 21 to the toner increases with the amount of decrease in the surface potential.

As a result of extensive studies, the present inventors have found that the photosensitive drum 21 that applies a sufficient amount of electric charge to toner in the development region is characterized by the amount of decrease in the surface potential of the photosensitive drum 21 during passage through the development region. More specifically, when the developing roller 31 is brought into contact with the photosensitive drum 21 at a surface velocity 40% higher than the surface velocity of the photosensitive drum 21, the photosensitive drum 21 after passage through the development region has a surface potential 3% or more lower than the surface potential of the photosensitive drum 21 before passage through the development region. For example, when the photosensitive drum 21 before passage through the development region has a surface potential of −600 V, the photosensitive drum 21 that is applicable has a surface potential of −582 V or less after passage through the development region at the developing peripheral speed difference described above.

The change in the surface potential of the photosensitive drum 21 due to passage through the development region was measured with a process cartridge modified so that a surface potential meter could be disposed on the surface of the photosensitive drum 21 on the upstream and downstream sides of a development region portion. The photosensitive drum 21 before passage through the development region was charged to a surface potential of −600 V using the charging brush 22 and the charging roller 23, and the developing roller 31 was brought into contact with the photosensitive drum 21 at a surface velocity 40% higher than the surface velocity of the photosensitive drum 21. The surface potential of the photosensitive drum 21 after passage through the development region was decreased to −564 V. Thus, the surface potential of the photosensitive drum 21 was decreased by 6% from the surface potential of the photosensitive drum 21 before passage through the development region.

(Influence of Developing Peripheral Speed Difference)

The amount of applied electric charge and the amount of charge leakage in the development region change with the developing peripheral speed difference.

As described above, the amount of electric charge applied from the photosensitive drum 21 to toner is mainly derived from triboelectric charging and injection charging. The triboelectric charge amount increases with the friction amount between the photosensitive drum 21 and toner in the development region and therefore increases with the developing peripheral speed difference. In particular, the use of the photosensitive drum 21 having a surface layer with a low electrical resistance increases the dependence of the triboelectric charge amount on the developing peripheral speed difference. On the other hand, the injection charge amount is less likely to be affected by the friction amount between the photosensitive drum 21 and toner and therefore changes little even when the developing peripheral speed difference changes.

It is known that the amount of charge leakage from toner to the developing roller 31 depends on the time required for the toner to pass through the development region and decreases as the passage time decreases. Toner is attracted to the developing roller 31 side by the force of the electric field in an electric potential relationship in which the surface potential of the photosensitive drum 21 in the development region is higher in absolute value on the normal charge polarity side of the toner than the surface potential of the developing roller 31. Thus, as the rotational speed of the developing roller 31 increases, the time required for a toner particle to pass through the development region decreases, and the amount of charge leakage decreases.

From the above, for example, in an image-forming system in which the surface velocity of the developing roller 31 is made faster than the surface velocity of the photosensitive drum 21 in an image-forming period, as the developing peripheral speed difference increases, the amount of applied electric charge increases, and the amount of charge leakage decreases. Thus, it is understood that the charge balance of toner in the development region increases to the side on which the toner charge amount increases.

In the present exemplary embodiment, the developing peripheral speed difference is provided by making the surface velocity of the developing roller 31 faster than the surface velocity of the photosensitive drum 21. However, the same charge application effects can be obtained even when the surface velocity of the developing roller 31 is made slower than the surface velocity of the photosensitive drum 21 to provide the developing peripheral speed difference.

Although a contact developing method with a developing peripheral speed difference is used in the present exemplary embodiment, the present invention is not limited thereto. It is sufficient if the photosensitive drum 21 can inject an electric charge as an injection member into toner on the developing roller 31 and, for example, a contact developing method without a developing peripheral speed difference may also be used.

Exemplary Embodiment 2

In Exemplary Embodiment 2, the following toner C was used. The image fog density before and after the use of the cartridge was evaluated using the same configuration as in Exemplary Embodiment 1 except for the toner.

(Toner)

Production Example of Toner Particles C

A toner base particle dispersion liquid was adjusted in the same manner as in the production example described in Exemplary Embodiment 1. The dispersion liquid was adjusted to pH 1.5 with 1 mol/L hydrochloric acid, was stirred for 1.0 hour, was filtered while being washed with deionized water, and was dried. The resulting powder was classified with a wind classifier to prepare toner particles C.

The toner particles C had a number-average particle diameter (D1) of 6.2 μm and a weight-average particle diameter (D4) of 6.7 μm.

Production Example of Toner C

| | |
|---|---|
| Toner particles C | 100.0 parts |
| Silicon dioxide (number-average particle diameter: 102 nm) | 2.0 parts |

These materials were charged into SUPERMIXER PICCOLO SMP-2 (manufactured by Kawata Mfg. Co., Ltd.) and were mixed at 3000 rpm for 5 minutes while the inside of the tank was heated to 45° C. by charging warm water at 45° C. into the jacket.

| | |
|---|---|
| Fine hydrophobic silica particles | 2.0 parts |
| Rutile titanium oxide (number-average particle diameter: 33 nm, volume resistivity: $1.8 \times 10^8$ ohms · m) | 6.0 parts |

These materials were then charged into SUPERMIXER PICCOLO SMP-2 (manufactured by Kawata Mfg. Co., Ltd.) and were mixed at 3000 rpm for 10 minutes while the inside of the tank was maintained at 20° C. by charging cold water at 20° C. into the jacket. The mixture was sieved with a mesh with an opening of 150 μm to prepare toner C.

Observation of the toner C in the same manner as in Exemplary Embodiment 1 showed the presence of titanium on the toner surface. The existence region of titanium had an average value of areas of 1400 $nm^2$ and a coefficient of variation of 7.5. The protrusion height was 60 nm.

The resistance value of the toner C measured in the same manner as in Exemplary Embodiment 1 was $7.3\times10^7$ ohms at the time of stopping and $2.9\times10^7$ ohms at the time of driving. Thus, the toner resistance value at the time of driving is 40% of the toner resistance value at the time of stopping, and the toner has the charge injection properties.

Comparative Example 1

To describe the effects of Exemplary Embodiments 1 and 2 in more detail, Comparative Example 1 is described.

The image fog density before and after the use of the cartridge was evaluated using the same configuration as in Exemplary Embodiment 1 except for the toner. For the toner B in Comparative Example 1, the polyvalent acid metal salt adhering step for the toner A of Exemplary Embodiment 1 was omitted. The toner B contained no electrically conductive material on the surface thereof and had a resistance value of $1.4\times10^8$ ohms at the time of stopping and $4.0\times10^7$ ohms at the time of driving. Thus, the toner volume resistivity at the time of driving is 29% of the toner volume resistivity at the time of stopping.

Comparative Example 2

To describe the effects of Exemplary Embodiments 1 and 2 in more detail, Comparative Example 2 is described.

The image fog density before and after the use of the cartridge was evaluated using the same configuration as in Exemplary Embodiment 1 except for the photosensitive drum. In Comparative Example 2, a photosensitive drum A was used in which the fifth layer (charge injection layer) was omitted from the photosensitive drum 21 in Exemplary Embodiment 1 or 2. At this time, the surface layer (charge transport layer 21e) had a volume resistivity of $1\times10^{17}$ ohm·cm.

Effects of Exemplary Embodiments 1 and 2

Advantages of Exemplary Embodiments 1 and 2 Over Comparative Examples 1 and 2

Advantages of Exemplary Embodiments 1 and 2 over Comparative Examples 1 and 2 are described below.

Table 2 shows the results of the image fog density before and after the use of the cartridge in Exemplary Embodiments 1 and 2 and Comparative Examples 1 and 2.

The image fog density was measured in a non-image area with a reflection densitometer manufactured by Tokyo Denshoku Co., Ltd. The acceptable value of the difference between the density of the non-image area and the reference density (hereinafter referred to as the image fog density) was 4%. The difference equal to or lower than the acceptable value was OK, and the difference above the acceptable value was NG.

TABLE 2

| | Toner | Injection member | Before use of cartridge Image fog density | After use of cartridge Image fog density |
|---|---|---|---|---|
| Exemplary Embodiment 1 | A | Photosensitive drum 21 | OK | OK |
| Exemplary Embodiment 2 | C | Photosensitive drum 21 | OK | OK |
| Comparative Example 1 | B | Photosensitive drum 21 | OK | NG |
| Comparative Example 2 | A | Photosensitive drum A | OK | NG |

In Exemplary Embodiments 1 and 2, the image fog density is stable before and after the use of the cartridge and does not exceed the acceptable value.

On the other hand, in Comparative Example 1, the image fog density after the use of the cartridge was NG. In Comparative Example 1, no electrically conductive material is present on the surface of the toner B, and an electric charge is applied to the toner by triboelectric charging with a member, such as the developing blade 35 or the photosensitive drum 21. Furthermore, the toner surface changed with the use of the cartridge, and the work function of the toner changed. This resulted in an insufficient amount of electric charge applied to the toner by triboelectric charging, decreased the toner charge amount, and increased the opposite polarity toner ratio. Thus, the image fog density after the use of the cartridge was NG.

In Comparative Example 2, the image fog density after the use of the cartridge was NG. In Comparative Example 2, the surface layer of the photosensitive drum A has a high volume resistivity, and an electric charge cannot be applied to the toner in the development region. Thus, an electric charge was applied to the toner by triboelectric charging, and as in Comparative Example 1 the opposite polarity toner ratio increased after the use of the cartridge, and the image fog density was NG.

In Exemplary Embodiments 1 and 2, the toner with charge injection properties and the photosensitive drum 21 with a low volume resistivity are used, and an electric charge is therefore injected into the toner in the development region. Thus, even in the toner in which the work function of the surface changed with the use of the cartridge, an electric charge was sufficiently applied to the toner, and the opposite polarity toner ratio did not increase. Thus, the image fog density after the use of the cartridge was OK.

The evaluation showed superiority of Exemplary Embodiments 1 and 2 to Comparative Examples 1 and 2.

Exemplary Embodiment 3

An image-forming apparatus according to Exemplary Embodiment 3 is described below. Parts common to Exemplary Embodiment 1 are not described here.

(Charge Injection Before Development Region)

In Exemplary Embodiment 3, the electrically conductive developing blade 35 and the developing roller 31 with a predetermined volume resistivity can be used for layer regulation of toner and charge injection into the toner in the regulation region. In the present exemplary embodiment, a steel sheet plate is used as the developing blade 35.

Furthermore, the voltage applied to the developing blade 35 is set to be higher in absolute value on the normal charge polarity side of the toner than that to the developing roller 31, and the injection voltage difference is set to −100 V.

Such charge injection before the development region is effective in stabilizing the toner charge amount on the developing roller 31 irrespective of the development method. Although Exemplary Embodiment 1 employed the contact developing method in which the photosensitive drum 21 and the developing roller 31 are in contact with each other for development, Exemplary Embodiment 3 is not limited thereto. For example, the present invention is also effective in a so-called jumping development method in which the photosensitive drum 21 and the developing roller 31 are opposed to each other in a non-contact manner and an alternating voltage is applied to the developing roller 31 for development.

An injection member for injecting an electric charge to toner from a member surface charged in advance as in Exemplary Embodiment 1 preferably has a volume resistivity of $1\times10^{14}$ ohm·cm or less. A member for injecting an electric charge into toner by directly applying a voltage, such as the injection member used in the present exemplary embodiment, preferably has a volume resistivity of $1\times10^{6}$ ohm·cm or more.

Although the developing blade 35 is used as an injection member in the present exemplary embodiment, the present invention is not limited thereto. It is sufficient if an injection member is located in front of the development region, and the volume resistivity $\rho_i$ of the injection member and the volume resistivity $\rho_d$ of the developing roller 31 satisfy the relationship of the formula (5). For example, an injection member may be independently provided downstream of the developing blade 35. Furthermore, the injection member is not limited to the above, provided that the injection member has a function of coming into contact with the developing roller 31 and injecting an electric charge into toner, and may be a supply roller that supplies toner to the developing roller 31.

Although a configuration in which the charge injection in the regulation region is added to the charge injection in the development region in Exemplary Embodiment 1 is proposed in the present exemplary embodiment, the present invention is not limited thereto. Even when an electric charge cannot be injected in the development region, the toner charge amount in the regulation region is effectively increased and, for example, a photosensitive drum including a charge injection layer with a volume resistivity of more than $1.0\times10^{14}$ ohm·cm may be used.

Exemplary Embodiment 4

The image fog density before and after the use of the cartridge was evaluated in the same manner as in Exemplary Embodiment 3 except for the surface layer of the developing roller 31. In the present exemplary embodiment, a surface layer coating liquid was prepared by adding a silicone surfactant (trade name: TFS4446, manufactured by Momentive Performance Materials Inc.) to the surface layer coating liquid for forming the polyurethane composition used in Exemplary Embodiment 3 in an amount of 3 parts by mass % based on the polyurethane resin. The surface layer coating liquid was then applied to the outer periphery of a base layer formed of silicone rubber and was air-dried at 23° C. for 30 minutes. It was then dried for 1 hour in a hot-air circulating dryer set at 160° C. to form a surface layer with a thickness of 10 μm. The developing roller 31 used in the present exemplary embodiment had a volume resistivity of $6.0\times10^{6}$ ohm·cm and an electrostatic capacitance of $3.8\times10^{-2}$ pF/cm$^2$. Furthermore, the surface layer of the developing roller 31 used in the present exemplary embodiment had a surface resistivity of $2\times10^{9}$ ohms per square.

Exemplary Embodiment 5

The image fog density before and after the use of the cartridge was evaluated in the same manner as in Exemplary Embodiment 3 except for the surface layer of the developing roller 31. In the present exemplary embodiment, a surface layer coating liquid was prepared by adding a fluorinated surfactant (trade name: Megaface F444, manufactured by DIC Corporation) to the surface layer coating liquid for forming the polyurethane composition used in Exemplary Embodiment 3 in an amount of 3 parts by mass % based on the polyurethane resin. The surface layer coating liquid was then applied to the outer periphery of a base layer formed of silicone rubber and was air-dried at 23° C. for 30 minutes. It was then dried for 1 hour in a hot-air circulating dryer set at 160° C. to form a surface layer with a thickness of 10 μm. The developing roller 31 used in the present exemplary embodiment had a volume resistivity of $6.0\times10^{6}$ ohm·cm and an electrostatic capacitance of $3.9\times10^{-2}$ pF/cm$^2$. Furthermore, the surface layer of the developing roller 31 used in the present exemplary embodiment had a surface resistivity of $1\times10^{9}$ ohms per square.

Exemplary Embodiment 6

The image fog density before and after the use of the cartridge was evaluated in the same manner as in Exemplary Embodiment 4 except for the developing blade 35. In the present exemplary embodiment, the developing blade 35 made of silicone rubber to which 20 parts by mass of carbon black was added was used. The developing blade 35 used in the present exemplary embodiment had a volume resistivity of $1.0\times10^{6}$ ohm·cm.

Comparative Example 3

To describe the effects of Exemplary Embodiments 3 to 6 in more detail, Comparative Example 3 is described.

The image fog density before and after the use of the cartridge was evaluated using the same configuration as in Exemplary Embodiment 3 except for the toner. The toner B used in Comparative Example 3 has a resistance value of $1.4\times10^{8}$ ohms at the time of stopping and $4.0\times10^{7}$ ohms at the time of driving.

Effects of Exemplary Embodiments 3 to 6

Advantages of Exemplary Embodiments 3 to 6 Over Comparative Example 3

Advantages of Exemplary Embodiments 3 to 6 over Comparative Example 3 are described below.

Table 3 shows the results of the image fog density before and after the use of the cartridge in the configurations of Exemplary Embodiments 3 to 6 and Comparative Example 3.

TABLE 3

| | Toner | Before use of cartridge Image fog density | After use of cartridge Image fog density |
|---|---|---|---|
| Exemplary Embodiment 3 | A | OK | OK |

TABLE 3-continued

| | Toner | Before use of cartridge Image fog density | After use of cartridge Image fog density |
|---|---|---|---|
| Exemplary Embodiment 4 | A | OK | OK |
| Exemplary Embodiment 5 | A | OK | OK |
| Exemplary Embodiment 6 | A | OK | OK |
| Comparative Example 3 | B | OK | NG |

In Exemplary Embodiments 3 to 6, the image fog density is stable before and after the use of the cartridge and does not exceed the acceptable value. More specifically, Exemplary Embodiments 4 and 5 had a lower image fog density and better results than Exemplary Embodiment 3. Furthermore, Exemplary Embodiment 6 had a much lower image fog density and much better results.

The work function of each developing roller 31 used in Exemplary Embodiments 3 to 6 was evaluated by the following method. Two developing rollers 31 were selected from the developing rollers 31 used in Exemplary Embodiments 3 to 6 and were rubbed during electric charge measurement with an electrometer (Model 6514 system electrometer). At this time, the work function was relatively evaluated depending on which of the developing rollers 31 was negatively charged or positively charged. As a result, the developing rollers 31 used in Exemplary Embodiments 4 and 5 were more likely to be negatively charged and had a higher work function than the developing roller 31 used in Exemplary Embodiment 3. The developing rollers 31 used in Exemplary Embodiments 4 and 5 had the same work function.

The work function of each developing blade 35 used in Exemplary Embodiments 3 to 6 was also evaluated by the same method. As a result, the developing blade 35 made of silicone rubber used in Exemplary Embodiment 6 was more likely to be negatively charged and had a higher work function than the stainless steel plate used in Exemplary Embodiments 3 to 5.

From these results, in the configurations of Exemplary Embodiments 4 to 6, it is thought that the ratio of low-charged toner or opposite polarity toner is reduced by charge injection from the developing blade 35 to the toner in the regulation region, and the following effects are obtained. That is, the developing roller 31 or the developing blade 35 containing a silicone or fluorinated material has a work function closer to the work function of a negatively chargeable toner, which reduces triboelectric charging. In the triboelectric charging, in the regulation region, the charge amount changes with the opportunity that toner rubs against the developing roller 31 or the developing blade 35 or between toner particles, and the charge distribution of the toner therefore tends to be broad. Thus, when the triboelectric charging is reduced, the charge distribution of the toner becomes sharp, and the ratio of toner with an excessive charge amount decreases. Thus, it is thought that charge injection from the developing blade 35 to toner in the regulation region further decreased the ratio of low-charged toner or opposite polarity toner and further improved the image fog density. This thought can also be applied to a positively chargeable toner, and image fogging can be further reduced by decreasing the difference in work function between the toner and the developing roller 31 or between the toner and the developing blade 35 and then injecting an electric charge into the toner.

The difference in work function between toner and the developing roller 31 or between toner and a regulating member may be reduced by a method of using a resin to which the charge control agent is added for the developing roller 31 or the regulating member, but the present invention is not limited this method. Furthermore, the work function of toner may be brought close to the work function of the developing roller 31 or the developing blade 35, for example, by an external additive agent or the like.

On the other hand, in Comparative Example 3, the image fog density after the use of the cartridge was NG. In Comparative Example 3, no electrically conductive material is present on the toner surface, and an electric charge is applied to the toner by triboelectric charging. The toner surface changed with the use of the cartridge, and the work function of the toner changed. This resulted in an insufficient amount of electric charge applied to the toner by triboelectric charging, decreased the toner charge amount, and increased the opposite polarity toner ratio. Thus, the image fog density after the use of the cartridge was NG.

The evaluation showed superiority of Exemplary Embodiments 3 to 6 to Comparative Example 3.

Exemplary Embodiment 7

In Exemplary Embodiment 7, the following image-forming apparatus 160 was used.

Figure 12A:
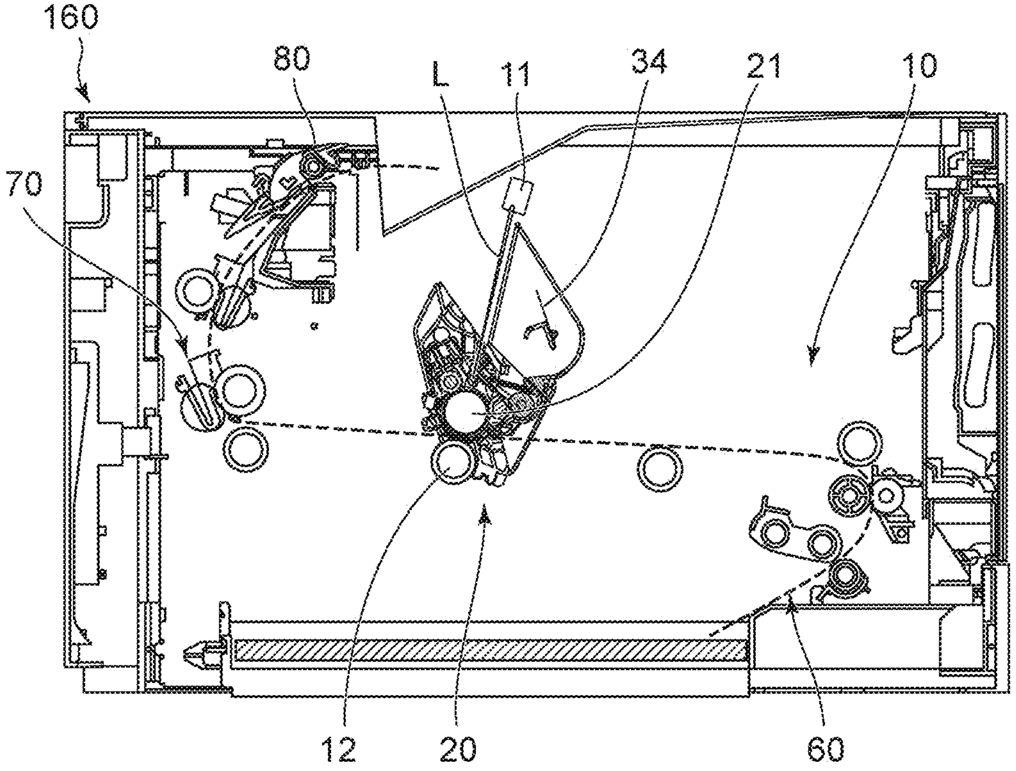
FIG. 12A is a schematic cross-sectional view of an image-forming apparatus and a process cartridge in Exemplary Embodiment 7.
Figure 12B:
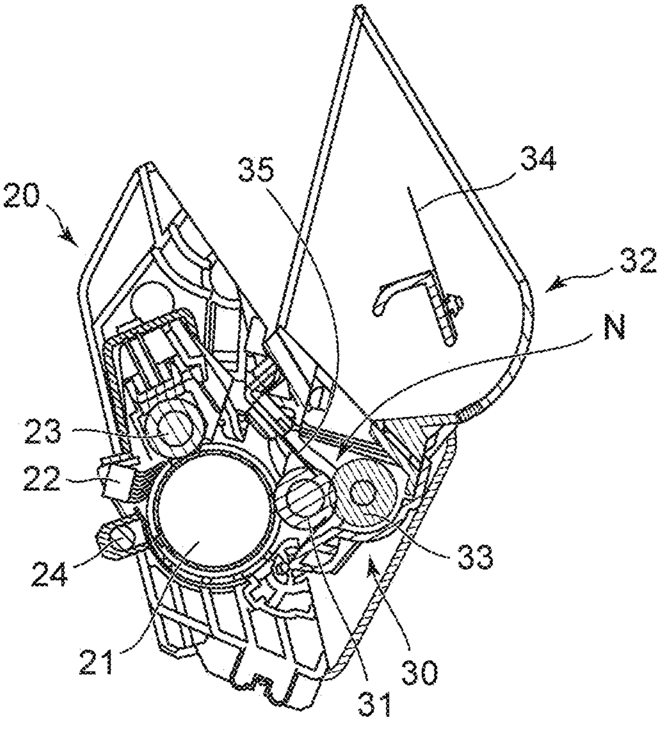
FIG. 12B is a schematic cross-sectional view of an image-forming apparatus and a process cartridge in Exemplary Embodiment 7.

FIGS. 12A and 12B are schematic views of the structure of the image-forming apparatus 160 according to Exemplary Embodiment 7.

In Exemplary Embodiment 7, a process cartridge 20 similar to that in Exemplary Embodiment 3 was evaluated with the image-forming apparatus 160, which was different from that in Exemplary Embodiment 3.

The image-forming apparatus 160 is a monochrome printer that forms an image on a recording medium P based on image information input from an external device in the same manner as the image-forming apparatus 1. As illustrated in FIGS. 12A and 12B, the image-forming apparatus 160 includes an image-forming portion 10 that forms a toner image on the recording medium P. It also includes a feed portion 60 that feeds the recording medium P to the image-forming portion 10, a fixing portion 70 that fixes the toner image formed by the image-forming portion 10 to the recording medium P, and a discharge roller pair 80.

In Exemplary Embodiment 7, a voltage was applied to a developing blade 35 in the process cartridge 20 illustrated in FIG. 12B at an injection voltage difference of −200 V with respect to the developing roller 31.

Exemplary Embodiment 8

In Exemplary Embodiment 8, the following image-forming apparatus 161 was used.

Figure 13A:
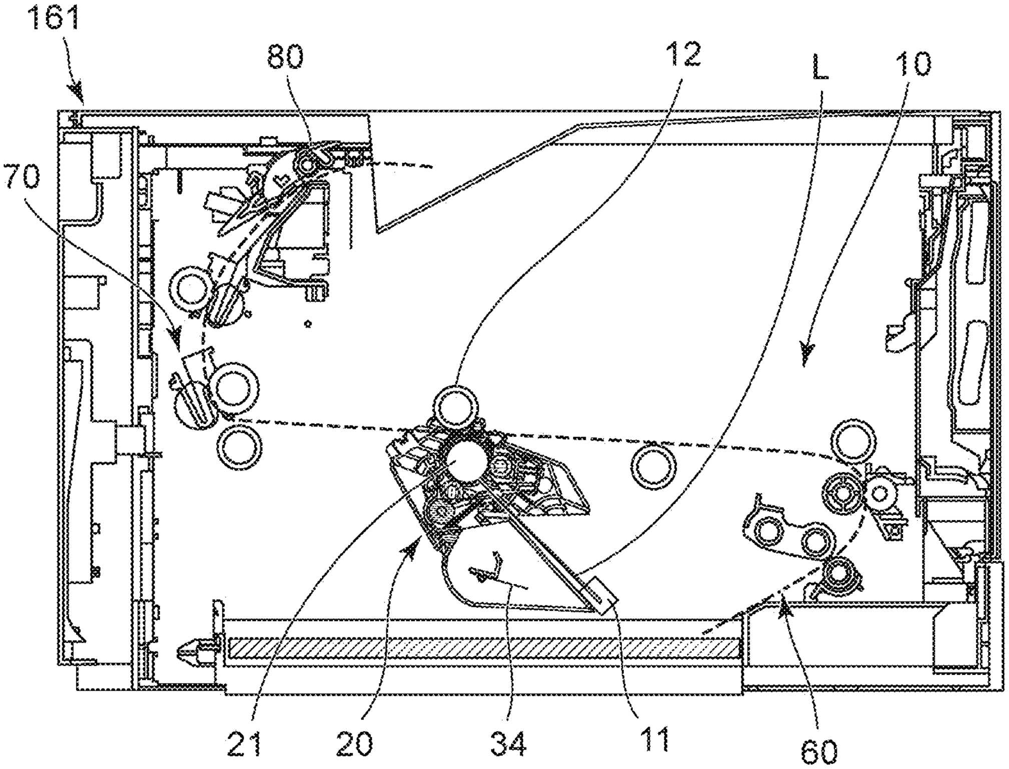
FIG. 13A is a schematic cross-sectional view of an image-forming apparatus and a process cartridge in Exemplary Embodiment 8.
Figure 13B:
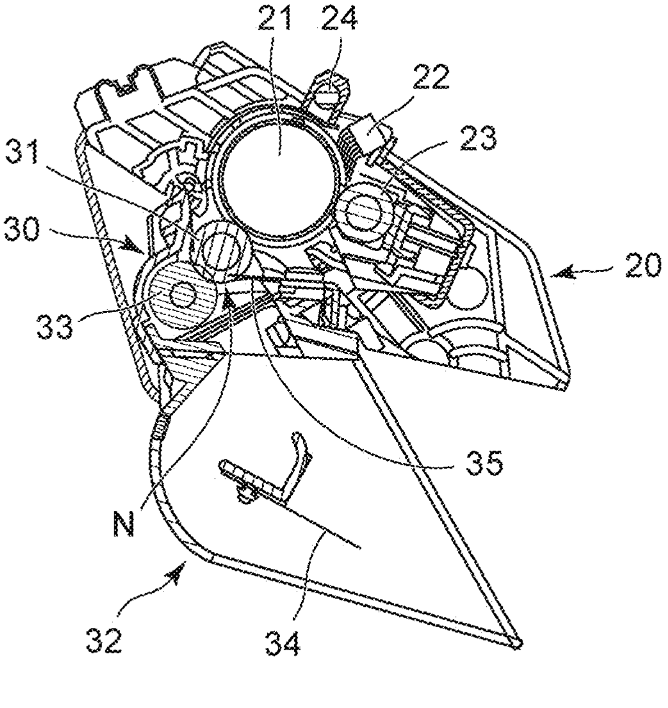
FIG. 13B is a schematic cross-sectional view of an image-forming apparatus and a process cartridge in Exemplary Embodiment 8.

FIGS. 13A and 13B are schematic views of the structure of an image-forming apparatus 161 according to Exemplary Embodiment 8. As compared with the image-forming apparatus 160 in FIGS. 12A and 12B, the image-forming apparatus 161 includes the process cartridge at a different insertion position and the scanner unit 11 at a different position.

In Exemplary Embodiment 8, the same process cartridge 20 as in Exemplary Embodiment 7 was evaluated in the image-forming apparatus 161. As in Exemplary Embodiment 7, the voltage applied to the developing blade 35 was set to −200 V with respect to the developing roller 31.

Comparative Example 4

To describe the effects of Exemplary Embodiments 7 and 8 in more detail, Comparative Example 4 is described.

In Comparative Example 4, the toner B was used in the process cartridge 20 of Exemplary Embodiment 7, and the evaluation was performed with the image-forming apparatus 160 of Exemplary Embodiment 7.

Comparative Example 5

To describe the effects of Exemplary Embodiments 7 and 8 in more detail, Comparative Example 5 is described.

In Comparative Example 5, the toner B was used in the process cartridge 20 of Exemplary Embodiment 8, and the evaluation was performed with the image-forming apparatus 161 of Exemplary Embodiment 8.

Effects of Exemplary Embodiments 7 and 8

Advantages of Exemplary Embodiments 7 and 8 Over Comparative Examples 4 and 5

Advantages of Exemplary Embodiments 7 and 8 over Comparative Examples 4 and 5 are described below.

Table 4 shows the results of the image fog density before and after the use of the cartridge in Exemplary Embodiments 7 and 8 and Comparative Examples 4 and 5.

TABLE 4

| | Toner | Image-forming apparatus | Before use of cartridge Image fog density | After use of cartridge Image fog density |
|---|---|---|---|---|
| Exemplary Embodiment 7 | A | 160 | OK | OK |
| Exemplary Embodiment 8 | A | 161 | OK | OK |
| Comparative Example 4 | B | 160 | OK | NG |
| Comparative Example 5 | B | 161 | OK | NG |

In Exemplary Embodiments 7 and 8, the image fog density is stable before and after the use of the cartridge and does not exceed the acceptable value. More specifically, Exemplary Embodiment 8 had a lower image fog density and better results than Exemplary Embodiment 7.

(Evaluation of Injection Charging Ratio of Toner Charge Amount)

To investigate the reason why Exemplary Embodiment 8 had a lower image fog density than Exemplary Embodiment 7, the toner charge amount on the developing roller 31 was measured as described below.

In an environment of a temperature of 23.0° C. and a relative humidity of 50%, an image-forming operation was stopped while a solid white image was printed. The developing roller 31 was taken out from the developing apparatus 30, and the toner charge amount was measured on the developing roller 31 after passage through a contact region (hereinafter referred to as a blade nip) between the developing blade 35 and the developing roller 31. The toner charge amount was measured by calculating the average charge amount using an E-Spart analyzer manufactured by Hosokawa Micron Corporation. The average charge amount is denoted by $Q_1$ when a voltage is applied to the developing blade 35 at an injection voltage difference of 0 V with respect to the developing roller 31 and is denoted by $Q_2$ when a voltage is applied at an injection voltage difference of −200 V. The injection charging ratio 80 of the toner charge amount at the time of passage through the blade nip was determined using the following formula (6):

$$\delta Q=(Q_2-Q_1)/Q_2 \quad \text{formula (6)}$$

δQ was 5.1% in Exemplary Embodiment 7 and 13.1% in Exemplary Embodiment 8.

The results showed that Exemplary Embodiment 8 had a higher injection charging ratio of the toner charge amount than Exemplary Embodiment 7. When toner is supplied from above the developing roller 31 in the gravitational direction as in Exemplary Embodiment 7, the toner is supplied by its own weight. Thus, the toner tends to stagnate at a position N before passage through the blade nip illustrated in FIG. 12B, thus increasing an opportunity that the toner is triboelectrically charged by contact between toner particles, contact with a peripheral member, or the like. Thus, injection charging of the toner triboelectrically charged to some extent from the electric field of the developing blade 35 reduces the room for applying an electric charge to the toner by injection. This relatively increases the proportion of toner to be charged by triboelectric charging, tends to cause variations in the electric charge of the toner, and tends to relatively increase the amount of opposite polarity toner. In Exemplary Embodiment 7 in which the toner itself is easily charged by injection, however, the image fog density does not exceed the acceptable range even after the use of the cartridge.

On the other hand, when toner is supplied from below the developing roller 31 in the gravitational direction as in Exemplary Embodiment 8, the toner is not supplied by its own weight but is supplied by the toner stirring mechanism 34, and the toner is therefore less likely to stagnate at a position N before passage through the blade nip illustrated in FIG. 13B. Due to reduced likelihood of toner stagnation, there is less opportunity for the toner to be charged by friction between toner particles or the like, less opposite polarity toner, and less variation in toner charge. Charge injection from the developing blade 35 into less triboelectrically charged toner increases the ratio of injection charging, is less likely to cause variations in the electric charge of the toner by triboelectric charging, and decreases the amount of opposite polarity toner. Furthermore, this tendency does not change even in the case of toner whose surface is changed with the use of the cartridge. Thus, Exemplary Embodiment 8 had a lower image fog density and better results.

On the other hand, in Comparative Examples 4 and 5, the image fog density after the use of the cartridge was NG. In Comparative Examples 4 and 5, no electrically conductive material is present on the toner surface, and an electric charge is applied to the toner mainly by triboelectric charging. Thus, the toner is charged by triboelectric charging irrespective of the way of supplying the toner, the opposite polarity toner ratio tends to increase, and the image fog density was NG after the use of the cartridge in which the toner was changed due to durability.

The evaluation showed superiority of Exemplary Embodiments 7 and 8 to Comparative Examples 4 and 5.

Thus, the present exemplary embodiment has the following features.

The developing apparatus 30 is used for the image-forming apparatus 1 that forms an image on the recording medium P. The developing apparatus 30 includes a developer, the developing roller 31 that can transport the developer, and a contact member that comes into contact with the surface of the developing roller 31. The contact member may be the developing blade 35. The developing blade 35 has a volume resistivity of $10^{14}$ ohm·cm or less. In a state where a potential difference is formed between a surface of a rotatable rotating member and a contact member in contact with the surface of the rotating member outside the image-forming apparatus 1, the developer satisfies the following conditions when each of the rotating member and the contact member has a resistance value of $1.0\times10^4$ ohms or less. A first resistance value ranges from $1.0\times10^5$ ohms to $1.0\times10^8$ ohms as measured in a state where the rotating member is stopped and in a state where the developer is located between the rotating member and the contact member. A second resistance value is in the range of the first resistance value and is 40% or more with respect to the first resistance value, as measured in a state where the rotating member is rotated at 200 mm/s with respect to the contact member and in a state where the developer is located between the rotating member and the contact member.

The developing roller 31 has a volume resistivity of $1.0\times10^6$ ohm·cm or more.

The developing roller 31 has an electrostatic capacitance of $4\times10^{-2}$ pF/cm$^2$ or less per unit area.

The developer contains an electrically conductive material with a volume resistance of $1\times10^{11}$ ohm·cm or less on the outermost surface thereof.

The electrically conductive material has an average value of areas of 10 nm$^2$ or more and 10,000 nm$^2$ or less and a coefficient of variation of the areas of 10.0 or less in a backscattered electron image taken with a scanning electron microscope.

The developing apparatus 30 may be a development cartridge that is detachable from the image-forming apparatus 1.

Furthermore, the process cartridge 20 is detachably mountable in the image-forming apparatus 1 that forms an image on the recording medium P. The process cartridge 20 includes the rotatable photosensitive drum 21, a developer, and the developing roller 31 that supplies the developer to the photosensitive drum 21. The photosensitive drum 21 has a volume resistivity of $10^{14}$ ohm·cm or less. In a state where a potential difference is formed between a surface of a rotatable rotating member and a contact member in contact with the surface of the rotating member outside the image-forming apparatus 1, the developer satisfies the following conditions when each of the rotating member and the contact member has a resistance value of $1.0\times10^4$ ohms or less. A first resistance value ranges from $1.0\times10^5$ ohms to $1.0\times10^8$ ohms as measured in a state where the rotating member is stopped and in a state where the developer is located between the rotating member and the contact member. A second resistance value is in the range of the first resistance value and is 40% or more with respect to the first resistance value, as measured in a state where the rotating member is rotated at 200 mm/s with respect to the contact member and in a state where the developer is located between the rotating member and the contact member.

The developing roller 31 may be configured to develop the developer by coming into contact with the photosensitive drum 21.

The image-forming apparatus 1 including the charging roller 23 that charges the surface of the photosensitive drum 21 and a charging voltage application portion that applies a charging voltage to the charging roller 23 satisfies the following. When the surface of the photosensitive drum 21 is charged and the developing roller 31 is brought into contact with the photosensitive drum 21 at a surface velocity 40% higher than the surface velocity of the photosensitive drum 21, the photosensitive drum 21 after passage through the development region is controlled to have a surface potential 3% or more lower than the surface potential of the photosensitive drum 21 before passage through the development region.

With such a configuration, the present invention can provide a developing apparatus, a process cartridge, and an image-forming apparatus that can reduce the occurrence of an adverse effect in an image caused by leakage of an electric charge injected into toner.

Next, the banding suppression effect in another exemplary embodiment is described.

1. Banding Suppression Mechanism

Even when the photosensitive drum 21 having a surficial layer with a low electrical resistance is used, the present invention reduces the occurrence of a variation in the toner charge amount caused by a variation in the developing peripheral speed difference and reduces the occurrence of the banding. A mechanism for solving this problem is described below.

(Change in Toner Charge Amount in Developing Nip)

With the rotation of the developing roller 31, a toner uniformly formed into a thin layer on the developing roller 31 enters a developing nip at which the photosensitive drum 21 and the developing roller 31 are in contact with each other. The toner rolls in the developing nip, rubs against the photosensitive drum 21 and the developing roller 31, and is triboelectrically charged. Furthermore, the toner is attracted to the developing roller 31 side by the force of the electric field in an electric potential relationship in which the surface potential of the photosensitive drum 21 in the developing nip is higher in absolute value on the normal charge polarity side of the toner than the surface potential (development voltage) of the developing roller 31. This makes it easy for the toner to follow the movement of the developing roller 31 and increases the amount of toner rubbed against the photosensitive drum 21 as compared with the amount of toner rubbed against the developing roller 31. Thus, the amount of electric charge received by the toner in the developing nip due to triboelectric charging is dominantly due to triboelectric charging between the toner and the photosensitive drum 21. In the present exemplary embodiment, the triboelectric series of the toner is on the negative charge side with respect to the photosensitive drum 21, and the toner therefore receives an electron from the photosensitive drum 21 due to triboelectric charging in the developing nip.

Furthermore, injection charging from the photosensitive drum 21 to toner also occurs when the toner has charge injection properties and there is an electric potential relationship in which the surface potential of the photosensitive drum 21 in the developing nip is higher in absolute value on the normal charge polarity side of the toner than the surface potential of the developing roller 31. It is known that an injection charging phenomenon from the photosensitive drum 21 to toner occurs when the volume resistivity of the photosensitive drum satisfies the formula (7):

$$\rho p \leq 1.0 \times 10^{14} \text{ ohm} \cdot \text{cm} \quad \text{formula (7)}$$

Whether or not toner has charge injection properties can be determined by measuring the volume resistivity of the toner as described later. The injection charging occurs at the contact portion between the photosensitive drum 21 and the toner when an electric charge on the surface of the photosensitive drum 21 moves to the toner surface by the force of the electric field. When toner with charge injection properties is negatively chargeable, in an electric potential relationship in which the surface potential of the photosensitive drum 21 is higher in absolute value on the negative charge polarity side than the surface potential of the developing roller 31, an electron on the surface of the photosensitive drum 21 is injected into the toner surface and increases the toner charge amount. It is known that charge application to toner by injection charging tends to depend on the resistivity of the outermost surface layer of the photosensitive drum 21, the resistivity of the toner, and the electric field strength of the developing nip, and is less likely to be affected by the friction amount of the toner in the developing nip.

In an electric potential relationship in which the surface potential of the photosensitive drum 21 in the developing nip is higher in absolute value on the normal charge polarity side of the toner than the surface potential of the developing roller 31, as described above, an electric charge on the normal charging side is applied from the photosensitive drum 21 to the toner. On the other hand, at a contact point between the toner and the developing roller 31, a phenomenon (referred to as charge leakage) in which an electric charge on the toner surface leaks to the developing roller 31 side occurs and decreases the toner charge amount. This charge leakage is caused by the force of the electric field in the developing nip and occurs regardless of the order of the triboelectric series of the toner and the developing roller 31.

From the above, the change in the toner charge amount in the developing nip depends on the balance between the amount of electric charge applied from the photosensitive drum 21 to toner and the amount of charge leakage from the toner to the developing roller 31. An amount of applied electric charge higher than the amount of charge leakage results in an increased toner charge amount in the developing nip, and an amount of applied electric charge lower than the amount of charge leakage results in a lower toner charge amount.

(Influence of Developing Peripheral Speed Difference)

The amount of applied electric charge and the amount of charge leakage in the developing nip change with the developing peripheral speed difference.

As described above, the amount of electric charge applied from the photosensitive drum 21 to toner is mainly derived from triboelectric charging and injection charging. The triboelectric charging amount increases with the friction amount between the photosensitive drum 21 and toner in the developing nip and therefore increases with the developing peripheral speed difference. In particular, the use of the photosensitive drum 21 having a surficial layer with a low electrical resistance increases the dependence of the triboelectric charging amount on the developing peripheral speed difference. On the other hand, the injection charging amount is less likely to be affected by the friction amount between the photosensitive drum 21 and toner and therefore changes little even when the developing peripheral speed difference changes.

It is known that the amount of charge leakage from toner to the developing roller 31 depends on the time required for the toner to pass through the developing nip and decreases as the passage time decreases. Toner is attracted to the developing roller 31 side by the force of the electric field in an electric potential relationship in which the surface potential of the photosensitive drum 21 in the developing nip is higher in absolute value on the normal charge polarity side of the toner than the surface potential of the developing roller 31. Thus, as the surface velocity of the developing roller 31 increases, the time required for a toner particle to pass through the developing nip decreases, and the amount of charge leakage decreases.

From the above, for example, in an image-forming system in which the surface velocity of the developing roller 31 is made faster than the surface velocity of the photosensitive drum 21 in an image-forming period, as the developing peripheral speed difference increases, the amount of applied electric charge increases, and the amount of charge leakage decreases. Thus, it is understood that the charge balance of toner in the developing nip increases to the side on which the toner charge amount increases.

Output of a halftone image in an electrophotographic process often uses a means of forming a plurality of fine dots by an exposed portion and an unexposed portion using a dither matrix in an exposure step to form a latent image on the photosensitive drum 21. Thus, toner has an opportunity to come into contact with an unexposed portion of the photosensitive drum 21 even in a halftone output portion, and the phenomenon of the change in toner charge amount in the developing nip occurs not only in a non-image-forming portion but also in the halftone output portion.

Here, when the developing peripheral speed difference fluctuates due to variations in the surface velocity of the photosensitive drum 21 or the developing roller 31, the toner charge amount changes with the variation in the developing peripheral speed difference, the amount of developed toner changes at the time of halftone output, and the change is visually recognized as a linear uneven density on the output image. This is considered as a mechanism of the occurrence of the banding. Conversely, the banding can be suppressed in an image-forming system in which the toner charge amount does not change with the developing peripheral speed difference.

Thus, the present inventors have paid attention to saturating the toner charge amount in the developing nip. The use of the photosensitive drum 21 having a surficial layer with a low electrical resistance increases the dependence of the amount of applied electric charge on the developing peripheral speed difference. However, if an electric charge can be applied to toner in an amount equal to or higher than the upper limit (referred to as a saturated charge amount) of the charge amount at which the toner can be charged in the charge balance with respect to the toner in the developing nip, the toner charge amount in the developing nip is fixed to the saturated charge amount regardless of the developing peripheral speed difference. This can fix the toner charge amount even when the developing peripheral speed difference changes, and can therefore reduce the occurrence of the banding.

(Relationship Between Outermost Surface Layer of Photosensitive Drum 21 and Volume Resistivity of Developing Roller 31)

Figure 19:
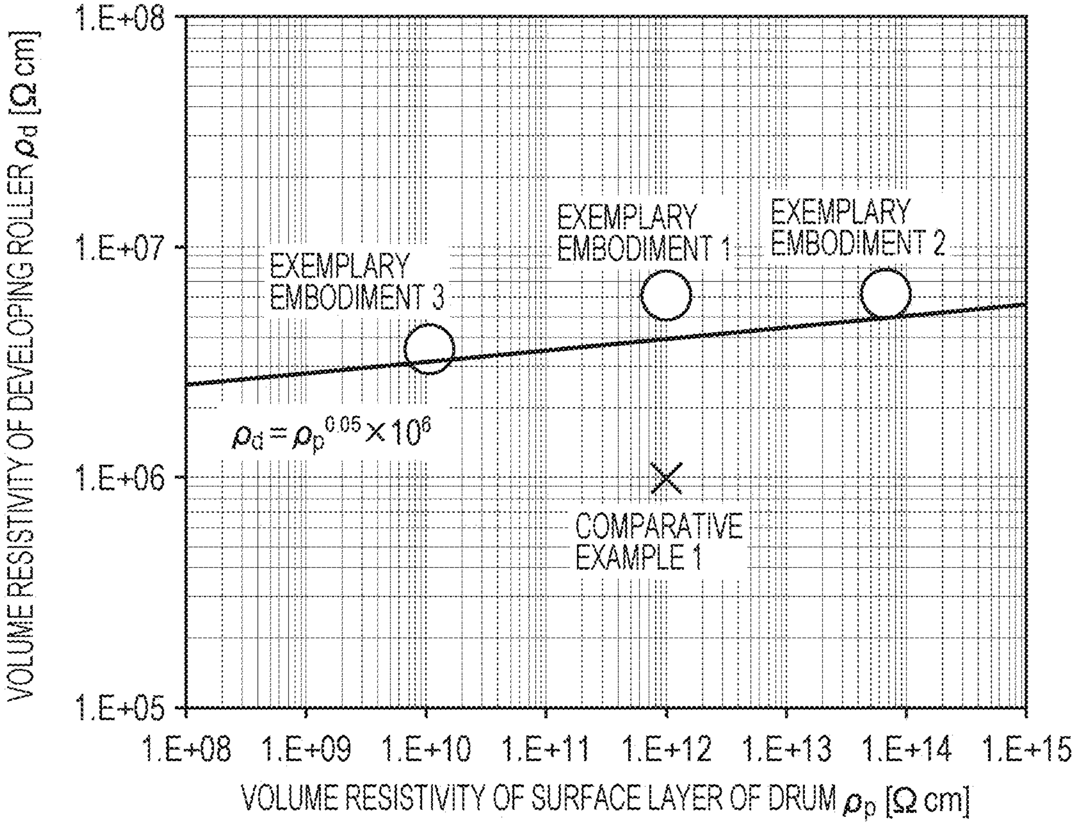
FIG. 19 is a relational expression of volume resistivity used in Exemplary Embodiments.

As a result of extensive studies (see FIG. 19 illustrating the results of Table 7), the present inventors have found that the occurrence of the banding can be significantly reduced when the volume resistivity of the outermost surface layer of the photosensitive drum 21 and the volume resistivity of the developing roller 31 satisfy the relationship of the following formula (8):

$$\log_{10}\rho d > 0.05\log_{10}\rho p + 6 \qquad \text{formula (8)}$$

ρp denotes the volume resistivity of the outermost surface of the photosensitive drum 21, and ρd denotes the volume resistivity of the developing roller 31.

To increase the toner charge amount to be saturated in the developing nip, there are an approach of increasing the amount of electric charge applied from the photosensitive drum 21 to toner and an approach of reducing the amount of charge leakage from toner to the developing roller 31. The former approach has a correlation with ρp, and the amount of electric charge applied from the photosensitive drum 21 to toner increases as ρp decreases. The latter approach is correlated with ρd, and the amount of charge leakage from the toner to the developing roller 31 decreases as ρd increases. The amount of change in the toner charge amount in the developing nip depends on the balance between the amount of applied electric charge and the amount of charge leakage. Thus, an appropriate relationship between the value of ρp and the value of ρd can increase the toner charge amount to the saturated charge amount and reduce the occurrence of the banding. The formula (8) indicates an appropriate relationship between the value of ρp and the value of pd.

(Influence of Electrostatic Capacitance of Developing Roller)

To reduce the amount of charge leakage from the toner to the developing roller 31 in the developing nip, it is also necessary to control the electrostatic capacitance in addition to the volume resistivity of the developing roller 31.

FIG. 11 is a schematic view of an equivalent circuit of a portion composed of the base layer and the surface layer in the developing roller 31. Each of the base layer 31*b* and the surface layer 31*c* of the developing roller 31 can be represented by a parallel circuit of a resistor and a capacitor. The base layer 31*b* and the surface layer 31*c* of the developing roller 31 are stacked, and the equivalent circuit of the developing roller 31 can therefore be represented by connecting the parallel circuits in series. The base layer 31*b* of the developing roller 31 has high electrical conductivity, and the capacitor portion of the base layer can therefore be almost ignored and can be replaced by a simple resistor without problems. Thus, the capacitor portion of the base layer 31*b* is omitted in FIG. 11.

Next, with reference to FIG. 11, the charge leakage from the toner to the developing roller 31 is considered focusing on the path of the electric charge. The amount of charge leakage from the toner to the developing roller 31 in the developing nip depends on the charge inflow to the developing roller 31 through the equivalent circuit of FIG. 11. The charge inflow path in the developing roller 31 involves a path A through which an electric charge leaks via a resistor and a path B through which an electric charge flows to charge the capacitor. Thus, to reduce the amount of charge leakage to the developing roller 31, it is necessary not only to increase the resistance of the path A to reduce the charge inflow but also to reduce the electrostatic capacitance of the path B to reduce the charge amount filling the capacitance of the capacitor. Thus, the volume resistivity of the surface layer 31*c* of the developing roller 31 is increased to reduce the amount of electric charge flowing through the path A, and the electrostatic capacitance of the surface layer 31*c* of the developing roller 31 is reduced to reduce the amount of electric charge flowing through the path B. This can effectively reduce the charge leakage to the developing roller 31.

On the basis of the above, embodiments of the volume resistivity, the electrostatic capacitance, the surface resistivity, and the like of the developing roller 31 according to the present exemplary embodiment are described below.

Investigation by the present inventors showed that the developing roller 31 preferably has a volume resistivity of $1.0\times10^6$ ohm·cm or more as measured by the method described above, and the developing roller 31 used in the present exemplary embodiment had a volume resistivity of $6.0\times10^6$ ohm·cm.

Investigation by the present inventors also showed that the developing roller 31 preferably has an electrostatic capacitance of $4.0\times10^{-2}$ pF/cm$^2$ or less as measured by the method described above, and the developing roller 31 used in the present exemplary embodiment had an electrostatic capacitance of $3.8\times10^{-2}$ pF/cm$^2$.

Investigation by the present inventors also showed that the surface resistivity of the surface layer 31*c* of the developing roller 31 is preferably $1\times10^6$ ohms per square or more and $1\times10^{13}$ ohms per square or less as measured by the method described above and was $5.0\times10^9$ ohms per square in the present exemplary embodiment.

Furthermore, the development of an electrostatic latent image on the photosensitive drum 21 requires a potential difference between the surface potential of the photosensitive drum 21 and the surface potential of the developing roller 31, and the surface potential of the developing roller 31 is obtained by the development voltage applied to the base body 31*a*. More specifically, no surface potential can be obtained when the base layer 31*b* of the developing roller 31 is insulative and, therefore, the base layer 31*b* of the developing roller 31 preferably has a volume resistivity of $1\times10^5$ ohm·cm or less. The volume resistivity of the base layer 31*b* of the developing roller 31 is measured by a method similar to the method for measuring the volume resistivity of the developing roller 31 described with reference to FIG. 6. More specifically, the volume resistivity of the base layer is determined by the measurement method described with reference to FIG. 6 using a roller in which the elastic layer 31*b* is formed on the outer peripheral surface of the base body 31*a* not covered with the surface layer 31*c*. In the present exemplary embodiment, the base layer 31*b* of the developing roller 31 had a volume resistivity of $5\times10^4$ ohm·cm.

2. Toner

Next, the toner used in the present exemplary embodiment is described in detail. In the present exemplary embodiment, as described above, the toner has a negative polarity as a normal charge polarity. In one example, the toner is a polymerized toner produced by a polymerization method.

Toner and a method for producing the toner is described below. A method for producing the toner according to the present exemplary embodiment is outlined below. Each step is described in detail later. The toner according to the present exemplary embodiment is mainly produced by preparation of an aqueous medium, preparation of a polymerizable monomer composition, and granulation of combining them. The toner is produced by a step of producing a toner base particle dispersion liquid containing dispersed toner base particles as cores of the toner through a polymerization step, a step of adjusting a material for mainly forming a surface layer of the toner, and a step of combining the base particles and the surface layer material to produce toner. In a production example of toner according to another exemplary embodiment, unless otherwise specified, the numerical values in each step are the production conditions of toner 1 used in Exemplary Embodiment 1. Unless otherwise specified, "part(s)" and "%" in exemplary embodiments are all based on mass.

Production Example of Toner Base Particle Dispersion Liquid

Preparation of Aqueous Medium

A reaction vessel containing 390.0 parts of deionized water was charged with 11.2 parts of sodium phosphate (dodecahydrate) to prepare an aqueous sodium phosphate, and was kept at 65° C. for 1.0 hour while purging with nitrogen. The aqueous sodium phosphate was stirred at 12,000 rpm using a mixer (trade name: T.K. Homomixer, manufactured by Tokushu Kika Kogyo Co., Ltd.). While stirring, an aqueous calcium chloride prepared by dissolving 7.4 parts of calcium chloride (dihydrate) in 10.0 parts of deionized water was collectively charged into the reaction vessel. Thus, an aqueous medium containing a dispersion stabilizer was prepared. Furthermore, 1.0 mol/L hydrochloric acid was added to the aqueous medium in the reaction vessel to adjust the pH to 6.0 and prepare an aqueous medium.

Preparation of Polymerizable Monomer Composition

| | |
|---|---|
| Styrene | 60.0 parts |
| C.I. Pigment Blue 15:3 | 6.3 parts |

These materials were charged into an attritor (manufactured by Nippon Coke & Engineering Co., Ltd.) and were dispersed at 220 rpm for 5.0 hours using zirconia particles with a diameter of 1.7 mm to prepare a colorant dispersion liquid containing the dispersed pigment.

The following materials were then added to the colorant dispersion liquid.

| | |
|---|---|
| Styrene | 10.0 parts |
| n-Butyl acrylate | 30.0 parts |
| Polyester resin | 5.0 parts (a polycondensate of terephthalic acid and a propylene oxide 2 mol adduct of bisphenol A, weight-average molecular weight Mw = 10,000, acid value: 8.2 mgKOH/g) |
| Paraffin wax (trade name: HNP9, manufactured by Nippon Seiro Co., Ltd., melting point: 76° C.) | 6.0 parts |

These materials were kept at 65° C. and were uniformly dissolved and dispersed with a mixer at 500 rpm to prepare a polymerizable monomer composition.

"Granulation Step"

While maintaining the temperature of the aqueous medium at 70° C. and the rotational speed of the mixer at 12,000 rpm, the polymerizable monomer composition and 8.0 parts of t-butyl peroxypivalate as a polymerization initiator were added to the aqueous medium. The mixture was granulated with the mixer for 10 minutes while maintaining 12,000 rpm.

"Polymerization Step"

The mixer was changed to a stirrer with a propeller blade, polymerization was performed for 5.0 hours while stirring at 200 rpm and maintaining 70° C., and the product was further heated at 85° C. for 2.0 hours to perform a polymerization reaction. The product was further heated at 98° C. for 3.0 hours to remove residual monomer, and deionized water was added to adjust the concentration of toner base particles in the dispersion liquid to 30.0% and prepare a toner base particle dispersion liquid containing the dispersed toner base particles.

The toner base particles had a number-average particle diameter (D1) of 6.2 μm and a weight-average particle diameter (D4) of 6.9 μm.

Production Example of Organosilicon Compound Liquid

| | |
|---|---|
| Deionized water | 70.0 parts |
| Methyltriethoxysilane | 30.0 parts |

These materials were weighed in a 200-mL beaker and were adjusted to pH 3.5 with 10% hydrochloric acid. The mixture was stirred for 1.0 hour while being heated to 60° C. in a water bath to prepare an organosilicon compound liquid.

Production Example of Toner 1

The following samples were weighed in a reaction vessel and were mixed using a propeller blade to prepare a liquid mixture.

| | |
|---|---|
| Toner base particle dispersion liquid | 500.0 parts |
| Organosilicon compound liquid | 10.0 parts |

The liquid mixture was then adjusted to pH 9.5 with 1.0 mol/L aqueous NaOH and was held for 5.0 hours. The temperature was decreased to 25° C., the pH was adjusted to 1.5 with 1.0 mol/L hydrochloric acid, and after stirring for 1.0 hour the product was filtered while being washed with deionized water. The resulting powder was dried in a constant temperature bath and was then classified with a wind classifier to prepare the toner 1. The toner 1 had a number-average particle diameter (D1) of 6.2 μm and a weight-average particle diameter (D4) of 6.9 μm.

Although a non-magnetic one-component developer is exemplified in the present exemplary embodiment, a one-component developer containing a magnetic component may also be used. A two-component developer composed of a non-magnetic toner and a magnetic carrier may be used as the developer. When a magnetic developer is used, for example, a cylindrical development sleeve with a magnet arranged therein is used as a developer carrier.

[Measurement of Toner Resistance Value]

In the experimental system of FIG. 9, the toner resistance value can be measured to determine whether or not the toner has the charge injection properties.

The experimental system of FIG. 9 indicates a method for measuring the toner resistance value in which a stainless steel developing blade of a developing apparatus is coupled to an external high-voltage power supply (MODEL 615-3 manufactured by Trek), and a developing roller is grounded via a resistor R with a resistance value $R_2$(=10 kilohms). A digital multimeter (80 series manufactured by FLUKE) is coupled to both ends of the resistor R, so that a voltage value at each end of the resistor R can be measured. The developing roller used in this measurement system has a volume resistivity of $9\times10^5$ ohm·cm and is driven at a surface velocity of 200 mm/s. The measurement is performed at a temperature of 23° C. and at a humidity of 50%. The toner on the developing roller is regulated at 0.3 mg/cm. In the experimental system of FIG. 9, outside the image-forming apparatus 1, a potential difference is formed between the surface of the developing roller, which is a rotatable rotating member, and a contact member, which is a developing blade in contact with the surface of the rotating member. In this case, each of the rotating member and the contact member preferably has a resistance value of $1.0\times10^4$ ohms or less.

In the measurement, when the external high-voltage power supply is set to a direct-current voltage of $V_2$(=−200 V), an electric current (hereinafter referred to as a development current) flows from the developing blade to the developing roller through a toner layer formed on the developing roller. At this time, the electric current I2 ($I2=V_2/R_2$) flowing through the resistor R is calculated using Ohm's law from the average voltage $V_2$ of the digital multimeter detected approximately 30 seconds after the electric current is stabilized from the voltage application while changing the drive and stop of the developing roller. The calculated current value I2 is equal to the development current, and the resistance values of the developing roller and the developing blade are sufficiently smaller than that of the toner and can be almost ignored. Thus, the resistance value $R_T$ of the toner between the developing roller and the developing blade can be calculated using Ohm's law ($RT=V_2/I_2$).

Although the toner resistance value is calculated in the experimental system using the developing apparatus in the present exemplary embodiment, the present invention is not limited thereto. For example, a thin layer of toner may be disposed on the developing roller and may be in contact with the developing blade.

When the toner on the developing roller is charged to a negative polarity, the electric charge of the toner flows toward the developing roller due to the influence of the electric field in the regulation region, increases the development current, and decreases the toner resistance value. A toner without the charge injection properties is not charged even under the application of an electric field at the time of stopping. On the other hand, due to friction with a developing blade or a developing roller at the time of driving, the toner is charged by triboelectric charging. Thus, the calculated toner resistance value is lower at the time of driving than at the time of stopping. For a toner with charge injection properties, the calculated toner resistance value decreases because an electric charge is injected into the toner due to the electric field of the regulation region even at the time of stopping and increases the development current. This reduces the change in the toner resistance value between the time of stopping and the time of driving.

The present inventors have studied the relationship between the presence or absence of a change in the toner charge amount under the application of an electric field at the time of stopping and the toner resistance value and have found that a toner with charge injection properties has the following features.

The toner resistance value at the time of stopping is $1.0\times10^8$ ohms or less The toner resistance value at the time of driving (200 mm/s) is 40% or more of the toner resistance value at the time of stopping For a toner suitable for image formation, the toner resistance value at the time of stopping is preferably $1.0\times10^5$ ohms or more. This is for the purpose of reducing the charge decay of toner and establishing a process such as transfer.

More specifically, a toner has a first resistance value in the range of $1.0\times10^5$ ohms to $1.0\times10^8$ ohms as measured in a state where the rotating member is stopped and in a state where the developer is located between the rotating member and the contact member. A toner to be used has a measured second resistance value in the range of the first resistance value and 40% or more with respect to the first resistance value in a state where the rotating member is rotated at 200 mm/s with respect to the contact member and in a state where the toner is located between the rotating member and the contact member.

The toner resistance value of the toner 1 used in the present exemplary embodiment was $1.4\times10^8$ ohms at the time of stopping and $4.0\times10^7$ ohms at the time of driving. More specifically, the toner resistance value at the time of driving is 29% of the toner resistance value at the time of stopping still, and the toner rarely has the charge injection properties and is charged mainly by triboelectric charging.

[Change in Surface Potential of Image-Bearing Member Due to Passage Through Developing Nip]

In the photosensitive drum 21 according to the present invention, an electric charge is applied from the photosensitive drum 21 to toner in the developing nip. For example, when a negatively chargeable toner is used, an electron on the surface of the photosensitive drum 21 moves to the toner and increases the toner charge amount. Electron transfer from the photosensitive drum 21 to the toner decreases the absolute value of the surface potential of the photosensitive drum 21 charged to a negative polarity during passage through the developing nip. This indicates that the amount of electric charge applied from the photosensitive drum 21 to the toner increases with the amount of decrease in the surface potential.

As a result of extensive studies, the present inventors have found that the photosensitive drum 21 that can apply a sufficient amount of electric charge to toner in the developing nip to reduce the occurrence of the banding has a characteristic amount of decrease in the surface potential of the photosensitive drum 21 at the time of passage through the developing nip. More specifically, when the developing roller 31 was brought into contact with the photosensitive drum 21 at a surface velocity 40% higher than the surface velocity of the photosensitive drum 21, the absolute value of the surface potential of the photosensitive drum 21 after passage through the developing nip was decreased by 3% or more from that before passage through the developing nip. For example, when the photosensitive drum 21 before passage through the developing nip has a surface potential of −600 V, the photosensitive drum 21 that is applicable has a surface potential of −582 V or less after passage through the developing nip at the developing peripheral speed difference described above.

In the present exemplary embodiment, the change in the surface potential of the photosensitive drum 21 due to passage through the developing nip was measured with a process cartridge modified so that a surface potential meter could be disposed on the surface of the photosensitive drum 21 on the upstream and downstream sides of a developing nip portion. The photosensitive drum 21 before passage through the developing nip is charged to a surface potential of −600 V using the charging roller 23. When the developing roller 31 was brought into contact with the photosensitive drum 21 at a surface velocity 40% higher than the surface velocity of the photosensitive drum 21, the surface potential of the photosensitive drum 21 after passage through the developing nip was decreased to −564 V. Thus, the absolute value of the surface potential of the photosensitive drum 21 was decreased by 6% from that of the photosensitive drum 21 before passage through the developing nip. Furthermore, for comparison purposes, the same evaluation was performed after the photosensitive drum 21 was changed to a photosensitive drum 21 without the charge injection layer 21*f* and with the charge transport layer 21*e* as the outermost surface. In this case, although the photosensitive drum 21 before passage through the developing nip had a surface potential of −600 V, the surface potential of the photosensitive drum 21 after passage through the developing nip was decreased to −594 V. Thus, the absolute value of the surface potential of the photosensitive drum 21 was decreased by 1% from that of the photosensitive drum 21 before passage through the developing nip. It is understood that the electric potential of the photosensitive drum 21 without the charge injection layer 21*f* is decreased little. Thus, the photosensitive drum 21 with a small decrease in the surface potential is not suitable as the photosensitive drum 21 that can apply a sufficient amount of electric charge to toner in the developing nip to reduce the occurrence of the banding.

[Evaluation of Banding]

The banding was evaluated by outputting a halftone image in an environment of a temperature of 23.0° C. and a relative humidity of 50% and determining whether or not the banding was observed in the image. The evaluation results were ranked by the following three levels.

Poor: A large number of bands with a large density difference are observed.

Fair: Although banding with a small density difference is observed, the image has no problem.

Good: No banding is observed.

[Evaluation of Dependency of Change in Toner Charge Amount on Developing Peripheral Speed Difference]

To evaluate the dependency of the change in the toner charge amount on the developing peripheral speed difference at the time of passage through the developing nip, the toner charge amount on the developing roller 31 was measured as described below.

In an environment of a temperature of 23.0° C. and a relative humidity of 50%, an image-forming operation was stopped while a solid white image was printed. The developing roller 31 was taken out from the developing apparatus 30 to measure the toner charge amount on the developing roller 31 before and after passage through the developing nip. The toner charge amount was measured by calculating the average charge amount using the E-Spart analyzer manufactured by Hosokawa Micron Corporation. The amount of change ΔQ in the toner charge amount at the time of passage through the developing nip was determined using the following formula (9), wherein Q1 denotes the average charge amount before passage through the developing nip, and Q2 denotes the average charge amount after passage through the developing nip.

$$\Delta Q = Q2 - Q1 \qquad \text{formula (9)}$$

Figure 16:
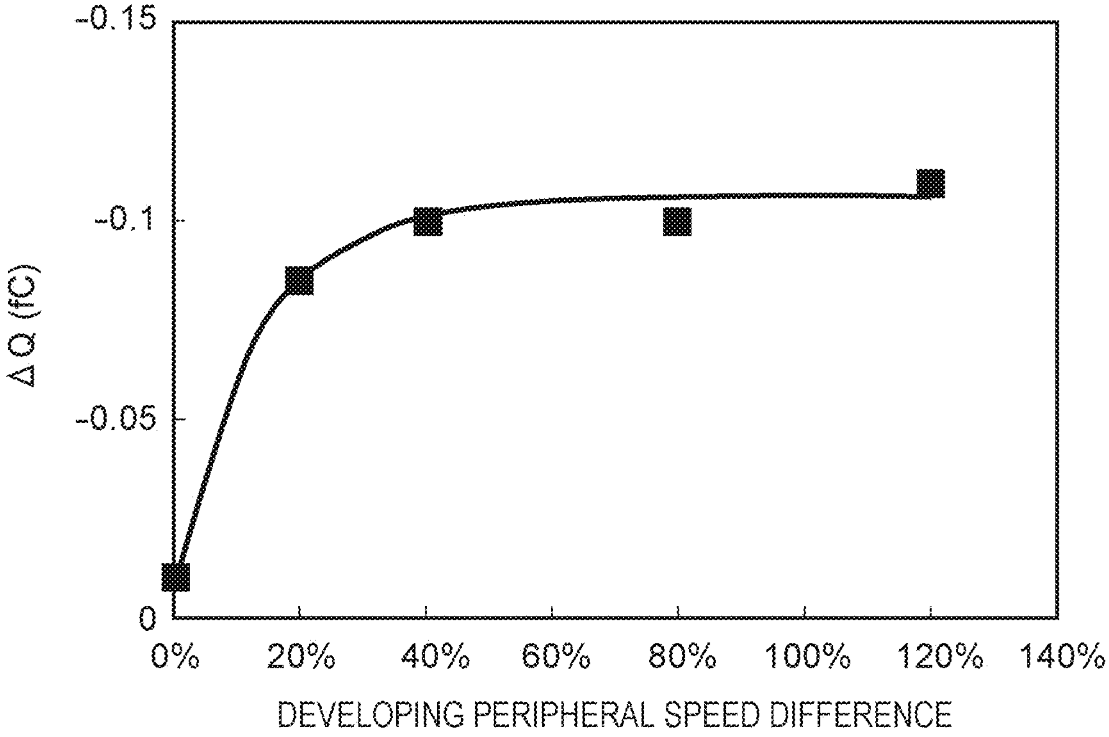
FIG. 16 is an explanatory view of the dependency of the change in toner charge amount on the developing peripheral speed difference in Exemplary Embodiments.

To change the condition of the developing peripheral speed difference, the surface velocity of the photosensitive drum 21 was fixed at 150 mm/s, and the surface velocity of the developing roller 31 was changed in the range of not less than the surface velocity of the photosensitive drum 21. FIG. 16 shows the results.

Exemplary Embodiment 2-1

The photosensitive drum 21 in Exemplary Embodiment 1 was changed in Exemplary Embodiment 2-1.

A photosensitive drum 22 was produced in the same manner as in Exemplary Embodiment 1 except that the electrically conductive particles 1 content of the charge injection layer 21*f* in the production of the photosensitive drum 21 was changed to 20% by mass. A charge injection layer 21*f* of the photosensitive drum had a volume resistivity of $1.0\times10^{14}$ ohm·cm.

In the present exemplary embodiment, when the surface of the photosensitive drum 22 was charged to −600 V using the charging roller 23 and the developing roller 31 was brought into contact with the photosensitive drum 22 at a surface velocity 40% higher than the surface velocity of the photosensitive drum 22, the surface potential of the photosensitive drum after passage through the developing nip was decreased to −582 V. Thus, the absolute value of the surface potential of the photosensitive drum 21 was decreased by 3% from that of the photosensitive drum 21 before passage through the developing nip.

The banding was evaluated in the same manner as in Exemplary Embodiment 1.

Exemplary Embodiment 3-1

The photosensitive drum 21 and the developing roller 31 in Exemplary Embodiment 1 were changed in Exemplary Embodiment 3-1.

A photosensitive drum 23 was produced in the same manner as in Exemplary Embodiment 1 except that the electrically conductive particles 1 content in the production of the photosensitive drum 21 was changed to 70% by mass. A charge injection layer 21*f* of the photosensitive drum 23 had a volume resistivity of $1.0\times10^{10}$ ohm·cm.

Furthermore, a developing roller 32 was produced in the same manner as in Exemplary Embodiment 1 except that the carbon black content of the surface layer in the production of the developing roller 31 was changed to 17% by mass based on the polyurethane resin. The developing roller 32 had a volume resistivity of $3.5\times10^{6}$ ohm·cm and an electrostatic capacitance of $3.9\times10^{-2}$ pF/cm$^2$.

In the present exemplary embodiment, when the photosensitive drum was charged to −600 V using the charging roller and the developing roller was brought into contact with the photosensitive drum at a surface velocity 40% higher than the surface velocity of the photosensitive drum, the surface potential of the photosensitive drum after passage through the developing nip was decreased to −522 V. Thus, the absolute value of the surface potential of the photosensitive drum was decreased by 13% with respect to that before passage through the developing nip.

The banding was evaluated in the same manner as in Exemplary Embodiment 1.

Comparative Example 1-1

The developing roller 31 in Exemplary Embodiment 1 was changed in Comparative Example 1-1.

A developing roller 33 was produced in the same manner as in Exemplary Embodiment 1 except that the carbon black content of the surface layer in the production of the developing roller was changed to 20% by mass based on the polyurethane resin. The developing roller 33 had a volume resistivity of $1.0\times10^{6}$ ohm·cm and an electrostatic capacitance of $4.2\times10^{-2}$ pF/cm$^2$.

The banding was evaluated in the same manner as in Exemplary Embodiment 1.

Figure 17:
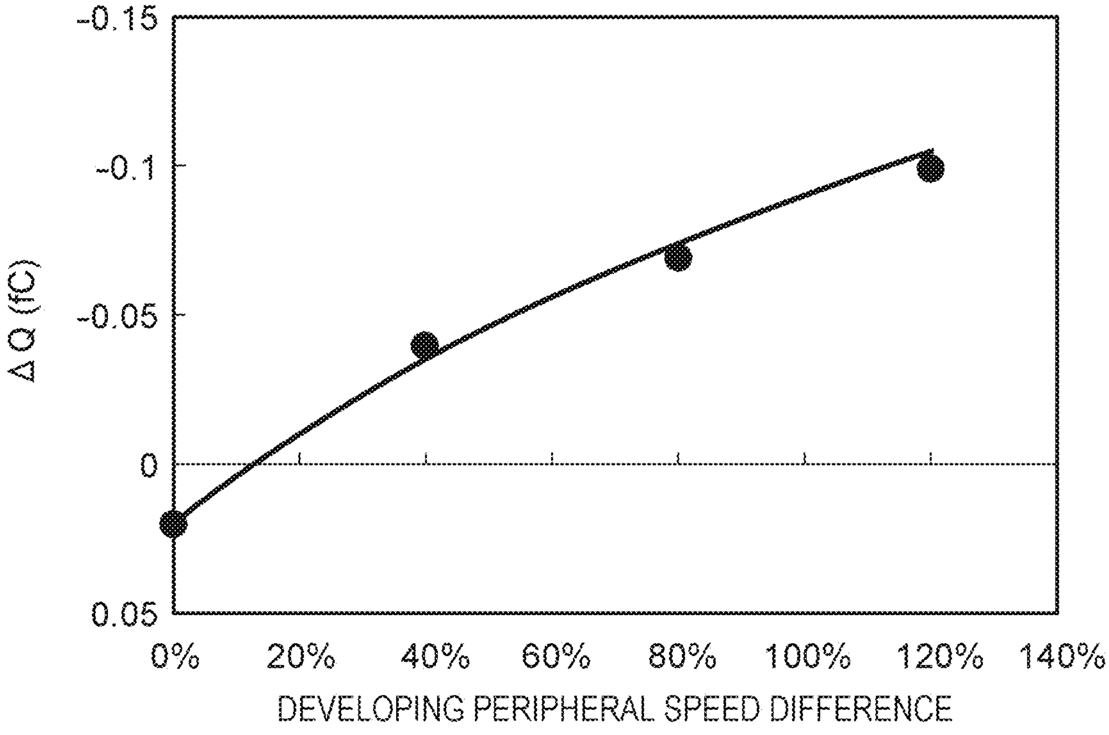
FIG. 17 is an explanatory view of the dependency of the change in toner charge amount on the developing peripheral speed difference in Comparative Examples.

The dependency of the change in the toner charge amount on the developing peripheral speed difference was evaluated in the same manner as in Exemplary Embodiment 1. FIG. 17 shows the results.

Table 5 shows the results of Exemplary Embodiment 1, Exemplary Embodiment 2-1, Exemplary Embodiment 3-1, and Comparative Example 1-1.

TABLE 5

| | Surface volume resistivity ρp of photosensitive member (ohm · cm) | Volume resistivity $\rho_d$ of developing roller (ohm · cm) | Formula (8) | Toner | Banding |
|---|---|---|---|---|---|
| Exemplary Embodiment 1 | $1.0\times10^{12}$ | $6.0\times10^{6}$ | True | Toner 1 | Fair |
| Exemplary Embodiment 2-1 | $1.0\times10^{14}$ | $6.0\times10^{6}$ | True | Toner 1 | Fair |
| Exemplary Embodiment 3-1 | $1.0\times10^{10}$ | $3.5\times10^{6}$ | True | Toner 1 | Fair |
| Comparative Example 1-1 | $1.0\times10^{12}$ | $1.0\times10^{6}$ | False | Toner 1 | Poor |

In Exemplary Embodiment 1, when ρp and ρd satisfy the relationship of the formula (8), the banding can be suppressed. As shown by the evaluation of the dependency of ΔQ on the developing peripheral speed difference in FIG. 16, in Exemplary Embodiment 1, the change in ΔQ has a gentle slope in a region with a developing peripheral speed difference of approximately 20% or more. Furthermore, ΔQ is almost constant in a region with a developing peripheral speed difference of approximately 40% or more, showing that the change in the toner charge amount due to variations in the developing peripheral speed difference is reduced. Thus, to effectively suppress the banding in Exemplary Embodiment 1, the developing peripheral speed difference preferably exists and is more preferably 20% or more, still more preferably 40% or more.

The present exemplary embodiment has a developing peripheral speed difference of 40% and is in a region in which ΔQ is rarely changed by the developing peripheral speed difference. Thus, it is thought that even a variation in the developing peripheral speed difference rarely changes the toner charge amount in the developing nip, and the banding could be suppressed.

Although the developing peripheral speed difference is provided by making the surface velocity of the developing roller 31 higher than the surface velocity of the photosensitive drum 21 in the present exemplary embodiment, the developing peripheral speed difference may also be provided by making the surface velocity of the developing roller 31 lower than the surface velocity of the photosensitive drum 21.

In Exemplary Embodiments 2-1 and 3-1, the values of ρp and ρd are different from those in Exemplary Embodiment 1, but the relationship between ρp and ρd satisfies the formula (8). Thus, as in Exemplary Embodiment 1, it is thought that ΔQ depends little on the developing peripheral speed difference, and the banding could be suppressed.

In Comparative Example 1, the relationship between ρp and ρd does not satisfy the formula (8). In this case, as shown in FIG. 17, ΔQ continues to change due to the developing peripheral speed difference. This is probably because ρp and ρd do not satisfy the relationship of the formula (8), the toner charge amount does not reach the saturated charge amount in the developing nip, and the change in the charge balance due to the developing peripheral speed difference is directly reflected in the toner charge amount. It is thought that this changes the toner charge amount in the developing nip due to the variation in the developing peripheral speed difference and cannot suppress the banding.

Exemplary Embodiment 4-1

In Exemplary Embodiment 4-1, the toner in Exemplary Embodiment 1 was changed as described below. Furthermore, during image formation, a voltage 200 V higher in absolute value on the negative polarity side than the developing roller 31 was applied to the developing blade 35 using a developing blade power supply E4. In the present exemplary embodiment, the developing blade 35 has a potential difference ΔVb1 of −200 V with respect to the developing roller 31.

(Area and Coefficient of Variation of Electrically Conductive Material)

An evaluation method for an electrically conductive material on the toner surface is an evaluation method using a scanning electron microscope, and the electrically conductive material has an average value of areas of 10,000 nm$^2$ or less, preferably 5000 nm$^2$ or less, more preferably 2000 nm$^2$ or less. The area of the electrically conductive material is a projected area of a block of the electrically conductive material present on the toner surface in the direction perpendicular to the toner surface.

When the electrically conductive material has an average value of areas of 10,000 nm$^2$ or less, the electrically conductive material of the toner becomes discrete, and an electric charge injected is easily maintained. This is because the chance of contact between the electrically conductive material on the toner surface and a surrounding material is reduced, and the electric charge of the toner is less likely to be released.

Furthermore, the coefficient of variation of the areas of the electrically conductive material determined by a method described later is 10.0 or less, preferably 7.0 or less, more preferably 5.0 or less.

When the coefficient of variation of the areas of the electrically conductive material is 10.0 or less, the reaction product has small variations in its size. This reduces the variation in the charge amount of the reaction product that is likely to have an electric charge, and toner particles are therefore uniformly charged.

<Method for Observing Surface of Toner or the Like>

The surface of toner or the like is observed as described below.

The surface of toner or the like is observed with a scanning electron microscope (SEM, apparatus name: JSM-7800F manufactured by JEOL Ltd.) at a magnification of 50,000 times. Elemental mapping on the surface of the toner or the like is then performed by energy dispersive X-ray spectroscopy (EDX). From an elemental mapping image of SEM thus obtained, the presence of an organosilicon compound and particles of a salt of a polyvalent acid and a metal of a group 4 element on the surface of the toner or the like is examined.

More specifically, the mapping image of the metal element is compared with the mapping image of an element contained in the polyvalent acid, for example, phosphorus when phosphoric acid is used as the polyvalent acid, and coincidence of the two images can indicate that the particles of the salt of the polyvalent acid and the metal of the group 4 element are contained.

(Method for Calculating Average Value of Areas of Electrically Conductive Material and Coefficient of Variation of Areas of Electrically Conductive Material)

Next, methods for calculating the average value of areas and the coefficient of variation of an electrically conductive material are described.

The average value of areas of an electrically conductive material is calculated as described below.

(1) Observation with JSM-7800F

To calculate the average value of areas of an electrically conductive material, JSM-7800F is used for a SEM image (backscattered electron image). The observation conditions are described below.

"PC-SEM" of JSM-7800F is activated, a sample holder is inserted into a sample chamber of a JSM-7800F housing, and the sample holder is moved to the observation position.

On the screen of PC-SEM, the accelerating voltage is set to [1.0 kV], and the observation magnification is set to [50000 times]. The [ON] button of an observation icon is pressed, and an accelerating voltage is applied to observe a backscattered electron image.

(2) Calculation of Average Value of Areas of Electrically Conductive Material

The obtained backscattered electron image is read into the image processing analyzer LUZEX AP (manufactured by Nireco Corporation) and is displayed in monochrome. An averaging process is followed by a binarization process to obtain a binarized image in which the electrically conductive material is displayed in white. The average value of areas of the white portion is then determined using a built-in function and is defined as the average value of areas of the electrically conductive material.

The coefficient of variation of the areas of an electrically conductive material is calculated as described below.

The backscattered electron image is read into the image processing analyzer LUZEX AP (manufactured by Nireco Corporation) and is displayed in monochrome. After an averaging process, a binarization process is performed to obtain a binarized image in which the electrically conductive material is displayed in white. The standard deviation of the area of the white portion is then determined using a built-in function and is divided by the average value of areas of the electrically conductive material. The resulting value is defined as the coefficient of variation of the areas of the electrically conductive material.

Production Example of Toner 2

A toner base particle dispersion liquid was prepared in the same manner as in the production example described in Exemplary Embodiment 1.

The following samples were weighed in a reaction vessel and were mixed using a propeller blade to prepare a liquid mixture.

| | |
|---|---|
| Toner base particle dispersion liquid | 500.0 parts |
| Organosilicon compound liquid | 35.0 parts |

The liquid mixture was then adjusted to pH 9.5 with 1.0 mol/L aqueous NaOH, the temperature of the liquid mixture was adjusted to 50° C., and the liquid mixture was held for 1.0 hour while being mixed using a propeller blade.

"Polyvalent Acid Metal Salt Adhering Step"

| | |
|---|---|
| 44% aqueous titanium lactate (trade name: TC-310, manufactured by Matsumoto Fine Chemical Co., Ltd.) | 3.2 parts (corresponding to 1.4 parts as titanium lactate) |
| Organosilicon compound liquid | 10.0 parts |

Subsequently, after the materials were mixed in the reaction vessel, the resulting liquid mixture was adjusted to pH 9.5 with 1.0 mol/L aqueous NaOH and was held for 4.0 hours. The temperature was decreased to 25° C., the pH was adjusted to 1.5 with 1.0 mol/L hydrochloric acid, and after stirring for 1.0 hour the product was filtered while being washed with deionized water. The resulting powder was dried in a constant temperature bath and was then classified with a wind classifier to prepare toner 2. The toner 2 had a number-average particle diameter (D1) of 6.2 μm and a weight-average particle diameter (D4) of 6.9 μm.

Observation of the toner 2 by the method described above showed a protrusion containing an organosilicon polymer on the toner surface and titanium present on the surface of the protrusion. The existence region of titanium had an average value of areas of 104 $nm^2$ and a coefficient of variation of 2.1. The protrusion height was 60 nm.

Furthermore, when the toner 2 was analyzed by time-of-flight secondary ion mass spectrometry (TOFSIMS analysis), an ion derived from titanium phosphate was detected. The titanium phosphate compound is a reaction product of titanium lactate and a phosphate ion derived from sodium phosphate or calcium phosphate derived from the aqueous medium.

The toner resistance value of the toner 2 measured in the same manner as in Exemplary Embodiment 1 was $8.3 \times 10^7$ ohms at the time of stopping and $5.0 \times 10^7$ ohms at the time of driving. Thus, the toner resistance value at the time of driving is 60% of the toner resistance value at the time of stopping, and the toner has the charge injection properties capable of applying an electric charge by injection charging.

Figure 18:
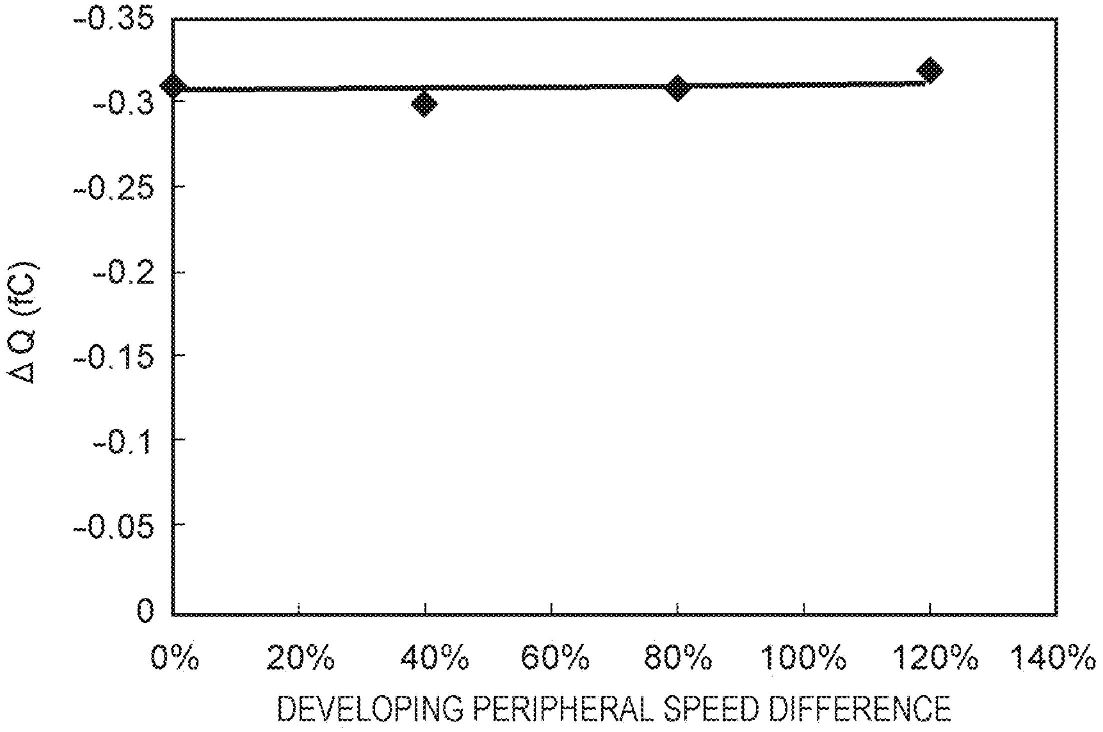
FIG. 18 is an explanatory view of the dependency of the change in toner charge amount on the developing peripheral speed difference in Exemplary Embodiments.

The banding was evaluated in the same manner as in Exemplary Embodiment 1. The dependency of the change in the toner charge amount on the developing peripheral speed difference was evaluated in the same manner as in Exemplary Embodiment 1. FIG. 18 shows the results.

Exemplary Embodiment 5-1

In Exemplary Embodiment 5-1, the toner in Exemplary Embodiment 4-1 was changed as described below.

[Toner]

Production Example of Toner Particles A

A toner base particle dispersion liquid was prepared in the same manner as in the production example described in Exemplary Embodiment 1. The dispersion liquid was adjusted to pH 1.5 with 1 mol/L hydrochloric acid, was stirred for 1.0 hour, was filtered while being washed with deionized water, and was dried. The resulting powder was classified with a wind classifier to prepare toner particles A.

The toner particles A had a number-average particle diameter (D1) of 6.2 μm and a weight-average particle diameter (D4) of 6.7 μm.

Production Example of Toner 3

| | |
|---|---|
| Toner particles A | 100.0 parts |
| Silicon dioxide (number-average particle diameter: 102 nm) | 2.0 parts |

These materials were charged into SUPERMIXER PICCOLO SMP-2 (manufactured by Kawata Mfg. Co., Ltd.) and were mixed at 3000 rpm for 5 minutes while the inside of the tank was heated to 45° C. by charging warm water at 45° C. into the jacket.

| | |
|---|---|
| Fine hydrophobic silica particles | 2.0 parts |
| Rutile titanium oxide (number-average particle diameter: 33 nm, volume resistivity: $1.8 \times 10^8$ ohm · cm) | 6.0 parts |

These materials were then charged into SUPERMIXER PICCOLO SMP-2 (manufactured by Kawata Mfg. Co., Ltd.) and were mixed at 3000 rpm for 10 minutes while the inside of the tank was maintained at 20° C. by charging cold water at 20° C. into the jacket. The mixture was sieved with a mesh with an opening of 150 μm to prepare toner 3.

Observation of the toner 3 in the same manner as in Exemplary Embodiment 4-1 showed the presence of titanium on the toner surface. The existence region of titanium had an average value of areas of 1400 $nm^2$ and a coefficient of variation of 7.5. The protrusion height was 60 nm.

The toner resistance value of the toner 3 measured in the same manner as in Exemplary Embodiment 1 was $7.3\times10^7$ ohms at the time of stopping and $2.9\times10^7$ ohms at the time of driving. Thus, the toner resistance value at the time of driving is 40% of the toner resistance value at the time of stopping, and the toner has the charge injection properties capable of applying an electric charge by injection charging.

The banding was evaluated in the same manner as in Exemplary Embodiment 1.

Table 6 shows the results of Exemplary Embodiments 4-1 and 5-1.

TABLE 6

| | Surface volume resistivity ρp of photosensitive member (ohm · cm) | Volume resistivity $\rho_d$ of developing roller (ohm · cm) | Formula (8) | Toner | Banding |
|---|---|---|---|---|---|
| Exemplary Embodiment 4-1 | $1.0 \times 10^{12}$ | $6.0 \times 10^6$ | True | Toner 2 | Good |
| Exemplary Embodiment 5-1 | $1.0 \times 10^{12}$ | $6.0 \times 10^6$ | True | Toner 3 | Good |

In Exemplary Embodiments 4-1 and 5-1, the effects of suppressing banding could be further improved as compared with Exemplary Embodiment 1. This is probably because the use of the toner with charge injection properties increased the amount of electric charge applied by injection charging in the charge application from the photosensitive drum 21 to the toner in the developing nip. The electric charge application by injection charging is characteristically performed by an electric charge on the surface of the photosensitive drum 21 moving to the toner surface by the force of the electric field at the contact portion between the photosensitive drum 21 and the toner, so that the electric charge application can be performed even in a region with a developing peripheral speed difference of almost 0%. As shown by the evaluation of the dependency of ΔQ on the developing peripheral speed difference in FIG. 18, in Exemplary Embodiments 4-1 and 5-1, a high ΔQ is obtained even at a developing peripheral speed difference of 0%. This indicates that the toner charge amount is increased by injection charging, which does not require the developing peripheral speed difference. Furthermore, in FIG. 18, ΔQ is almost constant even when the developing peripheral speed difference changes. This indicates that the toner has reached the saturated charge amount by injection charging and is influenced little by triboelectric charging due to the increase in the developing peripheral speed difference.

Exemplary Embodiment 6-1

In Exemplary Embodiment 6-1, the process control conditions in Exemplary Embodiment 4-1 were changed as described below.

During image formation, the photosensitive drum 21 is rotated at a surface velocity of 40 mm/s, and the developing roller 31 is rotated at a surface velocity 1% higher than the surface velocity of the photosensitive drum 21. Thus, the photosensitive drum 21 and the developing roller 31 come into contact with each other at a surface velocity difference of 0.4 mm/s. The surface of the photosensitive drum 21 is charged to −500 V using the charging roller 23. The development voltage applied to the developing roller 31 is −400 V, and the back contrast Vback of the potential difference between the surface of the photosensitive drum 21 in the unexposed portion Vd and the developing roller 31 before passage through the developing nip is 100 V. A voltage with the same electric potential as the developing roller 31 was applied to the developing blade 35. Thus, the potential difference ΔVb1 of the developing blade 35 with respect to the developing roller 31 is 0 V.

Exemplary Embodiment 7-1

In Exemplary Embodiment 7-1, the process control conditions in Exemplary Embodiment 6-1 were changed as described below. That is, during image formation, the surface of the photosensitive drum 21 is charged to −700 V using the charging roller 23. The development voltage applied to the developing roller 31 is −400 V, and the back contrast Vback of the potential difference between the surface of the photosensitive drum 21 in the unexposed portion Vd and the developing roller 31 before passage through the developing nip is 300 V.

Exemplary Embodiment 8-1

In Exemplary Embodiment 8-1, the process control conditions in Exemplary Embodiment 6-1 were changed as described below. That is, during image formation, a voltage 200 V higher in absolute value on the negative polarity side than the developing roller 31 was applied to the developing blade 35. Thus, the potential difference ΔVb1 of the developing blade 35 with respect to the developing roller 31 is −200 V.

Table 7 shows the evaluation results of banding in Exemplary Embodiments 6-1, 7-1, and 8-1.

TABLE 7

| | Surface volume resistivity ρp of photosensitive member (ohm · cm) | Volume resistivity $\rho_d$ of developing roller (ohm · cm) | Formula (8) | Toner | Vback (V) | ΔVbl (V) | Banding |
|---|---|---|---|---|---|---|---|
| Exemplary Embodiment 6-1 | $1.0 \times 10^{12}$ | $6.0 \times 10^{6}$ | True | Toner 2 | 100 | 0 | Good |
| Exemplary Embodiment 7-1 | $1.0 \times 10^{12}$ | $6.0 \times 10^{6}$ | True | Toner 2 | 200 | 0 | Good |
| Exemplary Embodiment 8-1 | $1.0 \times 10^{12}$ | $6.0 \times 10^{6}$ | True | Toner 2 | 100 | −200 | Good |

Although the photosensitive drum 21, the developing roller 31, and the toner used in Exemplary Embodiment 6-1 were the same as those used in Exemplary Embodiment 4-1, a change in the process control conditions caused very slight banding in Exemplary Embodiment 6-1. This is probably because a change in the process control conditions in Exemplary Embodiment 6-1 decreased ΔQ in the developing nip and makes it difficult for the toner charge amount to reach the saturated charge amount. The reasons for the decrease in ΔQ are considered as described below. First, the surface velocity of the developing roller 31 was decreased. This increases the time required for a toner particle to pass through the developing nip and increases the amount of charge leakage from the toner to the developing roller 31. Second, Vback was decreased. It is thought that injection charging from the photosensitive drum 21 to the toner in the developing nip depends on the electric field, and a decrease in Vback therefore resulted in a decreased injection charging amount. Third, ΔVb1 became 0. The toner 2 is a toner with injection chargeability. Thus, when the developing blade 35 has a potential difference on the negative polarity side with respect to the developing roller 31, injection charging of the toner also occurs in a contact portion (referred to as a regulation nip) between the developing blade 35 and the developing roller 31. When the toner has a large amount of electric charge by injection charging in the regulation nip, even a small ΔQ in the developing nip can increase the toner charge amount to the saturated charge amount. On the other hand, when ΔVb1 is 0, the toner is not charged by injection in the regulation nip and has a small toner charge amount before entering into the developing nip, and a high ΔQ is required to increase the charge amount to the saturated charge amount in the developing nip. It is thought that, due to these three reasons combined, the banding evaluation was slightly worse in Exemplary Embodiment 6-1 than in Exemplary Embodiment 4-1. However, as described above, even at the banding level of Exemplary Embodiment 6-1, the image has no problem.

In Exemplary Embodiment 7-1, the banding is further improved by increasing Vback with respect to Exemplary Embodiment 6-1. This is probably because an increase in Vback resulted in an increased amount of electric charge injected into the toner in the developing nip and made it easy for the toner to reach the saturated charge amount.

Exemplary Embodiment 8-1 is different from Exemplary Embodiment 6-1 in that the developing blade 35 has a potential difference on the negative polarity side with respect to the developing roller 31. This further improved the banding. This is probably because the toner was charged by injection in the regulation nip and had an increased toner charge amount before entering into the developing nip, and even a small amount of electric charge injected into the toner in the developing nip could increase the toner charge amount to the saturated charge amount.

From the above, the image-forming apparatus described in the present exemplary embodiment is characterized by having the following configurations.

The image-forming apparatus includes a photosensitive drum 21, which is rotatable and has a base material 21*a* and a surface layer 21*f* on the surface, a charging roller 23, which charges the surface of the photosensitive drum 21, and a developing roller 31, which supplies the surface of the photosensitive drum 21 with a developer to be charged to a normal polarity. The image-forming apparatus further includes a charging voltage application portion E1 that applies a charging voltage to the charging roller 23, a development voltage application portion E2 that applies a development voltage to the developing roller 31, and a controller 150 that controls the charging voltage application portion E1 and the development voltage application portion E2. The controller 150 performs control to form a potential difference between the photosensitive drum 21 and the developing roller 31 and thereby generate an electrostatic force for moving the developer charged to the normal polarity from the photosensitive drum 21 to the developing roller 31. The surface potential of the photosensitive drum 21 is controlled to be higher in absolute value than the surface potential of the developing roller 31. $\rho p \leq 1.0 \times 10^{14}$ ohm·cm and $\log_{10}\rho d > 0.05 \log_{10}\rho p + 6$ are satisfied, wherein ρp denotes the volume resistivity of the surface layer of the photosensitive drum 21, and ρd denotes the volume resistivity of the developing roller 31.

The image-forming apparatus further includes an exposure unit 11 that exposes the surface of the photosensitive drum 21 to light to form an electrostatic latent image and thereby form an image-forming region in an image-forming operation. In a region where the surface of the photosensitive drum 21 can be charged using the charging roller 23, the surface of the photosensitive drum 21 other than the image-forming region is defined as a non-image-forming region. In the non-image-forming region, a potential difference is formed between the photosensitive drum 21 and the developing roller 31 to generate an electrostatic force for moving the developer charged to the normal polarity from the photosensitive drum 21 to the developing roller 31. The surface potential of the photosensitive drum 21 is controlled to be higher in absolute value than the surface potential of the developing roller 31.

The developing roller 31 preferably has an electrostatic capacitance of $4.0 \times 10^{-2}$ pF/cm$^2$ or less per unit area.

In a state where the photosensitive drum 21 rotates and is charged on the surface thereof, as described below, the controller 150 controls a first surface potential formed in a first region immediately before the surface of the photosensitive drum 21 passes through a development portion where the photosensitive drum 21 and the developing roller 31 are in contact with each other. The first surface potential is controlled to be 3% or more higher in absolute value than the second surface potential formed in a second region immediately after the surface of the photosensitive drum 21 passes through the development portion.

Furthermore, in the image-forming operation, the surface velocity of the photosensitive drum 21 and the surface velocity of the developing roller 31 are controlled to be different from each other.

In a state where a potential difference is formed between a surface of a rotatable rotating member and a contact member in contact with the surface of the rotating member, the developer satisfies the following conditions when each of the rotating member and the contact member has a resistance value of $1.0 \times 10^4$ ohms or less.

i) A first resistance value ranges from $1.0 \times 10^5$ ohms to $1.0 \times 10^8$ ohms as measured in a state where the rotating member is stopped and in a state where the developer is located between the rotating member and the contact member.

ii) A second resistance value is in the range of the first resistance value and is 40% or more with respect to the first resistance value, as measured in a state where the rotating member is rotated at 200 mm/s with respect to the contact member and in a state where the developer is located between the rotating member and the contact member.

The image-forming apparatus includes an electrically conductive developing blade 35 that regulates the developer carried on the surface of the developing roller 31 and a regulating voltage application portion E4 that applies a regulating voltage to the developing blade 35. The controller 150 performs control such that the regulating voltage applied to the developing blade 35 is higher in absolute value on a normal charge side of the developer than the surface potential of the developing roller 31.

It is effective that the developer contains an electrically conductive material with a volume resistivity of $1 \times 10^{11}$ ohm·cm or less on the outermost surface thereof. Furthermore, the electrically conductive material preferably has an average value of areas of 10,000 nm$^2$ or less and a coefficient of variation of the areas of 10.0 or less in a backscattered electron image of the developer taken with a scanning electron microscope.

Such a configuration can provide an image-forming apparatus that, even using a photosensitive drum having a surficial layer with a low electrical resistance, is less likely to cause a variation in the toner charge amount due to a variation in the developing peripheral speed difference and that can provide high image quality.

There may be a plurality of image formation modes in which the developing roller 31 has a different surface velocity. In such a case, in a mode in which the developing roller 31 has a lower surface velocity, the potential difference (back contrast) formed between the surface potential of the photosensitive drum 21 and the surface potential of the developing roller 31 in the development portion can be increased to enhance the effects described above. Similarly, in a mode in which the developing roller 31 has a lower surface velocity, the potential difference formed between the developing blade 35 and the developing roller 31 can be increased to enhance the effects described above.

As described above, the present invention can provide a developing apparatus, a process cartridge, and an image-forming apparatus that can reduce the occurrence of an adverse effect in an image caused by leakage of an electric charge injected into toner. The present invention can also provide an image-forming apparatus that, even using a photosensitive drum having a surficial layer with a low electrical resistance, is less likely to cause a variation in the toner charge amount due to a variation in the developing peripheral speed difference and that can provide high image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A developing apparatus for use in an image-forming apparatus configured to form an image on a recording medium, the developing apparatus comprising:

a developer;

a developing roller that can transport the developer; and a developing blade configured to come into contact with a surface of the developing roller, wherein the developing blade has a volume resistivity of $10^{14}$ ohm·cm or less, and the developer satisfies the following conditions:

in a state where a potential difference is formed between a surface of the rotatable developing roller and a developing blade in contact with the surface of the developing roller outside the image-forming apparatus, each of the developing roller and the developing blade has a resistance value of $1.0 \times 10^4$ ohms or less, and i) a first resistance value ranges from $1.0 \times 10^5$ ohms to $1.0 \times 10^8$ ohms as measured in a state where the developing roller is stopped and in a state where the developer is located between the developing roller and the developing blade, and ii) a second resistance value ranges from $1.0 \times 10^5$ ohms to $1.0 \times 10^8$ ohms and is 40% or more with respect to the first resistance value, as measured in a state where the developing roller is rotated at 200 mm/s with respect to the developing blade and in a state where the developer is located between the developing roller and the developing blade.

2. The developing apparatus according to claim 1, wherein the developing roller has a volume resistivity of $1.0\times10^6$ ohm·cm or more.

3. The developing apparatus according to claim 1, wherein the developing roller has an electrostatic capacitance of $4\times10^{-2}$ pF/cm$^2$ or less per unit area.

4. The developing apparatus according to claim 1, wherein the developer contains an electrically conductive material with a volume resistance of $1\times10^{11}$ ohm·cm or less on an outermost surface thereof.

5. The developing apparatus according to claim 4, wherein the electrically conductive material has an average value of areas of 10 nm$^2$ or more and 10000 nm$^2$ or less and a coefficient of variation of the areas of 10.0 or less in a backscattered electron image taken with a scanning electron microscope.

6. The developing apparatus according to claim 1, wherein the developing blade is a developer regulating member that regulates the developer carried on a surface of the developing roller.

7. The developing apparatus according to claim 1, wherein the developer has a negative normal polarity, and at least one of the developing roller and the developing blade contains one of a silicone component and a fluorine component.

8. The developing apparatus according to claim 1, comprising a developer container configured to store the developer, wherein in a state where the developing roller is stopped, a bottom surface of the developer container to a top surface of the developer stored in the developer container is lower than an uppermost portion of a surface of the developing roller.

9. The developing apparatus according to claim 1, which is a development cartridge detachably mountable in the image-forming apparatus.

10. A process cartridge detachably mountable in an image-forming apparatus configured to form an image on a recording medium, the process cartridge comprising:

a rotatable image-bearing member;

a developer; and a developing roller configured to supply the developer to the image-bearing member, wherein the image-bearing member has a volume resistivity of $10^{14}$ ohm·cm or less, the developer satisfies the following conditions:

in a state where a potential difference is formed between a surface of the rotatable developing roller and a developing blade in contact with the surface of the developing roller outside the image-forming apparatus, each of the developing roller and the developing blade has a resistance value of $1.0\times10^4$ ohms or less, and i) a first resistance value ranges from $1.0\times10^5$ ohms to $1.0\times10^8$ ohms as measured in a state where the developing roller is stopped and in a state where the developer is located between the developing roller and the developing blade, and ii) a second resistance value ranges from $1.0\times10^5$ ohms to $1.0\times10^8$ ohms and is 40% or more with respect to the first resistance value, as measured in a state where the developing roller is rotated at 200 mm/s with respect to the developing blade and in a state where the developer is located between the developing roller and the developing blade.

11. The process cartridge according to claim 10, wherein the developing roller has a volume resistivity of $1.0\times10^6$ ohm·cm or more.

12. The process cartridge according to claim 10, wherein the developing roller has an electrostatic capacitance of $4\times10^{-2}$ pF/cm$^2$ or less per unit area.

13. The process cartridge according to claim 10, wherein the developer contains an electrically conductive material with a volume resistance of $1\times10^{11}$ ohm·cm or less on an outermost surface thereof.

14. The process cartridge according to claim 13, wherein the electrically conductive material has an average value of areas of 10 nm$^2$ or more and 10000 nm$^2$ or less and a coefficient of variation of the areas of 10.0 or less in a backscattered electron image taken with a scanning electron microscope.

15. The process cartridge according to claim 10, comprising a developing blade configured to come into contact with a surface of the developing roller, wherein the developer has a negative normal polarity, and at least one of the developing roller and the developing blade contains one of a silicone component and a fluorine component.

16. The process cartridge according to claim 10, comprising a developer container configured to store the developer, wherein in a state where the developing roller is stopped, a bottom surface of the developer container to a top surface of the developer stored in the developer container is lower than an uppermost portion of a surface of the developing roller.

17. An image-forming apparatus comprising:

a rotatable image-bearing member;

a developer; and a developing roller configured to supply the developer to the image-bearing member, wherein the image-bearing member has a volume resistivity of $10^{14}$ ohm·cm or less, the developer satisfies the following conditions:

in a state where a potential difference is formed between a surface of the rotatable developing roller and a developing blade in contact with the surface of the developing roller outside the image-forming apparatus, each of the developing roller and the developing blade has a resistance value of $1.0\times10^4$ ohms or less, and i) a first resistance value ranges from $1.0\times10^5$ ohms to $1.0\times10^8$ ohms as measured in a state where the developing roller is stopped and in a state where the developer is located between the developing roller and the developing blade, and ii) a second resistance value is in the range of the first resistance value ranges from $1.0\times10^5$ ohms to $1.0\times10^8$ ohms and is 40% or more with respect to the first resistance value, as measured in a state where the developing roller is rotated at 200 mm/s with respect to the developing blade and in a state where the developer is located between the developing roller and the developing blade.

18. The image-forming apparatus according to claim 17, wherein the developing roller has a volume resistivity of $1.0\times10^6$ ohm·cm or more.

19. The image-forming apparatus according to claim 17, wherein the developing roller has an electrostatic capacitance of $4\times10^{-2}$ pF/cm$^2$ or less per unit area.

20. The image-forming apparatus according to claim 17, wherein the developer contains an electrically conductive material with a volume resistance of $1\times10^{11}$ ohm·cm or less on an outermost surface thereof.

21. The image-forming apparatus according to claim 20, wherein the electrically conductive material has an average value of areas of 10 nm$^2$ or more and 10000 nm$^2$ or less and a coefficient of variation of the areas of 10.0 or less in a backscattered electron image taken with a scanning electron microscope.

22. The image-forming apparatus according to claim 17, comprising the developing blade configured to come into contact with a surface of the developing roller, wherein the developer has a negative normal polarity, and at least one of the developing roller and the developing blade contains one of a silicone component and a fluorine component.

23. The image-forming apparatus according to claim 17, comprising a developer container configured to store the developer, wherein in a state where the developing roller is stopped, a bottom surface of the developer container to a top surface of the developer stored in the developer container is lower than an uppermost portion of a surface of the developing roller.

24. The image-forming apparatus according to claim 17, wherein the developing roller comes into contact with the image-bearing member to allow the developer to develop.

25. The image-forming apparatus according to claim 24, comprising:

a charging roller configured to charge a surface of the image-bearing member; and a charging voltage application portion configured to apply a charging voltage to the charging roller, wherein when the surface of the image-bearing member is charged and the developing roller comes into contact with the image-bearing member at a surface velocity 40% higher than the image-bearing member, the image-bearing member has a surface potential of 3% or more lower after passage through a development region than before passage through the development region.

26. An image-forming apparatus comprising:

a rotatable image-bearing member including a base material and a surface layer on a surface thereof;

a charging roller configured to charge a surface of the image-bearing member;

a developing roller configured to supply the surface of the image-bearing member with the developer to be charged to a normal polarity;

a charging voltage application portion configured to apply a charging voltage to the charging roller;

a development voltage application portion configured to apply a development voltage to the developing roller; and a controller configured to control the charging voltage application portion and the development voltage application portion, wherein the controller is configured to form a potential difference between the image-bearing member and the developing roller so as to generate an electrostatic force that moves the developer charged to the normal polarity from the image-bearing member to the developing roller, and $$\rho p \leq 1.0\times10^{14}\ \text{ohm}\cdot\text{cm and}$$

$$\log_{10}\rho d > 0.05\log_{10}\rho p + 6$$

are satisfied, wherein ρp denotes a volume resistivity of the surface layer of the image-bearing member, and ρd denotes a volume resistivity of the developing roller.

27. The image-forming apparatus according to claim 26, comprising:

an exposure unit configured to form an image-forming region by exposing the surface of the image-bearing member to light to form an electrostatic latent image in an image-forming operation, wherein when the surface of the image-bearing member other than the image-forming region in a region where the surface of the image-bearing member can be charged by the charging roller is referred to as a non-image-forming region, the controller is configured to form a potential difference between the image-bearing member and the developing roller so as to generate an electrostatic force that moves the developer charged to the normal polarity from the image-bearing member to the developing roller in the non-image-forming region, and is configured to control a surface potential of the image-bearing member to be higher in absolute value than a surface potential of the developing roller.

28. The image-forming apparatus according to claim 27, wherein in the image-forming operation a surface velocity of the image-bearing member is different from a surface velocity of the developing roller.

29. The image-forming apparatus according to claim 26, wherein the developing roller has an electrostatic capacitance of $4.0\times10^{-2}$ pF/cm$^2$ or less per unit area.

30. The image-forming apparatus according to claim 26, wherein, in a state where the image-bearing member rotates and the surface of the image-bearing member is charged by the charging roller, the controller controls a first surface potential formed in a first region immediately before the surface of the image-bearing member passes through a development portion where the image-bearing member and the developing roller come into contact with each other is 3% or more higher in absolute value than a second surface potential formed in a second region immediately after the surface of the image-bearing member passes through the development portion.

31. The image-forming apparatus according to claim 26, wherein the developer satisfies the following conditions:

in a state where a potential difference is formed between a surface of the rotatable developing roller and a developing blade in contact with the surface of the developing roller outside the image-forming apparatus, each of the developing roller and the developing blade has a resistance value of $1.0\times10^4$ ohms or less, and i) a first resistance value ranges from $1.0\times10^5$ ohms to $1.0\times10^8$ ohms as measured in a state where the developing roller is stopped and in a state where the developer is located between the developing roller and the developing blade, and ii) a second resistance value v ranges from $1.0\times10^5$ ohms to $1.0\times10^8$ ohms and is 40% or more with respect to the first resistance value, as measured in a state where the developing roller is rotated at 200 mm/s with respect to the developing blade and in a state where the developer is located between the developing roller and the developing blade.

32. The image-forming apparatus according to claim 26, wherein the image-forming apparatus has a plurality of image formation modes in which the developing roller has a different surface velocity, and a mode with a low surface velocity of the developing roller increases a difference between a surface potential of the image-bearing member and a surface potential of the developing roller.

33. The image-forming apparatus according to claim 26, comprising:

an electrically conductive developing blade configured to regulate the developer carried on a surface of the developing roller; and a blade voltage application portion configured to apply a regulating voltage to the regulating member, wherein the controller performs control such that the regulating voltage applied to the regulating member is higher in absolute value on a normal charge side of the developer than a surface potential of the developing roller.

34. The image-forming apparatus according to claim 33, wherein, when there are a plurality of image formation modes in which the developing roller has a different surface velocity, a mode with a low surface velocity of the developing roller increases a potential difference between the regulating member and the developing roller.

35. The image-forming apparatus according to claim 26, wherein the developer contains an electrically conductive material with a volume resistivity of $1\times10^{11}$ ohm·cm or less on an outermost surface thereof.

36. The image-forming apparatus according to claim 35, wherein the electrically conductive material has an average value of areas of 10000 $nm^2$ or less and a coefficient of variation of the areas of 10.0 or less in a backscattered electron image of the developer taken with a scanning electron microscope.

* * * * *